(12) United States Patent
Feuersaenger et al.

(10) Patent No.: US 10,764,843 B2
(45) Date of Patent: *Sep. 1, 2020

(54) POWER-LIMIT REPORTING IN A COMMUNICATION SYSTEM USING CARRIER AGGREGATION

(71) Applicant: Sun Patent Trust, New York, NY (US)

(72) Inventors: Martin Feuersaenger, Bremen (DE); Joachim Loehr, Hessen (DE); Christian Wengerter, Kleinheubach (DE)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/291,387

(22) Filed: Mar. 4, 2019

(65) Prior Publication Data
US 2019/0200304 A1 Jun. 27, 2019

Related U.S. Application Data

(63) Continuation of application No. 15/702,607, filed on Sep. 12, 2017, now Pat. No. 10,271,292, which is a (Continued)

(30) Foreign Application Priority Data

Nov. 2, 2009 (EP) .................................... 09013756
Aug. 13, 2010 (EP) .................................... 10008477

(51) Int. Cl.
*H04W 52/36* (2009.01)
*H04L 5/00* (2006.01)
(Continued)

(52) U.S. Cl.
CPC ........... *H04W 52/365* (2013.01); *H04L 5/001* (2013.01); *H04L 5/006* (2013.01); *H04L 5/0007* (2013.01);
(Continued)

(58) Field of Classification Search
CPC ........... H04W 52/365; H04W 72/0473; H04W 72/042; H04W 52/146; H04W 72/0413;
(Continued)

(56) References Cited

U.S. PATENT DOCUMENTS 8,594,718 B2 11/2013 Yang et al.
8,711,722 B2 4/2014 Zhu et al.
(Continued)

FOREIGN PATENT DOCUMENTS

CN 101778416 A 7/2010
EP 2 244 514 A1 10/2010
(Continued)

OTHER PUBLICATIONS

3GPP TR 25.814 V7.1.0, "3rd Generation Partnership Project; Technical Specification Group Radio Access Network; Physical layer aspects for evolved Universal Terrestrial Radio Access (UTRA) (Release 7)," Sep. 2006, 132 pages.
(Continued)

Primary Examiner — Tejis Daya
(74) Attorney, Agent, or Firm — Seed IP Law Group LLP

(57) ABSTRACT

The invention relates to methods for informing an eNodeB on the transmit power status of a user equipment in a mobile communication system using component carrier (CC) aggregation. Furthermore, the invention is also related to the implementation of these methods by hardware and their implementation in software. The invention proposes procedures that allow the eNodeB to recognize the power usage status of a UE in a communication system using carrier aggregation. The UE indicates to the eNodeB, when the UE is close to using its total maximum UE transmit power or when it has exceeded same. This is achieved by the UE including indicator(s) and/or new MAC CEs to one or more protocol data units transmitted on respective component
(Continued)

carriers within a single sub-frame that is providing the eNodeB with power status information. The MAC CEs may report a per-UE power headroom. Alternatively, the MAC CEs may report per-CC power headrooms and/or power reductions applied to the respective uplink CCs.

8 Claims, 25 Drawing Sheets

Related U.S. Application Data continuation of application No. 15/353,323, filed on Nov. 16, 2016, now Pat. No. 9,794,894, which is a continuation of application No. 14/866,696, filed on Sep. 25, 2015, now Pat. No. 9,532,320, which is a continuation of application No. 14/316,465, filed on Jun. 26, 2014, now Pat. No. 9,179,424, which is a continuation of application No. 13/503,739, filed as application No. PCT/EP2010/006423 on Oct. 20, 2010, now Pat. No. 8,811,322.

(51) Int. Cl.
  *H04W 72/04* (2009.01)
  *H04W 52/14* (2009.01)
  *H04W 52/34* (2009.01)

(52) U.S. Cl.
  CPC .......... *H04L 5/0037* (2013.01); *H04L 5/0046* (2013.01); *H04L 5/0053* (2013.01); *H04L 5/0064* (2013.01); *H04W 52/146* (2013.01); *H04W 72/042* (2013.01); *H04W 72/0413* (2013.01); *H04W 72/0473* (2013.01); *H04W 52/34* (2013.01); *H04W 52/367* (2013.01); *Y02D 70/00* (2018.01)

(58) Field of Classification Search
  CPC ... H04W 52/367; H04W 52/34; H04W 52/54; H04W 52/30; H04W 24/10; H04L 5/0064; H04L 5/006; H04L 5/0053; H04L 5/0046; H04L 5/0037; H04L 5/001; H04L 5/0007; Y02D 70/00
  See application file for complete search history.

(56) References Cited

U.S. PATENT DOCUMENTS

| | | | |
|---|---|---|---|
| 8,862,174 | B2 | 10/2014 | Zhao et al. |
| 8,873,443 | B2 | 10/2014 | Haim et al. |
| 9,036,585 | B2 | 5/2015 | Heo et al. |
| 2009/0163211 | A1 | 6/2009 | Kitazoe et al. |
| 2009/0175187 | A1 | 7/2009 | Jersenius et al. |
| 2009/0303954 | A1 | 12/2009 | Guo |
| 2009/0318180 | A1 | 12/2009 | Yi et al. |
| 2010/0158147 | A1 | 6/2010 | Zhang et al. |
| 2010/0246463 | A1 | 9/2010 | Papasakellariou et al. |
| 2010/0272046 | A1 | 10/2010 | Guo |
| 2010/0273515 | A1 | 10/2010 | Fabien et al. |
| 2011/0038271 | A1 | 2/2011 | Shin et al. |
| 2011/0080838 | A1* | 4/2011 | Larsson .............. H04W 52/346 370/252 |
| 2011/0171988 | A1 | 7/2011 | Kim et al. |
| 2011/0243016 | A1 | 10/2011 | Zhang et al. |
| 2012/0009962 | A1 | 1/2012 | Liu et al. |
| 2012/0083308 | A1* | 4/2012 | Wang ................. H04W 52/367 455/522 |
| 2012/0224552 | A1 | 9/2012 | Feuersanger et al. |
| 2012/0294167 | A1 | 11/2012 | Zhu et al. |

FOREIGN PATENT DOCUMENTS

| | | |
|---|---|---|
| EP | 2 244 515 A1 | 10/2010 |
| KR | 10-2009-0077647 A | 7/2009 |
| WO | 2009/118367 A2 | 10/2009 |
| WO | 2009/154403 A2 | 12/2009 |

OTHER PUBLICATIONS

3GPP TS 36.101 V8.7.0, "3rd Generation Partnership Project; Technical Specification Group Radio Access Network; Evolved Universal Terrestrial Radio Access (E-UTRA); User Equipment (UE) radio transmission and reception (Release 8)," Sep. 2009, 156 pages.
3GPP TS 36.133 V8.7.0, "3rd Generation Partnership Project; Technical Specification Group Radio Access Network; Evolved Universal Terrestrial Radio Access (E-UTRA); Requirements for support of radio resource management (Release 8)," Sep. 2009, 317 pages.
3GPP TS 36.213 V8.8.0, "3rd Generation Partnership Project; Technical Specification Group Radio Access Network; Evolved Universal Terrestrial Radio Access (E-UTRA); Physical layer procedures (Release 8)," Sep. 2009, 77 pages.
3GPP TS 36.321 V8.7.0, "3rd Generation Partnership Project; Technical Specification Group Radio Access Network; Evolved Universal Terrestrial Radio Access (E-UTRA) Medium Access Control (MAC) protocol specification (Release 8)," Sep. 2009, 47 pages.
Alcatel-Lucent, "Scheduling Information Schemes for DC-HSUPA," R2-094235, Agenda Item: 10.2.2, 3GPP TSG-RAN WG2 Meeting #67, Shenzhen, China, Aug. 24-28, 2009, 4 pages.
CATT, "Impact of CA on MAC layer," R2-093723, Agenda Item: 7.3, 3GPP TSG RAN WG2 meeting #66bis, Los Angeles, USA, Jun. 29-Jul. 3, 2009, 3 pages.
CATT, "Impact of carrier aggregation on MAC layer," R2-095484, Agenda Item: 7.3.4, 3GPP TSG-RAN WG2 #67bis, Miyazaki, Japan, Oct. 12-16, 2009, 5 pages.
Chinese Office Action dated Jul. 3, 2014, for corresponding CN Application No. 201080060276.9, 33 pages.
English Translation of Notice of Preliminary Rejection dated Jul. 25, 2016, for corresponding KR Application No. 10-2012-7011258, 7 pages.
Ericsson, ST-Ericsson, "DC-HSUPA—Measurement definitions," R1-092765, Agenda Item: 6, 3GPP TSG RAN WG1 Meeting #57bis, Los Angeles, CA, USA, Jun. 29-Jul. 3, 2009, 2 pages.
European Search Report, dated Apr. 26, 2010, for European Application No. 09 01 3756, 3 pages.
European Search Report, dated Feb. 2, 2011, for European Application No. 10 00 8477, 3 pages.
Extended European Search Report, dated Aug. 13, 2018, for corresponding European Application No. 18172137.4-1214, 10 pages.
International Search Report, dated Jan. 28, 2011, for International Application No. PCT/EP2010/006423, 7 pages.
"LTE; Evolved Universal Terrestrial Radio Access (E-UTRA); Medium Access Control (MAC) protocol specification (3GPP TS 36.321 version 9.3.0 Release 9)," Technical Specification, ETSI TS 136 321 V9.3.0, Jul. 2010, 50 pages.
MediaTek, "Per UE PHR for carrier aggregation," R1-103743, 3GPP TSG-RAN WG1 Meeting #61bis, Agenda Item: 6.2.5, Dresden, Germany, Jun. 28-Jul. 2, 2010, 4 pages.
MediaTek, "Per UE PHR for carrier aggregation," R2-103634, Agenda Item: 7.1.1.6, 3GPP TSG-RAN WG2 Meeting #70bis, Stockholm, Sweden, Jun. 28-Jul. 2, 2010, 4 pages.
MediaTek, "Power headroom report for carrier aggregation," R2-102822, Agenda Item: 7.1.9, 3GPP TSG-RAN WG2 Meeting #70, Montreal, Canada, May 10-14, 2010, 4 pages.
Nokia Siemens Networks, Nokia Corporation, R1-103792, 3GPP TSG RAN WG1 #61bis Meeting, Agenda Item: 6.2.5, Dresden, Germany, Jun. 28-Jul. 2, 2010, 6 pages.
Nokia Siemens Networks, Nokia Corporation, "Power headroom reporting for LTE-Advanced," R1-101421, 3GPP TSG RAN WG1 #60 Meeting, San Francisco, CA, USA, Feb. 22-26, 2010, 3 pages.

(56) References Cited

OTHER PUBLICATIONS

Nokia Siemens Networks, Nokia Corporation, "PHR for carrier aggregation," R2-102165, Agenda Item: 7.1.1.7, 3GPP TSG-RAN WG2 Meeting #69bis, Beijing, China, Apr. 12-16, 2010, 2 pages.
Nokia Siemens Networks, Nokia Corporation, "Power headroom reporting for uplink carrier aggregation," R1-102946, Agenda Item: 6.2.5.2, 3GPP TSG RAN WG1 #61 Meeting, Montreal, Canada, May 10-14, 2010, 4 pages.
Nokia Siemens Networks, Nokia Corporation, "Details of PHR for carrier aggregation," R2103558, Agenda Item: 7.1.1.6, 3GPP TSG-RAN WG2 Meeting #70bis, Stockholm, Sweden, Jun. 28-Jul. 2, 2010, 5 pages.
Panasonic, "UE-specific Power headroom report," R2-103602, Agenda Item: 7.1.1.6, 3GPP TSG-RAN WG2 Meeting #70bis, Stockholm, Sweden, Jun. 28-Jul. 3, 2010, 3 pages.
Panasonic, "Details of cross-carrier power headroom reports," R2-103600, 3GPP TSG-RAN WG2 Meeting #70bis, Agenda Item: 7.1.1.6, Jun. 28-Jul. 3, 2010, Stockholm, Sweden, 3 pages.
Potevio, "Power Headroom Reporting for Carrier Aggregation," R2-102005, Agenda Item: 7.1.1.7, 3GPP TSG RAN WG2 #69bis, Beijing, China, Apr. 12-16, 2010, 4 pages.
Research in Motion UK Limited, "Uplink Power Control for Carrier Aggregation," R1-093297, Agenda Item: 15.4, 3GPP TSG RAN WG1 Meeting #58, Shenzhen, China, Aug. 24-28, 2009, 3 pages.
Research in Motion, UK Limited, "UL PHR for PUCCH and PUSCH," R2-103768, 3GPP TSG RAN WG2 Meeting #70bis, Agenda Item: 7.1.1.6, Stockholm, Sweden, Jun. 28-Jul. 2, 2010, 3 pages.
Samsung, "Transmission Power & PHR handing in CA," R2-103550, Agenda Item: 7.1.1.6, 3GPP TSG-RAN2#70 meeting, Stockholm, Sweden, Jun. 28-Jul. 2, 2010, 7 pages.
T-Mobile, NTT DoCoMo, Vodafone, Orange, KPN, "Operator requirements and scenarios for UL buffer reporting/scheduling and grant assignment in E-UTRAN," R2-062606, Agenda Item: 11.3.6, 3GPP TSG-RAN WG2#54, Tallinn, Estonia, Aug. 28-Sep. 1, 2006, 2 pages.
ZTE, "Discussion on CC specific PHR reporting," R2-103724, 3GPP TSG RAN WG2 #70bis, Agenda Item: 7.1.16, Stockholm, Sweden, Jun. 28-Jul. 2, 2010, 3 pages.
ZTE, "Power Headroom Reporting for Carrier Aggregation in LTE-Advanced," R1-101814, 3GPP TSG RAN WG1 Meeting #60bis, Agenda Item: 6.2.5.2, Beijing, China, Apr. 12-16, 2010, 4 pages.
Indian First Examination Report, dated Apr. 12, 2019, for Indian Application No. 1083/KOLNP/2012, 7 pages.

* cited by examiner

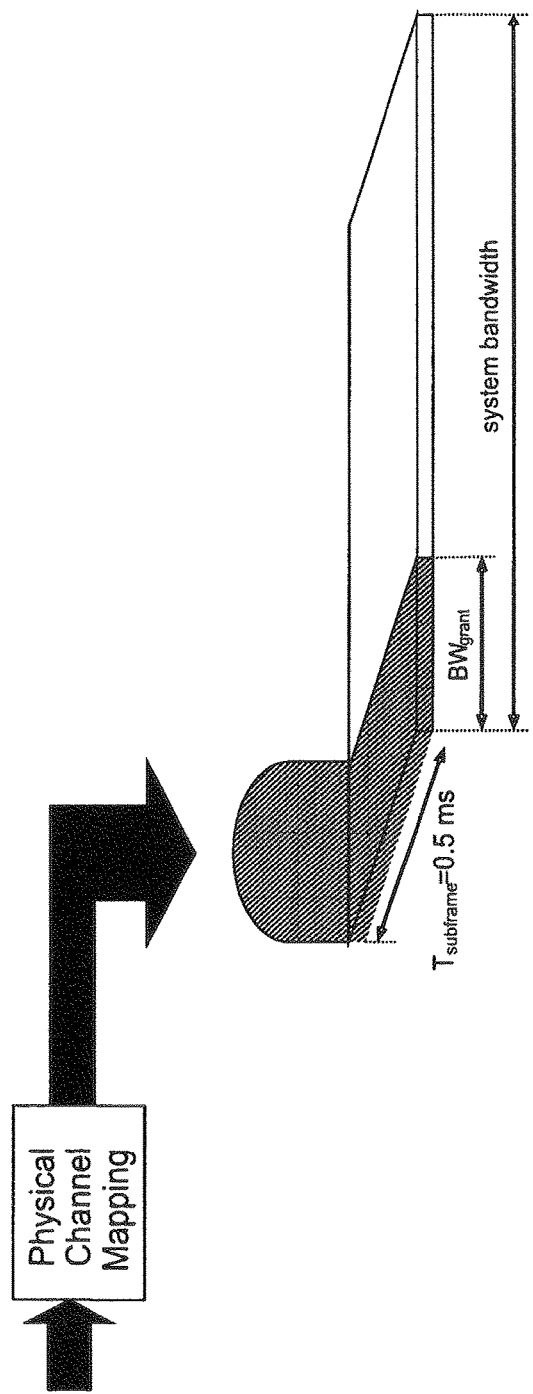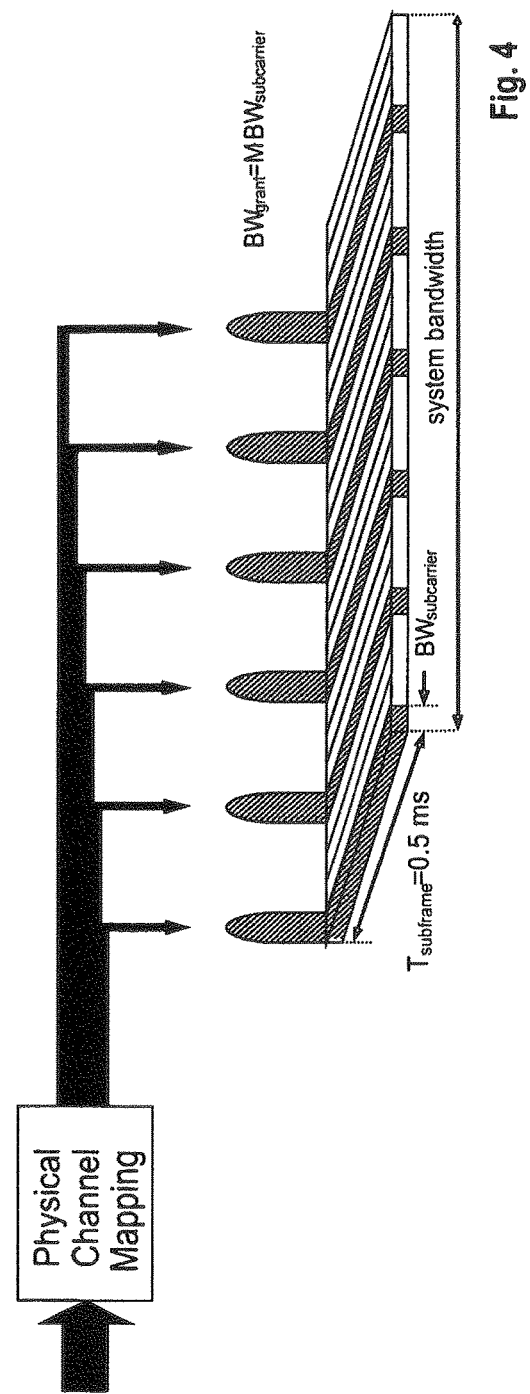

POWER-LIMIT REPORTING IN A COMMUNICATION SYSTEM USING CARRIER AGGREGATION

FIELD OF THE INVENTION

The invention relates to methods for informing an eNodeB on the transmit power status of a user equipment in a mobile communication system using component carrier aggregation. Furthermore, the invention is also related to the implementation/performance of these methods in/by hardware, i.e. apparatuses, and their implementation in software. The invention further relates to the definition of per-UE and per-component carrier power headroom reports and their signaling by means of MAC control elements.

TECHNICAL BACKGROUND

Long Term Evolution (LTE)

Third-generation mobile systems (3G) based on WCDMA radio-access technology are being deployed on a broad scale all around the world. A first step in enhancing or evolving this technology entails introducing High-Speed Downlink Packet Access (HSDPA) and an enhanced uplink, also referred to as High Speed Uplink Packet Access (HSUPA), giving a radio-access technology that is highly competitive.

In order to be prepared for further increasing user demands and to be competitive against new radio access technologies 3GPP introduced a new mobile communication system which is called Long Term Evolution (LTE). LTE is designed to meet the carrier needs for high speed data and media transport as well as high capacity voice support to the next decade. The ability to provide high bit rates is a key measure for LTE.

The work item (WI) specification on Long-Term Evolution (LTE) called Evolved UMTS Terrestrial Radio Access (UTRA) and UMTS Terrestrial Radio Access Network (UTRAN) is to be finalized as Release 8 (LTE Rel. 8). The LTE system represents efficient packet-based radio access and radio access networks that provide full IP-based functionalities with low latency and low cost. In LTE, scalable multiple transmission bandwidths are specified such as 1.4, 3.0, 5.0, 10.0, 15.0, and 20.0 MHz, in order to achieve flexible system deployment using a given spectrum. In the downlink, Orthogonal Frequency Division Multiplexing (OFDM) based radio access was adopted because of its inherent immunity to multipath interference (MPI) due to a low symbol rate, the use of a cyclic prefix (CP), and its affinity to different transmission bandwidth arrangements. Single-carrier frequency division multiple access (SC-FDMA) based radio access was adopted in the uplink, since provisioning of wide area coverage was prioritized over improvement in the peak data rate considering the restricted transmit power of the user equipment (UE). Many key packet radio access techniques are employed including multiple-input multiple-output (MIMO) channel transmission techniques, and a highly efficient control signaling structure is achieved in LTE Rel. 8/9.

LTE Architecture

The overall architecture is shown in FIG. 1 and a more detailed representation of the E-UTRAN architecture is given in FIG. 2. The E-UTRAN consists of eNodeB, providing the E-UTRA user plane (PDCP/RLC/MAC/PHY) and control plane (RRC) protocol terminations towards the user equipment (UE). The eNodeB (eNB) hosts the Physical (PHY), Medium Access Control (MAC), Radio Link Control (RLC), and Packet Data Control Protocol (PDCP) layers that include the functionality of user-plane header-compression and encryption. It also offers Radio Resource Control (RRC) functionality corresponding to the control plane. It performs many functions including radio resource management, admission control, scheduling, enforcement of negotiated uplink QoS, cell information broadcast, ciphering/deciphering of user and control plane data, and compression/decompression of downlink/uplink user plane packet headers. The eNodeBs are interconnected with each other by means of the X2 interface.

The eNodeBs are also connected by means of the S1 interface to the EPC (Evolved Packet Core), more specifically to the MME (Mobility Management Entity) by means of the S1-MME and to the Serving Gateway (SGW) by means of the S1-U. The S1 interface supports a many-to-many relation between MMEs/Serving Gateways and eNodeBs. The SGW routes and forwards user data packets, while also acting as the mobility anchor for the user plane during inter-eNodeB handovers and as the anchor for mobility between LTE and other 3GPP technologies (terminating S4 interface and relaying the traffic between 2G/3G systems and PDN GW). For idle state user equipments, the SGW terminates the downlink data path and triggers paging when downlink data arrives for the user equipment. It manages and stores user equipment contexts, e.g. parameters of the IP bearer service, network internal routing information. It also performs replication of the user traffic in case of lawful interception.

The MME is the key control-node for the LTE access-network. It is responsible for idle mode user equipment tracking and paging procedure including retransmissions. It is involved in the bearer activation/deactivation process and is also responsible for choosing the SGW for a user equipment at the initial attach and at time of intra-LTE handover involving Core Network (CN) node relocation. It is responsible for authenticating the user (by interacting with the HSS). The Non-Access Stratum (NAS) signaling terminates at the MME and it is also responsible for generation and allocation of temporary identities to user equipments. It checks the authorization of the user equipment to camp on the service provider's Public Land Mobile Network (PLMN) and enforces user equipment roaming restrictions. The MME is the termination point in the network for ciphering/integrity protection for NAS signaling and handles the security key management. Lawful interception of signaling is also supported by the MME. The MME also provides the control plane function for mobility between LTE and 2G/3G access networks with the S3 interface terminating at the MME from the SGSN. The MME also terminates the S6a interface towards the home HSS for roaming user equipments.

QoS Control

Efficient Quality of Service (QoS) support is seen as a basic requirement by operators for LTE. In order to allow best in class user experience, while on the other hand optimizing the network resource utilization, enhanced QoS support should be integral part of the new system.

Aspects of QoS support is currently being under discussion within 3GPP working groups. Essentially, the QoS design for System Architecture Evolution (SAE)/LTE is based on the QoS design of the current UMTS system reflected in 3GPP TR 25.814, "Physical layer aspects for evolved Universal Terrestrial Radio Access (UTRA)", v.7.1.0 (available at http://www.3gpp.org and incorporated herein by reference). The agreed SAE Bearer Service architecture is depicted in FIG. 5. The definition of a bearer service as given in 3GPP TR 25.814 may still be applicable:

"A bearer service includes all aspects to enable the provision of a contracted QoS. These aspects are among others the control signaling, user plane transport and QoS management functionality".

In the new SAE/LTE architecture the following new bearers have been defined: the SAE Bearer service between the mobile terminal (User Equipment—UE) and the serving gateway, the SAE Radio Bearer on the radio access network interface between mobile terminal and eNodeB as well as the SAE Access Bearer between the eNodeB and the serving gateway.

The SAE Bearer Service provides:

QoS-wise aggregation of IP end-to-end-service flows;
IP header compression (and provision of related information to UE);
User Plane (UP) encryption (and provision of related information to UE);
if prioritized treatment of end-to-end-service signaling packets is required an additional SAE Bearer Service can be added to the default IP service;
provision of mapping/multiplexing information to the UE;
provision of accepted QoS information to the UE.

The SAE Radio Bearer Service provides:

transport of the SAE Bearer Service data units between eNodeB and UE according to the required QoS;
linking of the SAE Radio Bearer Service to the respective SAE Bearer Service.

The SAE Access Bearer Service provides:

transport of the SAE Bearer Service data units between serving gateway and eNodeB according to the required QoS;
provision of aggregate QoS description of the SAE Bearer Service towards the eNodeB;
linking of the SAE Access Bearer Service to the respective SAE Bearer Service.

In 3GPP TR 25.814 a one-to-one mapping between an SAE Bearer and an SAE Radio Bearer. Furthermore there is a one-to-one mapping between a radio bearer (RB) and a logical channel. From that definition it follows that a SAE Bearer, i.e. the corresponding SAE Radio Bearer and SAE Access Bearer, is the level of granularity for QoS control in an SAE/LTE access system. Packet flows mapped to the same SAE Bearer receive the same treatment.

For LTE there will be two different SAE bearer types: the default SAE bearer with a default QoS profile, which is configured during initial access and the dedicated SAE bearer (SAE bearers may also be referred to as SAE bearer services) which is established for services requiring a QoS profile which is different from the default one.

The default SAE bearer is an "always on" SAE bearer that can be used immediately after LTE_IDLE to LTE_ACTIVE state transition. It carries all flows which have not been signaled a Traffic Flow Template (TFT). The Traffic Flow Template is used by serving gateway to discriminate between different user payloads. The Traffic Flow Template incorporates packet filters such as QoS. Using the packet filters the serving gateway maps the incoming data into the correct PDP Context (Packet Data Protocol Context). For the default SAE bearer, several service data flows can be multiplexed. Unlike the default SAE Bearer, the dedicated SAE Bearers are aimed at supporting identified services in a dedicated manner, typically to provide a guaranteed bit-rate. Dedicated SAE bearers are established by the serving gateway based on the QoS information received in Policy and Charging Control (PCC) rules from evolved packet core when a new service is requested. A dedicated SAE bearer is associated with packet filters where the filters match only certain packets. A default SAE bearer is associated with "match all" packet filters for uplink and downlink. For uplink handling the serving gateway builds the Traffic Flow Template filters for the dedicated SAE bearers. The UE maps service data flows to the correct bearer based on the Traffic Flow Template, which has been signaled during bearer establishment. As for the default SAE Bearer, also for the dedicated SAE Bearer several service data flows can be multiplexed.

The QoS Profile of the SAE bearer is signaled from the serving gateway to the eNodeB during the SAE bearer setup procedure. This profile is then used by the eNodeB to derive a set of Layer 2 QoS parameters, which will determine the QoS handling on the air interface. The Layer 2 QoS parameters are input to the scheduling functionality. The parameters included in the QoS profile signaled on S1 interface from serving gateway to eNodeB are currently under discussion. Most likely the following QoS profile parameters are signaled for each SAE bearer: Traffic Handling Priority, Maximum Bit-rate, Guaranteed Bit-rate. In addition, the serving gateway signals to the eNodeB the Allocation and Retention Priority for each user during initial access.

Uplink Access Scheme for LTE

For uplink transmission, power-efficient user-terminal transmission is necessary to maximize coverage. Single-carrier transmission combined with FDMA (Frequency Division Multiple Access) with dynamic bandwidth allocation has been chosen as the evolved UTRA uplink transmission scheme. The main reason for the preference for single-carrier transmission is the lower peak-to-average power ratio (PAPR), compared to multi-carrier signals (OFDMA—Orthogonal Frequency Division Multiple Access), and the corresponding improved power-amplifier efficiency and assumed improved coverage (higher data rates for a given terminal peak power). During each time interval, eNodeB assigns users a unique time/frequency resource for transmitting user data thereby ensuring intra-cell orthogonality. An orthogonal access in the uplink promises increased spectral efficiency by eliminating intra-cell interference. Interference due to multipath propagation is handled at the base station (eNodeB), aided by insertion of a cyclic prefix in the transmitted signal.

The basic physical resource used for data transmission consists of a frequency resource of size $BW_{grant}$ during one time interval, e.g. a sub-frame of 0.5 ms, onto which coded information bits are mapped. It should be noted that a sub-frame, also referred to as transmission time interval (TTI), is the smallest time interval for user data transmission. It is however possible to assign a frequency resource $BW_{grant}$ over a longer time period than one TTI to a user by concatenation of sub-frames.

The frequency resource can either be in a localized or distributed spectrum as illustrated in FIG. 3 and FIG. 4. As can be seen from FIG. 3, localized single-carrier is characterized by the transmitted signal having a continuous spectrum that occupies a part of the total available spectrum. Different symbol rates (corresponding to different data rates) of the transmitted signal imply different bandwidths of a localized single-carrier signal.

On the other hand, as shown in FIG. 4, distributed single-carrier is characterized by the transmitted signal having a non-continuous ("comb-shaped") spectrum that is distributed over system bandwidth. Note that, although the distributed single-carrier signal is distributed over the system bandwidth, the total amount of occupied spectrum is, in essence, the same as that of localized single-carrier. Furthermore, for higher/lower symbol rate, the number of "comb-fingers" is increased/reduced, while the "bandwidth" of each "comb finger" remains the same.

At first glance, the spectrum in FIG. 4 may give the impression of a multi-carrier signal where each comb-finger corresponds to a "sub-carrier". However, from the time-domain signal-generation of a distributed single-carrier signal, it should be clear that what is being generated is a true single-carrier signal with a corresponding low peak-to-average power ratio. The key difference between a distributed single-carrier signal versus a multi-carrier signal, such as e.g. OFDM (Orthogonal Frequency Division Multiplex), is that, in the former case, each "sub-carrier" or "comb finger" does not carry a single modulation symbol. Instead each "comb-finger" carries information about all modulation symbols. This creates a dependency between the different comb-fingers that leads to the low-PAPR characteristics. It is the same dependency between the "comb fingers" that leads to a need for equalization unless the channel is frequency-non-selective over the entire transmission bandwidth. In contrast, for OFDM equalization is not needed as long as the channel is frequency-non-selective over the sub-carrier bandwidth.

Distributed transmission can provide a larger frequency diversity gain than localized transmission, while localized transmission more easily allows for channel-dependent scheduling. Note that, in many cases the scheduling decision may decide to give the whole bandwidth to a single user equipment to achieve high data rates.

Uplink Scheduling scheme for LTE

The uplink scheme allows for both scheduled access, i.e. controlled by eNodeB, and contention-based access.

In case of scheduled access the user equipment is allocated a certain frequency resource for a certain time (i.e. a time/frequency resource) for uplink data transmission. However, some time/frequency resources can be allocated for contention-based access. Within these time/frequency resources, user equipments can transmit without first being scheduled. One scenario where user equipment is making a contention-based access is for example the random access, i.e. when user equipment is performing initial access to a cell or for requesting uplink resources.

For the scheduled access eNodeB scheduler assigns a user a unique frequency/time resource for uplink data transmission. More specifically the scheduler determines
- which user equipment(s) that is (are) allowed to transmit,
- which physical channel resources (frequency),
- Transport format (Transport Block Size (TBS) and Modulation Coding Scheme (MCS)) to be used by the mobile terminal for transmission The allocation information is signaled to the user equipment via a scheduling grant, sent on the so-called L1/L2 control channel. For simplicity, this downlink channel is referred to the "uplink grant channel" in the following.

A scheduling grant message (also referred to as an resource assignment herein) contains at least information which part of the frequency band the user equipment is allowed to use, the validity period of the grant, and the transport format the user equipment has to use for the upcoming uplink transmission. The shortest validity period is one sub-frame. Additional information may also be included in the grant message, depending on the selected scheme. Only "per user equipment" grants are used to grant the right to transmit on the Uplink Shared Channel UL-SCH (i.e. there are no "per user equipment per RB" grants).

Therefore the user equipment needs to distribute the allocated resources among the radio bearers according to some rules, which will be explained in detail in the next section.

Unlike in HSUPA there is no user equipment based transport format selection. The base station (eNodeB) decides the transport format based on some information, e.g. reported scheduling information and QoS information, and user equipment has to follow the selected transport format. In HSUPA eNodeB assigns the maximum uplink resource and user equipment selects accordingly the actual transport format for the data transmissions.

Uplink data transmissions are only allowed to use the time-frequency resources assigned to the user equipment through the scheduling grant. If the user equipment does not have a valid grant, it is not allowed to transmit any uplink data. Unlike in HSUPA, where each user equipment is always allocated a dedicated channel there is only one uplink data channel shared by multiple users (UL-SCH) for data transmissions.

To request resources, the user equipment transmits a resource request message to the eNodeB. This resources request message could for example contain information on the buffer status, the power status of the user equipment and some Quality of Services (QoS) related information. This information, which will be referred to as scheduling information, allows eNodeB to make an appropriate resource allocation. Throughout the document it's assumed that the buffer status is reported for a group of radio bearers. Of course other configurations for the buffer status reporting are also possible. Since the scheduling of radio resources is the most important function in a shared channel access network for determining Quality of Service, there are a number of requirements that should be fulfilled by the uplink scheduling scheme for LTE in order to allow for an efficient QoS management (see 3GPP RAN WG #2 Tdoc. R2-R2-062606, "QoS operator requirements/use cases for services sharing the same bearer", by T-Mobile, NTT DoCoMo, Vodafone, Orange, KPN; available at http://www.3gpp.org/ and incorporated herein by reference):
- Starvation of low priority services should be avoided
- Clear QoS differentiation for radio bearers/services should be supported by the scheduling scheme
- The uplink reporting should allow fine granular buffer reports (e.g. per radio bearer or per radio bearer group) in order to allow the eNodeB scheduler to identify for which Radio Bearer/service data is to be sent.
- It should be possible to make clear QoS differentiation between services of different users
- It should be possible to provide a minimum bit-rate per radio bearer As can be seen from above list one essential aspect of the LTE scheduling scheme is to provide mechanisms with which the operator can control the partitioning of its aggregate cell capacity between the radio bearers of the different QoS classes. The QoS class of a radio bearer is identified by the QoS profile of the corresponding SAE bearer signaled from serving gateway to eNodeB as described before. An operator can then allocate a certain amount of its aggregate cell capacity to the aggregate traffic associated with radio bearers of a certain QoS class.

The main goal of employing this class-based approach is to be able to differentiate the treatment of packets depending on the QoS class they belong to. For example, as the load in a cell increases, it should be possible for an operator to handle this by throttling traffic belonging to a low-priority QoS class. At this stage, the high-priority traffic can still experience a low-loaded situation, since the aggregate resources allocated to this traffic is sufficient to serve it. This should be possible in both uplink and downlink direction.

One benefit of employing this approach is to give the operator full control of the policies that govern the partitioning of the bandwidth. For example, one operator's policy could be to, even at extremely high loads, avoid starvation of traffic belonging to its lowest priority QoS Class. The avoidance of starvation of low priority traffic is one of the main requirements for the uplink scheduling scheme in LTE. In current UMTS Release 6 (HSUPA) scheduling mechanism the absolute prioritization scheme may lead to starvation of low priority applications. E-TFC selection (Enhanced Transport Format Combination selection) is done only in accordance to absolute logical channel priorities, i.e. the transmission of high priority data is maximized, which means that low priority data is possibly starved by high priority data. In order to avoid starvation the eNodeB scheduler must have means to control from which radio bearers a user equipment transmits data. This mainly influences the design and use of the scheduling grants transmitted on the L1/L2 control channel in downlink. In the following the details of the uplink rate control procedure in LTE is outlined.

Medium Access Control (MAC) and MAC Control Elements

The MAC layer is the lowest sub-layer in the Layer 2 architecture of the LTE radio protocol stack (see 3GPP TS 36.321, "Medium Access Control (MAC) protocol specification", version 8.7.0, in particular sections 4.2, 4.3, 5.4.3 and 6, available at http//www.3gpp.org and incorporated in its entirety herein by reference). The connection to the physical layer below is through transport channels, and the connection to the RLC layer above is through logical channels. The MAC layer performs multiplexing and demultiplexing between logical channels and transport channels. The MAC layer in the transmitting side (in the following examples the user equipment) constructs MAC PDUs, also referred to as transport blocks, from MAC SDUs received through logical channels, and the MAC layer in the receiving side recovers MAC SDUs from MAC PDUs received through transport channels.

In the multiplexing and demultiplexing entity, data from several logical channels can be (de)multiplexed into/from one transport channel. The multiplexing entity generates MAC PDUs from MAC SDUs when radio resources are available for a new transmission. This process includes prioritizing the data from the logical channels to decide how much data and from which logical channel(s) should be included in each MAC PDU. Please note that the process of generating MAC PDUs in the user equipment is also referred to a logical channel prioritization (LCP) in the 3GPP terminology.

The demultiplexing entity reassembles the MAC SDUs from MAC PDUs and distributes them to the appropriate RLC entities. In addition, for peer-to-peer communication between the MAC layers, control messages called 'MAC Control Elements' can be included in the MAC PDU.

A MAC PDU primarily consists of the MAC header and the MAC payload (see 3GPP TS 36.321, section 6). The MAC header is further composed of MAC sub-headers, while the MAC payload is composed of MAC Control Elements, MAC SDUs and padding. Each MAC sub-header consists of a Logical Channel ID (LCID) and a Length (L) field. The LCID indicates whether the corresponding part of the MAC payload is a MAC Control Element, and if not, to which logical channel the related MAC SDU belongs. The L field indicates the size of the related MAC SDU or MAC Control Element. As already mentioned above, MAC Control Elements are used for MAC-level peer-to-peer signaling, including delivery of BSR information and reports of the UE's available power in the uplink, and in the downlink DRX commands and timing advance commands. For each type of MAC Control Element, one special LCID is allocated. An example for a MAC PDU is shown in FIG. 6.

Power Control

Uplink transmitter power control in a mobile communication system serves the purpose of balancing the need for sufficient transmitter energy per bit to achieve the required QoS against the need to minimize interference to other users of the system and to maximize the battery life of the user equipment. In achieving this, the uplink power control has to adapt to the characteristics of the radio propagation channel, including path loss, shadowing and fast fading, as well as overcoming interference from other users within the same cell and neighboring cells. The role of the Power Control (PC) becomes decisive to provide the required SINR (Signal-to-Interference plus Noise Ratio) while controlling at the same time the interference caused to neighboring cells. The idea of classic PC schemes in uplink is that all users are received with the same SINR, which is known as full compensation. As an alternative, the 3GPP has adopted the use of Fractional Power Control (FPC) for LTE Rel. 8/9. This new functionality makes users with a higher path-loss operate at a lower SINR requirement so that they will more likely generate less interference to neighboring cells.

The power control scheme provided in LTE Rel. 8/9 employs a combination of open-loop and closed-loop control. A mode of operation involves setting a coarse operating point for the transmission power density spectrum by open-loop means based on path-loss estimation. Faster operation can then be applied around the open-loop operating point by closed-loop power control. This controls interference and fine-tunes the power settings to suit the channel conditions including fast fading.

With this combination of mechanisms, the power control scheme in LTE Rel. 8/9 provides support for more than one mode of operation. It can be seen as a toolkit for different power control strategies depending on the deployment scenario, the system load and operator preference.

The detailed power control formulae are specified in LTE Rel. 8/9 for the Physical Uplink Shared Channel (PUSCH), Physical Uplink Control Channel (PUCCH) and the Sounding Reference Signals (SRS) in section 5.1 in 3GPP TS 36.213, "Physical layer procedures", version 8.8.0, available at http://www.3gpp.org and incorporated herein by reference. The formula for each of these uplink signals follows the same basic principles; in all cases they can be considered as a summation of two main terms: a basic open-loop operating point derived from static or semi-static parameters signaled by the eNodeB, and a dynamic offset updated from sub-frame to sub-frame.

The basic open-loop operating point for the transmit power per resource block depends on a number of factors including the inter-cell interference and cell load. It can be further broken down into two components, a semi-static base level $P_0$, further comprised of a common power level for all user equipments in the cell (measured in dBm) and a UE-specific offset, and an open-loop path-loss compensation component. The dynamic offset part of the power per resource block can also be further broken down into two components, a component dependent on the MCS and explicit Transmitter Power Control (TPC) commands.

The MCS-dependent component (referred to in the LTE specifications as $\Delta_{TF}$, where TF stands for "Transport Format") allows the transmitted power per resource block to be adapted according to the transmitted information data rate.

The other component of the dynamic offset is the UE-specific TPC commands. These can operate in two different modes: accumulative TPC commands (available for PUSCH, PUCCH and SRS) and absolute TPC commands (available for PUSCH only). For the PUSCH, the switch between these two modes is configured semi-statically for each UE by RRC signaling—i.e. the mode cannot be changed dynamically. With the accumulative TPC commands, each TPC command signals a power step relative to the previous level. Uplink transmitter power control in a mobile communication system serves the purpose of balancing the need for sufficient transmitter energy per bit to achieve the required QoS against the need to minimize interference to other users of the system and to maximize the battery life of the user equipment.

In achieving this, the uplink power control has to adapt to the characteristics of the radio propagation channel, including path loss, shadowing and fast fading, as well as overcoming interference from other users within the same cell and neighboring cells.

The setting of the UE Transmit power $P_{PUSCH}$ [dBm] for the PUSCH transmission in reference sub-frame i is defined by (see section 5.1.1.1 of 3GPP TS 36.213):

$$P_{PUSCH}(i)=\min\{P_{CMAX},10\log_{10}(M_{PUSCH}(i))+P_{O\_PUSCH}(j)+\alpha(j)\cdot PL+\Delta_{TF}(i)+f(i)\} \quad \text{Equation 1}$$

$P_{CMAX}$ is the maximum UE transmit power chosen by UE in the given range (see below); $M_{PUSCH}$ is the number of allocated physical resource blocks (PRBs). The more PRBs are allocated, the more uplink transmit power is allocated.

$P_{O\_PUSCH}(j)$ indicates the base transmission power signaled by RRC. For semi-persistent scheduling (SPS) and dynamic scheduling this is the sum of a cell specific nominal component $P_{O\_NOMINAL\_PUSCH}(j) \in [-126, \ldots, 24]$ and a UE specific component $P_{O\_UE\_PUSCH}(j) \in [-127, \ldots, -96]$. For RACH message 3: Offset from preamble transmission power $\alpha$ denotes a cell-specific parameter (that is broadcast on system information). This parameter indicates how much path-loss PL is compensated. $\alpha=1$ means the received signal level at eNodeB is same regardless of the user equipment's position. For SPS and dynamic scheduling $\alpha \in \{0, 0.4, 0.5, 0.6, 0.7, 0.8, 0.9, 1\}$, and for the case of RACH Message 3, $\alpha(j)=1$.

PL is the UE path-loss derived at the user equipments based on Reference Signal Received Power (RSRP) measurement and signaled Reference Signal (RS) transmission power. PL can be defined as PL=reference signal power–higher layer filtered RSRP.

$\Delta_{TF}$ is a modulation and coding scheme (transport format) dependent power offset.

$f(i)$ is a function of the closed loop power control commands signaled from the eNodeB to the UE. $f( )$ represents accumulation in case of accumulative TPC commands. Whether closed loop commands are relative accumulative or absolute is configured by higher layers. For the accumulative TPC commands two sets of power step values are provided: (−1, 1) dB for DCI format 3A and (−1, 0+1, +3) dB for DCI format 3. The set of values which can be signaled by absolute TPC commands is (−4, −1, 1, 4) dB indicated by DCI format 3.

Power Headroom Reporting

In order to assist the eNodeB to schedule the uplink transmission resources to different user equipments in an appropriate way, it is important that the user equipment can report its available power headroom to eNodeB.

The eNodeB can use the power headroom reports to determine how much more uplink bandwidth per sub-frame a user equipment is capable of using. This helps to avoid allocating uplink transmission resources to user equipments which are unable to use them in order to avoid a waste of resources.

The range of the power headroom report is from +40 to −23 dB (see 3GPP TS 36.133, "Requirements for support of radio resource management", version 8.7.0, section 9.1.8.4, available at http//www.3gpp.org and incorporated in its entirety herein by reference). The negative part of the range enables the user equipment to signal to the eNodeB the extent to which it has received an UL grant which would require more transmission power than the UE has available. This would enable the eNodeB to reduce the size of a subsequent grant, thus freeing up transmission resources to allocate to other UEs.

A power headroom report can only be sent in sub-frames in which a UE has an UL grant. The report relates to the sub-frame in which it is sent. A number of criteria are defined to trigger a power headroom report. These include:
  A significant change in estimated path loss since the last power headroom report
  More than a configured time has elapsed since the previous power headroom report
  More than a configured number of closed-loop TPC commands have been implemented by the UE The eNodeB can configure parameters to control each of these triggers depending on the system loading and the requirements of its scheduling algorithm. To be more specific, RRC controls power headroom reporting by configuring the two timers periodicPHR-Timer and prohibitPHR-Timer, and by signalling dl-PathlossChange which sets the change in measured downlink pathloss to trigger a power headroom report.

The power headroom report is send as a MAC Control Element. It consists of a single octet where the two highest bits are reserved and the six lowest bits represent the dB values mentioned above in 1 dB steps. The structure of the MAC Control Element is shown in FIG. 7.

The UE power headroom PH [dB] valid for sub-frame i is defined by (see section 5.1.1.2 of 3GPP TS 36.213):

$$PH(i)=P_{CMAX}-\{10\cdot\log_{10}(M_{PUSCH}(i))+P_{O\_PUSCH}(j)+\alpha(j)\cdot PL+\Delta_{TF}(i)+\theta(i)\} \quad \text{Equation 2}$$

The power headroom is rounded to the closest value in the range [40; −23] dB with steps of 1 dB. $P_{CMAX}$ is the total maximum UE transmit power (or total maximum transmit power of the user equipment) and is a value chosen by user equipment in the given range of $P_{CMAX\_L}$ and $P_{CMAX\_H}$ based on the following constraints:

$$P_{CMAX\_L} \leq P_{CMAX} \leq P_{CMAX\_H}$$

$$P_{CMAX\_L}=\min(P_{EMAX}-\Delta T_C, P_{PowerClass}-MPR-AMPR-\Delta T_C)$$

$$P_{CMAX\_H}=\min(P_{EMAX}, P_{PowerClass})$$

$P_{EMAX}$ is the value signaled by the network and $\Delta T_C$, MPR and AMPR (also denoted A-MPR—Additional Maximum Power Reduction) are specified in 3GPP TS 36.101, "Evolved Universal Terrestrial Radio Access (E-UTRA); User Equipment (UE) radio transmission and reception", version 8.7.0, section 6.2 available at http//www.3gpp.org and incorporated herein by reference.

MPR is a power reduction value, the so-called Maximum Power Reduction, used to control the Adjacent Channel Leakage Power Ratio (ACLR) associated with the various modulation schemes and the transmission bandwidth. An adjacent channel may be for example either another Evolved Universal Terrestrial Radio Access (E-UTRA) channel or an UTRA channel. The maximum allowed power reduction (MPR) is also defined in 3GPP TS 36.101. It is different depending on channel bandwidth and modulation scheme. The user equipment's reduction may be less than this maximum allowed power reduction (MPR) value. 3GPP specifies a MPR test which verifies that the maximum transmit power of a user equipment is greater than or equal to the nominal total maximum transmit power minus the MPR while still complying with the ACLR requirements As indicated above, AMPR is the Additional Maximum Power Reduction. It is band specific and is applied when configured by the network.

As can be seen from the explanations above, $P_{CMAX}$ is UE-implementation specific and hence not known by the eNodeB.

FIG. 25 shows exemplary scenarios for a UE transmission power status and corresponding power headroom. On the left hand side of FIG. 25, the user equipment is not power limited (positive PHR), whereas on the right hand side of FIG. 25 a negative power headroom is implying a power limitation of the user equipment. Please note that the wherein $P_{CMAX\_L} \leq P_{CMAX} \leq \min(P_{EMAX}, P_{PowerClass})$ wherein the lower boundary $P_{CMAX\_L}$ is typically mainly dependent on the maximum power reduction MPR and the additional maximum power reduction AMPR, i.e. $P_{CMAX\_L} \cong P_{PowerClass} - MPR - AMPR$ Further Advancements for LTE (LTE-A)

The frequency spectrum for IMT-Advanced was decided at the World Radiocommunication Conference 2007 (WRC-07). Although the overall frequency spectrum for IMT-Advanced was decided, the actual available frequency bandwidth is different according to each region or country. Following the decision on the available frequency spectrum outline, however, standardization of a radio interface started in the 3rd Generation Partnership Project (3GPP). At the 3GPP TSG RAN #39 meeting, the Study Item description on "Further Advancements for E-UTRA (LTE-Advanced)" was approved. The study item covers technology components to be considered for the evolution of E-UTRA, e.g. to fulfill the requirements on IMT-Advanced. Two major technology components which are currently under consideration for LTE-A are described in the following.

Carrier Aggregation in LTE-A for Support of Wider Bandwidth

In carrier aggregation, two or more component carriers (component carriers) are aggregated in order to support wider transmission bandwidths up to 100 MHz. All component carriers can be configured to be LTE Rel. 8/9 compatible, at least when the aggregated numbers of component carriers in the uplink and the downlink are the same. Not all component carriers aggregated by a user equipment may necessarily be Rel. 8/9 compatible.

A user equipment may simultaneously receive or transmit one or multiple component carriers depending on its capabilities. A LTE-A Rel. 10 user equipment with reception and/or transmission capabilities for carrier aggregation can simultaneously receive and/or transmit on multiple component carriers whereas an LTE Rel. 8/9 user equipment can receive and transmit on a single component carrier only, provided that the structure of the component carrier follows the Rel. 8/9 specifications.

Carrier aggregation is supported for both contiguous and non-contiguous component carriers with each component carrier limited to a maximum of 110 Resource Blocks in the frequency domain using the Rel. 8/9 numerology. It is possible to configure a user equipment to aggregate a different number of component carriers originating from the same eNodeB and of possibly different bandwidths in the uplink and the downlink:

The number of downlink component carriers that can be configured depends on the downlink aggregation capability of the user equipment;

The number of uplink component carriers that can be configured depends on the uplink aggregation capability of the user equipment;

It is not possible to configure a user equipment with more uplink component carriers than downlink component carriers;

In typical TDD deployments, the number of component carriers and the bandwidth of each component carrier in uplink and downlink is the same.

Component carriers originating from the same eNodeB need not to provide the same coverage.

The spacing between centre frequencies of contiguously aggregated component carriers shall be a multiple of 300 kHz. This is in order to be compatible with the 100 kHz frequency raster of Rel. 8/9 and at the same time preserve orthogonality of the subcarriers with 15 kHz spacing. Depending on the aggregation scenario, the n×300 kHz spacing can be facilitated by insertion of a low number of unused subcarriers between contiguous component carriers.

The nature of the aggregation of multiple carriers is only exposed up to the MAC layer. For both uplink and downlink there is one HARQ entity required in MAC for each aggregated component carrier. There is (in the absence of SU-MIMO—Single User Multiple Input Multiple Output—for uplink) at most one transport block per component carrier. A transport block and its potential HARQ retransmissions need to be mapped on the same component carrier. The Layer 2 structure with activated carrier aggregation is shown in FIG. 19 and FIG. 20 for the downlink and uplink respectively.

When carrier aggregation is configured, the user equipment only has one RRC connection with the network. At RRC connection establishment/re-establishment, one cell provides the security input (one ECGI, one PCI and one ARFCN) and the non-access stratum mobility information (e.g. TAI) similarly as in LTE Rel. 8/9. After RRC connection establishment/re-establishment, the component carrier corresponding to that cell is referred to as the downlink Primary Cell (PCell). There is always one and only one downlink PCell (DL PCell) and one uplink PCell (UL PCell) configured per user equipment in connected mode. Within the configured set of component carriers, other cells are referred to as Secondary Cells (SCells). The characteristics of the downlink and uplink PCell are:

The uplink PCell is used for transmission of Layer 1 uplink control information

The downlink PCell cannot be de-activated

Re-establishment is triggered when the downlink PCell experiences Rayleigh fading (RLF), not when downlink SCells experience RLF The downlink PCell cell can change with handover Non-access stratum information is taken from the downlink PCelll.

The reconfiguration, addition and removal of component carriers can be performed by RRC. At intra-LTE handover, RRC can also add, remove, or reconfigure component carriers for usage in the target cell. When adding a new component carrier, dedicated RRC signaling is used for sending component carriers' system information which is necessary for component carrier transmission/reception (similarly as in LTE Rel. 8/9 for handover).

When carrier aggregation is configured, a user equipment may be scheduled over multiple component carriers simultaneously, but at most one random access procedure should be ongoing at any time. Cross-carrier scheduling allows the Physical Downlink Control Channel (PDCCH) of a component carrier to schedule resources on another component carrier. For this purpose a component carrier identification field (CIF) is introduced in the respective Downlink Control Information (DCI) formats. A linking between uplink and downlink component carriers allows identifying the uplink component carrier for which the grant applies when there is no-cross-carrier scheduling. The linkage of downlink component carriers to uplink component carriers does not necessarily need to be one to one. In other words, more than one downlink component carrier can link to the same uplink component carrier. At the same time, a downlink component carrier can only link to one uplink component carrier.

(De)Activation of a Component Carrier and DRX Operation

In carrier aggregation, whenever a user equipment is configured with only one component carrier, LTE Rel. 8/9 discontinuous reception (DRX) applies.

In other cases, the same DRX operation applies to all configured and activated cells, respectively component carriers (i.e. identical active time for PDCCH monitoring). When in active time, any component carrier may always schedule Physical Downlink Shared Channel (PDSCH) on any other configured and activated component carrier (further restrictions are free for study).

To enable reasonable user equipment battery consumption when carrier aggregation is configured, a component carrier activation/deactivation mechanism for downlink SCells is introduced (i.e. activation/deactivation does not apply to the PCell). When a downlink SCell is not active, the user equipment does not need to receive the corresponding PDCCH or PDSCH, nor is it required to perform CQI measurements (CQI is short for Channel Quality Indicator). Conversely, when a downlink SCell is active, the user equipment shall receive PDSCH and PDCCH (if present), and is expected to be able to perform CQI measurements. In the uplink however, a user equipment is always required to be able to transmit on PUSCH on any configured uplink component carrier when scheduled on the corresponding PDCCH (i.e. there is no explicit activation of uplink component carriers).

Other details of the activation/deactivation mechanism for SCells are:
  Explicit activation of downlink SCells is done by MAC signaling;
  Explicit deactivation of downlink SCells is done by MAC signaling;
  Implicit deactivation of downlink SCells is also possible;
  downlink SCells can be activated and deactivated individually, and a single activation/deactivation command can activate/deactivate a subset of the configured downlink SCells;
  SCells added to the set of configured component carriers are initially "deactivated".

Uplink Power Control for Carrier Aggregation

Even though most details of the uplink power control algorithm for the carrier aggregation case are still open or under discussion in the 3GPP working groups, the general agreement is that LTE-A Rel. 10 supports component carrier specific uplink power control, i.e. there will be one independent power control loop for each uplink component carrier configured for the user equipment. Furthermore it was decided that power headroom should be reported per-component carrier. In case of power limitation, i.e. UE transmission power is exceeding the total maximum UE transmit power, the following power scaling is applied.

For power scaling, the PUCCH power should be prioritized and the remaining power may be used by PUSCH (i.e. PUSCH power is scaled down first, maybe to zero). Further, a PUSCH with uplink control information (UCI) is prioritized over PUSCH without UCI. Additionally, equal power scaling for PUSCH transmissions without UCI is considered.

As each component carrier can be assumed to have its own power control loop and each transport block on each component carrier is transmitted with a power individually set for the component carrier, power headroom reporting should be performed per component carrier. Since carrier aggregation can be seen as a multiplication of several LTE Rel. 8/9 (component) carriers, it can be assumed that also the power headroom reporting on the individual component carriers will reuse the LTE Rel. 8/9 power headroom reporting procedures.

Hence each user equipment transmits power headroom reports for each component carrier on that component carrier. This means that each component carrier that has an uplink transmission in a specific sub-frame could also transmit a power headroom report given that the conditions for sending such a report are fulfilled.

Power headroom reporting as know form LTE Rel. 8/9 is controlled, respectively triggered on a component carrier basis (by employing different timers). Applying this concept to the individual component carriers of a system utilizing carrier aggregation, this means that it almost never happens that within one sub-frame each of the component carriers with an uplink transmission is transmitting a power headroom report. Hence, even if the timers relating to power headroom reporting (the periodicPHR timer and the prohibitPHR timer) are set to the same values for all component carriers, synchronous power headroom reports on all component carriers within a sub-frame will only happen by chance.

FIG. 10 shows exemplary power headroom reporting in a LTE-A system, assuming that the power headroom reporting of LTE Rel. 8/9 is applied to each of the exemplary three component carriers (CoCa1 to CoCa3). At $T_1$, there is an uplink assignment on all three component carriers and an uplink transport block, respectively MAC PDU, including a power headroom report for the respective component carrier is sent on each component carrier. As there is a per-component carrier (per-CC) power headroom report for each component carrier, the eNodeB is informed on the user equipment's power status. Furthermore, the respective timers periodicPHR-Timer and prohibitPHR-Timer are restarted for each component carrier. For component carriers CoCa2 and CoCa3, it is assumed that after expiry of the periodicPHR-Timer there is no uplink allocation in the next sub-frame, so that no periodic power headroom report can be sent immediately. Hence at $T_2$, the user equipment transmits a transport block/MAC PDU with a power headroom report only on component carrier CoCa1. As there is only a resource assignment on component carrier CoCa1, the eNodeB may again conclude on the user equipment's power status from the per-CC power headroom report at $T_2$.

However at $T_3$, $T_4$ and $T_5$, only some transport blocks/PDUs of the component carriers within a sub-frame carry a power headroom report. Regarding the power headroom report on component carrier CoCa3 at $T_5$. A path-loss change on component carrier CoCa3 is assumed to trigger the power headroom report, but at the time of the path-loss change none of the component carriers with uplink transmissions (i.e. component carriers CoCa1 and CoCa2) have a power headroom report included. Therefore, $T_3$, $T_4$, and $T_5$, the eNodeB is not aware of the actual transmit power spend on the uplink transmissions within the respective sub-frames.

Furthermore, in LTE Rel.10 within the scope of carrier aggregation there are two maximum power limits, a total maximum UE transmit power $P_{CNMAX}$ and a component carrier-specific maximum transmit power $P_{CMAC,c}$. 3GPP RAN4 working group already indicated that both (nominal) maximum transmit power per user equipment $P_{CNMAX}$ and the (nominal) maximum component carrier-specific transmit power $P_{CMAC,c}$ should be the same regardless of the number of carriers supported, in order not to affect the link budget of a carrier aggregation capable user equipment in the single carrier operation mode.

Different to LTE Rel. 8/9, in LTE-A Rel. 10 the user equipment has also to cope with simultaneous PUSCH-PUCCH transmission, multi-cluster scheduling, and simultaneous transmission on multiple component carriers, which requires larger MPR values and also causes a larger variation of the applied MPR values compared to 3GPP Rel. 8/9.

It should be noted that the eNodeB does not have knowledge of the power reduction applied by the user equipment on each component carrier, since the actual power reduction depends on the type of allocation, the standardized MPR value and also on the user equipment implementation. Therefore eNodeB doesn't know the component carrier-specific maximum transmission power relative to which the user equipment calculates the power headroom. In LTE Rel. 8/9 for example the user equipment maximum transmit power $P_{CNMAX}$ can be within some certain range as described above ($P_{CMAX\_L} \leq P_{CMAX} \leq P_{CMAX\_H}$).

Due to the reduction of the component carrier-specific maximum transmission power $P_{CMAC,c}$, which is not known to eNodeB as explained above, the eNodeB cannot really know how close a user equipment is operating to its total maximum transmission power $P_{CNMAX}$. Therefore there might be situations where user equipment is exceeding the total user equipment maximum transmission power $P_{CNMAX}$ which would hence require power scaling. FIG. 26 shows an exemplary scenario where user equipment is power limited, i.e. applying power scaling on component carriers CC #1 and CC #2 configured in the uplink. Even though the user equipment is power limited, the component carrier-specific power headroom reports according to the LTE definitions indicate sufficiently large power headroom.

SUMMARY OF THE INVENTION

One object of the invention is to propose procedures that allow the eNodeB to recognize the power usage status of a user equipment in a mobile communication system using carrier aggregation.

The object is solved by the subject matter of the independent claims. Advantageous embodiments are subject to the dependent claims.

A first aspect of the invention is to enable to user equipment to indicate to the eNodeB when it is potentially becoming power limited or is power limited, i.e. when being close to using its total maximum UE transmit power (also referred to as "user equipment's total maximum transmit power", "total maximum UE transmit power of the user equipment" or "user equipment's total maximum UE transmit power" in the following) or the resource allocations and power control commands of the eNodeB would require using a transmit power exceeding the total maximum transmit power of the user equipment.

In line with this first aspect of the invention and in accordance with a first exemplary implementation the user equipment uses an indicator in the MAC protocol data units (MAC PDUs) of each sub-frame to signal to the eNodeB, whether the user equipment applied power scaling to the transmission (of the MAC PDUs) within the respective sub-frame. The indicator(s) may be for example included in one or more MAC sub-headers of the MAC PDUs.

In an enhancement of the first exemplary implementation, an indicator is provided for each configured (or alternatively for each active) component carrier in the uplink so as to allow the indication of the use of power scaling for individual component carriers in the uplink. For example, this may be realized by multiplexing respective indicators to the MAC PDUs transmitted by the user equipment on the respective configured (or alternatively active) component carriers in the uplink, so that the indicator can be associated to the configured (or alternatively active) component carrier on which it is transmitted.

If the an indication of the power status of the user equipment should be made prior to the user equipment actually reaching its total maximum UE transmit power, a threshold value (e.g. a certain percentage) could be defined relative to the total maximum UE transmit power, that when exceeded, triggers the user equipment to set an indicator. In this case, when set, the indicator would indicate to the eNodeB that the user equipment is close to using the total maximum UE transmit power (i.e. exceeded the threshold value). Also this indicator may be signaled for each configured uplink component carrier individually and may be for example included in one or more MAC sub-headers of the MAC PDUs.

Still in line with the first aspect and according to another, second exemplary implementation, if the user equipment needs to apply power scaling to a transmission of MAC PDUs in a given sub-frame, the user equipment is transmitting in this sub-frame a power headroom report for each configured (or alternatively for each active) uplink component carrier (also referred to as per-component carrier power headroom report(s)) together with an indicator that the per-component carrier power headroom report(s) are triggered by the estimated transmit power required for transmitting the MAC PDUs within the given sub-frame exceeding the total maximum transmit power of the user equipment (alternatively, the indicator could also be interpreted as an indication of power scaling having been applied to the transmissions within the given sub-frame by the user equipment due to this event).

Hence, in this second exemplary implementation, when the transmit power required for a transmission of the MAC PDUs on uplink component carriers within the respective sub-frame will exceed a total maximum transmit power of the user equipment, an aperiodic per-component carrier power headroom report for all the configured (or active) uplink component carrier(s) is triggered and sent by the user equipment. The indication of the trigger for the per-component carrier power headroom report(s) may be for example included in a MAC-sub header of a MAC PDU carrying a per-component carrier power headroom report in a MAC control element.

This second exemplary implementation may also be modified so as to signal an indication of the power status of the user equipment should prior to the user equipment actually reaching its total maximum UE transmit power. Again, a threshold value (e.g. a certain percentage) could be defined relative to the total maximum UE transmit power, that when exceeded, triggers the user equipment to send a power headroom report for each configured uplink component carrier.

Furthermore, a power headroom report for each configured (or alternatively for each active) uplink component carrier may be optionally sent together with an indication that the respective power headroom report was triggered by exceeding the total maximum transmit power of the user equipment or a threshold relative thereto. For example, such indication could be comprised in a MAC sub-header of a MAC control element conveying a power headroom report for a configured uplink component carrier of the user equipment.

According to a further, third exemplary implementation in line with the first aspect of the invention, the user equipment is indicating to the eNodeB the amount of power reduction applied to the maximum transmit power of a component carrier. Alternatively, instead of the power reduction, the maximum transmit power of each configured uplink component carrier (after having applied the component carrier-specific power reduction) could be signaled to the eNodeB.

The amount of power reduction may be for example signaled per configured or per active uplink component carrier.

In one further example, the amount of power reduction applied to the maximum transmit power of a component carrier is signaled together with a power headroom report for each configured uplink component carrier to the eNodeB.

The information on the user equipment's power status may be signaled in form of one or more MAC control elements that are comprised within the MAC PDU(s) of a given sub-frame. Furthermore, the signaled power status information enables the eNodeB to derive the power status for each user equipment that is signaling its power status information. The scheduler of the eNodeB may for example take into account the power status of the respective user equipments in its dynamic and/or semi-persistent resource allocations to the respective user equipments.

In another fourth exemplary implementation in line with the first aspect of the invention, the user equipment is enabled to indicate to the eNodeB when it is potentially becoming power limited or is power limited by defining a new MAC control element that is inserted by the user equipment to one or more protocol data units transmitted on respective (assigned) component carriers within a single sub-frame that is providing the eNodeB with a corresponding indication.

Furthermore, in addition to the indication of the user equipment approaching its total maximum UE transmit power, the control element inserted to the protocol data units may further indicate a per-user equipment (per-UE) power headroom. For example, the per-user equipment power headroom indicates the transmit power unused by the user equipment when transmitting the protocol data units (including the MAC control element) within the sub-frame relative to the user equipment's total maximum UE transmit power.

The MAC control element may be inserted to the protocol data units of a sub-frame. For example, the MAC control element may be inserted into one of the protocol data units transmitted by the user equipment within the sub-frame or all of the protocol data units transmitted by the user equipment within the sub-frame.

In another exemplary, fifth implementation and in line with the first aspect of the invention, the object is solved by the user equipment sending per-component carrier power headroom reports for all assigned component carriers within a single sub-frame when the user equipment is potentially becoming power limited or is power limited, i.e. when being close to using its total maximum UE transmit power or the resource allocations and power control commands of the eNodeB would require using a transmit power exceeding the user equipment's total maximum UE transmit power.

Another second aspect of the invention is to suggest a definition for a per-component carrier power headroom when reporting the power headroom in a mobile communication system using carrier aggregation in the uplink. According to one exemplary definition, per-component carrier power headroom of a configured (or alternatively active) uplink component carrier is defined as the difference between the maximum transmit power of the configured uplink component carrier and the used uplink transmit power.

The used uplink transmit power is the power used (or emitted) by the user equipment for the transmission of the MAC PDUs within the given sub-frame. The used uplink transmit power may also be referred to as the transmitted PUSCH power. The used uplink transmit power is therefore considering power scaling (if applied to the transmission). Therefore, the used transmit power may be different from the estimated transmit power which is the transmit power required for a transmission of the MAC PDUs on uplink component carriers within the respective sub-frame as a result of the power control formula.

Alternatively, a power headroom of a configured uplink component carrier may be defined as the difference between the maximum transmit power of the configured uplink component carrier and an estimated PUSCH power. The PUSCH power is for example calculated by the power control formula for the respective component carrier.

Furthermore, the maximum transmit power of the (configured) uplink component carrier may take into according a power reduction due to simultaneous transmissions on another or other uplink component carriers in the sub-frame. Optionally, the power headroom reports are sent for active uplink component carriers of the user equipment only.

The per-component carrier power headroom according to the second aspect of the invention may be provided in form of a per-component carrier power headroom report. The per-component carrier power headroom report is for example signaled in form of a MAC control element within a MAC PDU. As mentioned above, the MAC control element carrying the per-component carrier power headroom report may be associated to a MAC sub-header in a header section of the MAC PDU that can be further employed to indicate that the per-component carrier power headroom is triggered by a power limited situation of the user equipment requiring power scaling.

In all aspects of the invention and also in all embodiments and exemplary implementations described herein, the user equipment may optionally report only on configured component carriers that are active, which may be referred to as active component carriers (i.e. indicators, power headroom reports, etc. may only be signaled for active component carriers only). This may be for example advantageous, if the configuration and (de)activation of uplink component carriers of a user equipment can be controlled separately.

One embodiment of the invention relates to a method for informing an eNodeB on the transmit power status of a user equipment in a mobile communication system using component carrier aggregation. This method comprises the following steps performed by the user equipment for each sub-frame where the user equipment makes a transmission in the uplink. The user equipment determines whether an estimated transmit power required for a transmission of MAC protocol data units on the uplink component carriers within the respective sub-frame will exceed a total maximum transmit power of the user equipment. If so, the user equipment performs a power scaling of the transmit power to reduce the transmit power required for the transmission of the MAC protocol data units such that it is no longer exceeding the total maximum transmit power of the user equipment, and transmits the MAC protocol data units to the eNodeB within the respective sub-frame. The transmitted MAC protocol data units comprise an indicator that indicates to the eNodeB whether power scaling has been performed by the user equipment for transmitting the MAC protocol data units in the respective sub-frame.

The indicator may be for example comprised within a MAC header of at least one of the MAC protocol data units. For example, the indicator may be a flag within one or more of the MAC sub-headers of a respective MAC header comprised in the at least one MAC protocol data unit.

Furthermore, in a more advanced exemplary embodiment of the invention, the power scaling may be performed for each configured uplink component carrier individually. For each uplink component carrier on which a MAC protocol data unit is transmitted, at least one MAC protocol data unit transmitted on the respective uplink component carrier comprises an indicator that indicates to the eNodeB whether power scaling has been applied to the transmission on the respective uplink component carrier within the sub-frame.

Another embodiment of the invention provides a further method for informing an eNodeB on the transmit power status of a user equipment in a mobile communication system using component carrier aggregation. According to this embodiment, a user equipment determines whether an estimated transmit power required for a transmission of MAC protocol data units on uplink component carriers within the respective sub-frame will exceed a total maximum transmit power of the user equipment. If this is the case, the user equipment performs a power scaling of the transmit power to reduce the transmit power required for the transmission of the MAC protocol data units such that it is no longer exceeding the total maximum transmit power of the user equipment, and further triggers the generation of a power headroom report for each configured uplink component carrier of the user equipment. The user equipment transmits the MAC protocol data units to the eNodeB within the respective sub-frame together with a power headroom report for each configured uplink component carrier of the user equipment and an indication of the power headroom report(s) having been triggered by the transmit power required for a transmission of MAC protocol data units on uplink component carriers exceeding the total maximum transmit power of the user equipment.

Furthermore, the user equipment may optionally further determine, in response to the trigger, a power headroom report for each configured uplink component carrier of the user equipment, wherein the power headroom for a configured uplink component carrier is defined as the difference between the maximum transmit power of the configured uplink component carrier and the used uplink transmit power. Hence, this definition of the power headroom considers power scaling.

Alternatively, or in addition thereto, the user equipment may determine, in response to the trigger, a power headroom report for each configured uplink component carrier of the user equipment, wherein the power headroom of a configured uplink component carrier is defined as the difference between the maximum transmit power of the configured uplink component carrier and the estimated uplink transmit power on the respective component carrier. Therefore, this alternative definition of the power headroom is not considering power scaling.

Optionally, the power headroom according to both definitions above may be determined by the user equipment for each configured uplink component carrier and may be provided to the eNodeB within a power headroom report.

In a further exemplary embodiment of the method, the power reduction applied to the maximum transmit power of a configured uplink component carrier that is determined by the user equipment considers transmission(s) on other configured uplink component carrier(s) of the user equipment within the sub-frame.

Moreover, according to another exemplary embodiment, the indication of the power headroom report(s) having been triggered by the estimated transmit power exceeding the total maximum transmit power of the user equipment is provided by setting a flag in a MAC sub-header for a MAC control element carrying at least one of the power headroom reports(s). For example, a MAC sub-header could be included in a header section of the MAC protocol data unit to which the MAC control element is multiplexed for each MAC control element comprising a respective power headroom report. A flag in the MAC sub-header indicates that the power headroom report within the MAC control element has been triggered by the estimated transmit power required for a transmission of MAC protocol data units on uplink component carriers within the respective sub-frame exceeding the total maximum transmit power of the user equipment.

In another exemplary embodiment, a further method for informing an eNodeB on the transmit power status of a user equipment in a mobile communication system using component carrier aggregation. Optionally, this method may be performed for each sub-frame where the user equipment makes a transmission in the uplink. According to the method, the user equipment determines whether an estimated transmit power required for a transmission of MAC protocol data units on the uplink component carriers within the respective sub-frame will exceed a total maximum transmit power of the user equipment. If this is the case, the user equipment performs a power scaling of the transmit power to reduce the transmit power required for the transmission of the MAC protocol data units such that it is no longer exceeding a total maximum transmit power of the user equipment, and transmits the MAC protocol data units to the eNodeB within the respective sub-frame. The transmitted MAC protocol data units comprise at least one MAC control element indicating the amount of power reduction applied to the maximum transmit power of the user equipment for the configured uplink component carriers.

Alternatively, the user equipment could signal the maximum transmit power of the user equipment for the configured uplink component carriers, which may however imply more overhead in the signaling than signaling the amount of power reduction at the same level of granularity.

Optionally, the MAC control element(s) indicating the amount of power reduction for the configured uplink component carriers could be included to the MAC PDUs within a sub-frame only, if the estimated transmit power required for a transmission of MAC protocol data units on the uplink component carriers within the respective sub-frame will exceed the total maximum transmit power of the user equipment, i.e. if the user equipment has to apply power scaling.

In one more detailed exemplary embodiment of this method, it may be assumed that power scaling is performed for each configured uplink component carrier individually. For each uplink component carrier on which a MAC protocol data unit is transmitted, at least one MAC protocol data unit transmitted on the respective uplink component carrier comprises a MAC control element that indicates the amount of power reduction applied to the maximum transmit power of the respective uplink component carriers.

According to a further exemplary embodiment of the invention, in case the estimated transmit power required for a transmission of MAC protocol data units on the uplink component carriers within the respective sub-frame will exceed the total maximum transmit power of the user equipment, the user equipment further generates a power headroom report for each configured uplink component carrier and transmits the power headroom reports together with the MAC protocol data units including the MAC control element for reporting the power reduction to the eNodeB.

According to another exemplary embodiment of the invention, the user equipment signals the power reduction and a power headroom report for the respective configured uplink component carrier in response to the (de)activation of an uplink component carrier or in response to a predefined change of the amount of power reduction applied to the maximum transmit power for a uplink component carrier.

In another embodiment of the invention, the format of the MAC control element signaling the amount of power reduction is identified by
- a predetermined logical channel identifier defined for MAC control elements signaling the amount of power reduction, or
- a predetermined logical channel identifier defined for MAC control elements signaling a power headroom report and one or more flags, included in the MAC sub-header of the MAC control element.

The different exemplary embodiments of the method for informing an eNodeB on the transmit power status of a user equipment may—according to another embodiment of the invention—comprise the steps of receiving by the user equipment at least one uplink resource assignment, wherein each uplink resource assignment is assigning resources for the transmission of at least one of the MAC protocol data units on one of the plural component carriers to the user equipment, and generating for each received uplink resource assignment at least one of the MAC protocol data units for transmission on the respective assigned component carrier. Each MAC protocol data unit is transmitted via a corresponding one of the component carriers according to one of the received resource assignments (Please note that in case MIMO is used, two MAC PDUs may be transmitted via an uplink component carrier on which resources have been granted to the user equipment). The generation of the protocol data units may be for example performed by executing a logical channel prioritization procedure.

In line with the second aspect of the invention and according to another exemplary embodiment of the invention, a MAC control element for transmission from a user equipment to an eNodeB in a mobile communication system using component carrier aggregation is provided. According to this embodiment the MAC control element comprises a power headroom report for a configured uplink component carrier that reports the difference between the maximum transmit power of the configured uplink component carrier and a transmitted PUSCH power (or the used uplink transmit power).

In one example the transmitted PUSCH power $P^{PS}_{PUSCH,c}(i)$ of the sub-frame i is defined by $$P^{PS}_{PUSCH,c}(i) = PSF_c \cdot \min\{P_{CMAX,c}, 10 \log_{10}(M_{PUSCH,c}(i)) + P_{0\_PUSCH,c}(j) + \alpha_c(j) \cdot PL_c + \Delta_{TF,c}(i) + f_c(i)\}$$

where $PSF_c$ is the power scaling factor applied for the respective configured uplink component carrier c.

Furthermore, in another exemplary embodiment of the invention, the MAC control element may further comprise a power headroom report of the configured uplink component carrier that reports the difference between the maximum transmit power of the configured uplink component carrier and an estimated PUSCH power (or estimated uplink transmit power on the respective component carrier).

Still in line with the second aspect of the invention and according to an alternative exemplary embodiment of the invention, another MAC control element for transmission from a user equipment to an eNodeB in a mobile communication system using component carrier aggregation is provided. This MAC control element comprises a power headroom report of the configured uplink component carrier that reports the difference between the maximum transmit power of the configured uplink component carrier and an estimated PUSCH power.

In both embodiments of the MAC control element, the maximum transmit power of the configured uplink component carrier considers a power reduction due to transmission(s) on other configured uplink component carrier(s) of the user equipment.

Another exemplary embodiment of the invention is related to a MAC protocol data unit for transmission from a user equipment to a eNodeB in a mobile communication system using component carrier aggregation. The MAC protocol data unit comprises a MAC control element including a power headroom report according to one of the different embodiments described herein and a MAC sub-header. The MAC sub-header comprises an indicator, that when set, indicates to the eNodeB that the power headroom report has been triggered by the transmit power required for a transmission of MAC protocol data units on uplink component carriers exceeding the total maximum transmit power of the user equipment.

Furthermore, the invention also relates to the realization of the methods for informing an eNodeB on the transmit power status of a user equipment in hardware and/or by means of software modules. Accordingly, another embodiment of the invention is related to a user equipment for informing an eNodeB on the transmit power status of a user equipment in a mobile communication system using component carrier aggregation. The user equipment comprises a determination section that determines whether an estimated transmit power required for a transmission of MAC protocol data units on the uplink component carriers within the respective sub-frame will exceed a total maximum transmit power of the user equipment. Furthermore, the user equipment comprises a power control section that performs a power scaling of the transmit power to reduce the transmit power required for the transmission of the MAC protocol data units such that it is no longer exceeding the total maximum transmit power of the user equipment, and a transmission section for transmitting the MAC protocol data units to the eNodeB within the respective sub-frame. The transmitted MAC protocol data units comprise an indicator that indicates to the eNodeB whether power scaling has been performed by the user equipment for transmitting the MAC protocol data units in the respective sub-frame.

Another exemplary embodiment provides a user equipment for informing an eNodeB on the transmit power status of a user equipment in a mobile communication system using component carrier aggregation. The user equipment comprises a determination section adapted to determine whether an estimated transmit power required for a transmission of MAC protocol data units on uplink component carriers within the respective sub-frame will exceed a total maximum transmit power of the user equipment, and to trigger the generation of a power headroom report for each configured uplink component carrier of the user equipment, and further a power control section adapted to perform a power scaling of the transmit power to reduce the transmit power required for the transmission of the MAC protocol data units such that it is no longer exceeding the total maximum transmit power of the user equipment. Moreover, the user equipment includes a transmission section adapted to transmit the MAC protocol data units to the eNodeB within the respective sub-frame together with a power headroom report for each configured uplink component carrier of the user equipment and an indication of the power headroom report(s) having been triggered by the transmit power required for a transmission of MAC protocol data units on uplink component carriers exceeding the total maximum transmit power of the user equipment.

In further embodiment of the invention, the user equipment comprises a determination section adapted to determine whether an estimated transmit power required for a transmission of MAC protocol data units on the uplink component carriers within the respective sub-frame will exceed a total maximum transmit power of the user equipment, and a power control section adapted to perform a power scaling of the transmit power to reduce the transmit power required for the transmission of the MAC protocol data units such that it is no longer exceeding the total maximum transmit power of the user equipment, and further a transmission section adapted to transmit the MAC protocol data units to the eNodeB within the respective sub-frame. The transmitted MAC protocol data units comprise at least one MAC control element indicating the amount of power reduction applied to the maximum transmit power of the user equipment for the configured uplink component carriers.

Furthermore, according to another embodiment of the invention, the user equipment is adapted to perform the steps of the methods for informing an eNodeB on the transmit power status of a user equipment according to one of the various embodiments described herein.

Another embodiment of the invention provides a computer readable medium storing instructions that, when executed by a processor of a user equipment, cause the user equipment to inform an eNodeB on the transmit power status of a user equipment for each sub-frame where the to be transmitted by the user equipment makes a transmission in the in the uplink within a mobile communication system using component carrier aggregation, by determining whether an estimated transmit power required for a transmission of MAC protocol data units on the uplink component carriers within the respective sub-frame will exceed a total maximum transmit power of the user equipment, and if so, performing a power scaling of the transmit power to reduce the transmit power required for the transmission of the MAC protocol data units such that it is no longer exceeding the total maximum transmit power of the user equipment, and transmitting the MAC protocol data units to the eNodeB within the respective sub-frame. The transmitted MAC protocol data units comprise an indicator that indicates to the eNodeB whether power scaling has been performed by the user equipment for transmitting the MAC protocol data units in the respective sub-frame.

A computer readable medium of another embodiment of the invention is storing instructions that, when executed by a processor of a user equipment, cause the user equipment to inform an eNodeB on the transmit power status of a user equipment in a mobile communication system using component carrier aggregation, by determining whether an estimated transmit power required for a transmission of MAC protocol data units on uplink component carriers within the respective sub-frame will exceed a total maximum transmit power of the user equipment, and if so, performing a power scaling of the transmit power to reduce the transmit power required for the transmission of the MAC protocol data units such that it is no longer exceeding the total maximum transmit power of the user equipment, and triggering the generation of a power headroom report for each configured uplink component carrier of the user equipment, and transmitting the MAC protocol data units to the eNodeB within the respective sub-frame together with a power headroom report for each configured uplink component carrier of the user equipment and an indication of the power headroom report(s) having been triggered by the transmit power required for a transmission of MAC protocol data units on uplink component carriers exceeding the total maximum transmit power of the user equipment.

According to a further embodiment of the invention, a computer readable medium storing instructions is provided. The instructions, when executed by a processor of a user equipment, cause the user equipment to inform an eNodeB on the transmit power status of a user equipment for each sub-frame where the to be transmitted by the user equipment makes a transmission in the in the uplink within a mobile communication system using component carrier aggregation, by determining whether an estimated transmit power required for a transmission of MAC protocol data units on the uplink component carriers within the respective sub-frame will exceed a total maximum transmit power of the user equipment, and if so, performing a power scaling of the transmit power to reduce the transmit power required for the transmission of the MAC protocol data units such that it is no longer exceeding the total maximum transmit power of the user equipment, and transmitting the MAC protocol data units to the eNodeB within the respective sub-frame, wherein the transmitted MAC protocol data units comprise at least one MAC control element indicating the amount of power reduction applied to the maximum transmit power of the user equipment for the configured uplink component carriers.

Furthermore, according to another embodiment of the invention, the computer readable medium may further store instructions that when executed cause the user equipment to perform the steps of the methods for informing an eNodeB on the transmit power status of a user equipment according to one of the various embodiments described herein.

Another embodiment of the invention related to the first aspect of the invention provides a method for informing an eNodeB on the power status of a user equipment in a mobile communication system using component carrier aggregation. The user equipment determines whether an estimated transmit power required for transmitting protocol data units on respective component carriers within a sub-frame will exceed a threshold value relative to a total maximum UE transmit power of the user equipment. If the threshold value is exceeded, the user equipment multiplexes a MAC control element to the protocol data units and transmits the protocol data units including the MAC control element to the eNodeB within the sub-frame. The MAC control element indicates to the eNodeB that the transmit power spent by the user equipment for transmitting the generated protocol data units on uplink exceeded the threshold value, i.e. is reporting the power headroom per-user equipment. The threshold value may be for example defined as a percentage of the maximum the user equipment is allowed to use.

According to a further embodiment of the invention, the MAC control element provides the eNodeB with a per-user equipment power headroom relative to all uplink protocol data units transmitted in the sub-frame. For example, in a 3GPP-based communication system such as LTE-Advanced, the per-user equipment power headroom could account for all transmissions on a physical uplink shared channel (PUSCH) and a physical uplink control channel (PUCCH) within the sub-frame.

In another embodiment of the invention, at least one uplink resource assignment is received, wherein each uplink resource assignment is assigning resources for the transmission of one of the protocol data units on one of the plural component carriers to the user equipment. For each received uplink resource assignment a protocol data unit is generated for transmission on the respective assigned component carrier. Each protocol data unit is transmitted via a corresponding one of the component carriers according to one of the received resource assignments.

According another embodiment of the invention, generating for each received uplink resource assignment a protocol data unit comprises said multiplexing of the MAC control element to at least one of said protocol data units. In a further embodiment of the invention the MAC control element is multiplexed to one of the protocol data units or to each of the protocol data units. The protocol data units may be for example generated by executing a joint logical channel prioritization procedure.

According to an advantageous embodiment of the invention, the component carriers each have a priority, and the MAC control element is multiplexed to the protocol data unit to be transmitted on the highest priority component carrier for which a resource assignment has been received.

In an alternative embodiment of the invention, the component carriers each have a priority, and the MAC control element is multiplexed to the protocol data unit to be transmitted on the component carrier achieving the lowest block error rate, having the largest power headroom or experiencing the best channel quality, and for which a resource assignment has been received.

With regard to a further embodiment of the invention, the estimated transmit power is estimated based on the resource assignments for the protocol data units to be transmitted in the sub-frame and the status of a transmit power control function.

According to further embodiment of the invention radio resource control signaling is received from the eNodeB indicating said threshold value as a percentage of the maximum the user equipment is allowed to use. The threshold value is configured according to the indicated percentage.

Another embodiment of the invention provides another alternative method for informing an eNodeB on the power status of a user equipment in a mobile communication system using component carrier aggregation. Protocol data units are transmitted in each of a predetermined number of successive sub-frames (monitoring period) from the user equipment to the eNodeB. At the user equipment a MAC control element is multiplexed to the protocol data units of the last sub-frame of said predetermined number of successive sub-frames transmitted by the user equipment, if one of the following conditions is met:

the transmit power required for transmitting the protocol data units in each of the successive sub-frames exceeds a threshold value relative to the user equipment's total maximum UE transmit power, or the transmit power required for transmitting protocol data units in a subset of sub-frames of said successive sub-frames exceeds a threshold value relative to the user equipment's total maximum UE transmit power, or the average transmit power required for transmitting the protocol data units in said successive sub-frames exceeds a threshold value relative to the user equipment's total maximum UE transmit power.

The MAC control element thus indicates to the eNodeB that the respective condition was met.

In a further embodiment of the invention the number of sub-frames of said subset is configured by RRC control signaling received at the user equipment from the eNodeB or is predefined.

According to another embodiment of the invention, a MAC control element for transmission from a user equipment to a eNodeB in a mobile communication system using component carrier aggregation is provided. The MAC control element comprises a power headroom field consisting of a predetermined number of bits for comprising a per-user equipment power headroom with respect to all uplink transmissions of the user equipment on a plurality of component carriers within a sub-frame containing the MAC control element, relative to the total maximum UE transmit power of the user equipment.

In a further advantageous embodiment of the invention, the MAC control element comprises a component carrier indicator field for indicating the number of component carrier for which the user equipment has received resource assignments, or a bitmap indicating the component carriers for which the user equipment has received resource assignments.

In another embodiment of the invention, the power headroom field comprises either said per-user equipment power headroom or a per-component carrier power headroom. The MAC control element comprises a component carrier indicator field that is indicating whether the power headroom field comprises said per-user equipment power headroom or said per-component carrier power headroom.

An additional embodiment of the invention provides a MAC protocol data unit for transmission from a user equipment to a eNodeB in a mobile communication system using component carrier aggregation. The MAC protocol data unit comprises a MAC sub-header and a MAC control element according to one of the embodiments thereof described herein. The MAC sub-header comprises a logical channel identifier (LCID) that is indicating the content and format of said MAC control element.

According to another embodiment of the invention, a user equipment is provided for informing a eNodeB on the power status of a user equipment in a mobile communication system using component carrier aggregation. An determining section of the user equipment determines whether an estimated transmit power required for transmitting protocol data units on respective component carriers within a sub-frame will exceed a threshold value relative to a total maximum UE transmit power of the user equipment. A protocol data unit generation section of the user equipment multiplexes a MAC control element to the protocol data units, if the threshold value is exceeded. A transmitting section of the user equipment transmits the protocol data units including the MAC control element to the eNodeB within the sub-frame. The MAC control element indicates to the eNodeB that the transmit power spent by the user equipment for transmitting the generated protocol data units on uplink exceeded the threshold value.

In an advantageous embodiment of the invention the MAC control element provides the eNodeB with a per-user equipment power headroom relative to all uplink protocol data units transmitted in the sub-frame.

For another embodiment of the invention a receiving section of the user equipment receives at least one uplink resource assignment. Each uplink resource assignment is assigning resources for the transmission of one of the protocol data units on one of the plural component carriers to the user equipment. A protocol data unit generation section of the user equipment generates for each received uplink resource assignment a protocol data unit for transmission on the respective assigned component carrier. The transmitting section transmits each protocol data unit via a corresponding one of the component carriers according to one of the received resource assignments.

According to a further embodiment of the invention, the component carriers each have a priority, and a protocol data unit generation section of the user equipment multiplexes the MAC control element to the protocol data unit to be transmitted on the highest priority component carrier for which a resource assignment has been received.

With regard to another embodiment of the invention, the component carriers each have a priority, and a protocol data unit generation section of the user equipment multiplexes the MAC control element to the protocol data unit to be transmitted on the component carrier achieving the lowest block error rate, having the largest power headroom or experiencing the best channel quality, and for which a resource assignment has been received.

In a further embodiment of the invention a power control section of the user equipment performs power control, and the determining section determines the estimated transmit power based on the resource assignment for the protocol data units to be transmitted in the sub-frame and the status of a transmission power control section.

According to an advantageous embodiment of the invention, a receiving section of the user equipment receives radio resource control signaling from the eNodeB indicating said threshold value as a percentage of the maximum the user equipment is allowed to use. A configuration section of the user equipment configures the threshold value according to the indicated percentage.

A further embodiment of the invention provides a computer readable medium storing instructions that, when executed by a processor of a user equipment, cause the user equipment to inform am eNodeB on the power status of a user equipment in a mobile communication system using component carrier aggregation. This is done as follows. It is determined whether an estimated transmit power required for transmitting protocol data units on respective component carriers within a sub-frame will exceed a threshold value relative to a total maximum UE transmit power of the user equipment. If the threshold value is exceeded, a MAC control element is multiplexed to the protocol data units. The protocol data units including the MAC control element are transmitted to the eNodeB within the sub-frame. The MAC control element indicates to the eNodeB that the transmit power spent by the user equipment for transmitting the generated protocol data units on uplink exceeded the threshold value.

BRIEF DESCRIPTION OF THE FIGURES

In the following the invention is described in more detail in reference to the attached figures and drawings. Similar or corresponding details in the figures are marked with the same reference numerals.

FIGS. 3 and 4 show an exemplary localized allocation and distributed allocation of the uplink bandwidth in a single carrier FDMA scheme.

DETAILED DESCRIPTION OF THE INVENTION

Figure 1:
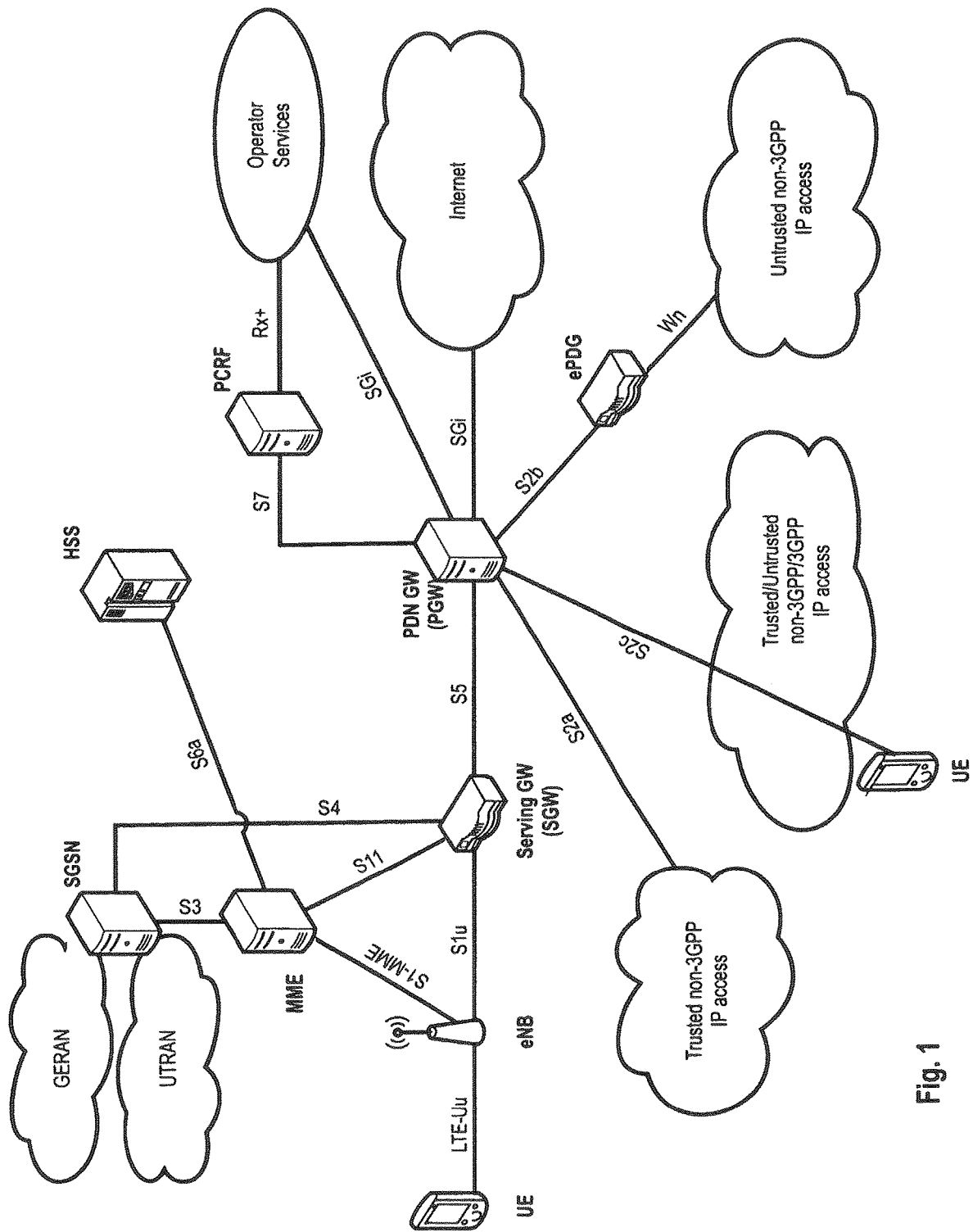
FIG. 1 shows an exemplary architecture of a 3GPP LTE system.
Figure 2:
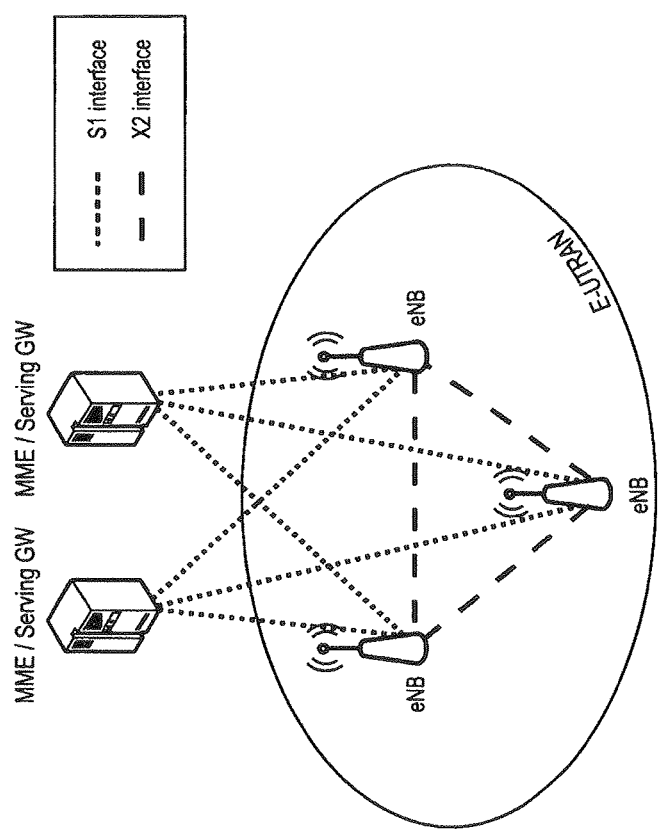
FIG. 2 shows an exemplary overview of the overall E-UTRAN architecture of LTE.
Figure 5:
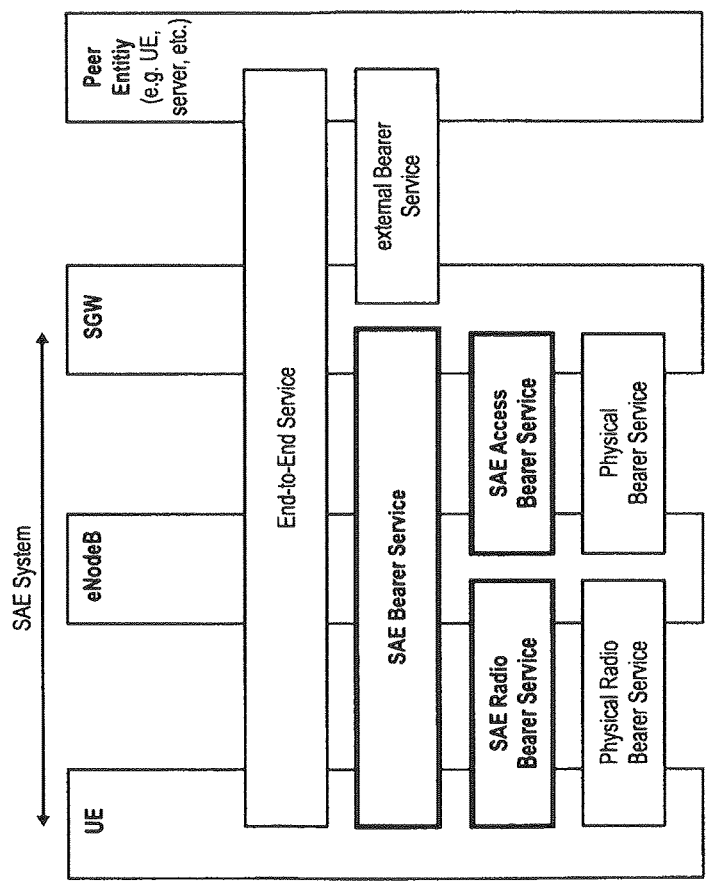
FIG. 5 shows an exemplary SAE Bearer Architecture.

The following paragraphs will describe various embodiments of the invention. For exemplary purposes only, most of the embodiments are outlined in relation to an orthogonal single-carrier uplink radio access scheme according to the LTE-Advanced (LTE-A) mobile communication system discussed in the Technical Background section above. It should be noted that the invention may be advantageously used for example in connection with a mobile communication system such as the LTE-Advanced communication system previously described, but the invention is not limited to its use in this particular exemplary communication network.

The explanations given in the Technical Background section above are intended to better understand the mostly LTE-Advanced specific exemplary embodiments described herein and should not be understood as limiting the invention to the described specific implementations of processes and functions in the mobile communication network. Nevertheless, the improvements proposed herein may be readily applied in the architectures/systems described in the Technical Background section and may in some embodiments of the invention also make use of standard and improved procedures of theses architectures/systems.

In the following exemplary description of the aspects and embodiments of the invention, it is assumed that the transmit power available for uplink transmissions in a user equipment (total maximum UE transmit power) is not set per component carrier, but per user equipment. As a consequence the power setting in one component carrier has influence on the power setting in another component carrier. If user equipment includes only power headroom reports of some of the assigned component carriers, the eNodeB cannot determine how much power was actually spent by the user equipment for transmitting the sub-frame and if the user equipment still has power available to a transmission with increased power (i.e. there is a power headroom) in one of the following sub-frames or if there were already problems and the user equipment reached it's power limit, hence already transmitting on some of the component carriers with less power than was demanded by eNodeB. The UE reaching its power limit means that the UE is utilizing or exceeding the total maximum UE transmit power it has available for uplink transmission.

As mentioned earlier herein, one first aspect of the invention is to enable to UE to indicate to the eNodeB when it is potentially becoming power limited or is power limited, i.e. when being close to using its total maximum UE transmit power (also referred to as "user equipment's total maximum transmit power", "total maximum UE transmit power of the user equipment" or "user equipment's total maximum UE transmit power" in the following) or the resource allocations and power control commands of the eNodeB would require using a transmit power exceeding the user equipment's total maximum UE transmit power.

Please note that in this document, the transmission of (MAC) protocol data units or transport blocks in a sub-frame means that there has been a resource allocation for a respective one of the protocol data units on a respective one of the component carriers usable by the user equipment. Usable means that the user equipment can be assigned resources on each of these component carriers—however, the component carriers on which the user equipment is allowed to transmit data (in form of protocol data units or transport blocks) within a given sub-frame is decided by the scheduler (e.g. implemented in the eNodeB) and is controlled by the resource assignments to the user equipment.

The usable (uplink) component carriers of a user equipment are also referred to as configured (uplink) component carriers herein. In most examples herein, it is assumed that the configured component carriers are active, i.e. configured component carrier and active component carrier are synonyms. In this case, it can be assumed that the user equipment can be scheduled on the configured component carriers. Accordingly, the power status of the user equipment will be reported for component carriers for which the user equipment can receive a resource allocation from the scheduler, i.e. the configured component carriers (or available component carriers).

Please note that besides a configured/non-configured state of a component carrier, there may be optionally an additional active/inactive state defined for a configured component carrier. In this case, the user equipment may receive a resource allocation for a component carrier that is configured and active i.e. the user equipment is monitoring for resource assignments (e.g. PDCCH) allocating uplink resources on those configured respectively activated uplink component carriers. The invention may also be applied in systems where these two kinds of states are distinguished, for example, where a component carrier may have the states: non-configured, configured but inactive ("inactive"), and configured and active ("active"). In these systems, the power status reporting for a user equipment according to one of the different aspects discussed herein may be performed only for the active component carriers of the user equipment in the uplink. Further, for these type of systems, the configured component carriers mentioned in the different exemplary embodiments of the invention herein would correspond to configured and active component carriers (or active component carriers for short).

Furthermore, in this document, a transmission on an "assigned component carrier" refers to a transmission of a protocol data unit (MAC PDU) on a component carrier for which the user equipment has received a resource assignment (also referred to as scheduling grant, grant (for short) or PDCCH).

In one exemplary implementation of the first aspect of the invention, the user equipment signals its uplink power status by means of an indicator to the eNodeB that is indicating whether the user equipment applied power scaling to the transmission power within the respective sub-frame. The indicator may be provided for each configured or assigned component carrier individually, i.e. the user equipment may include multiple indicators to the protocol data units to indicate for each assigned component carrier, whether the user equipment has scaled down the transmission power for the transmission on the respective component carrier. For example, the indicator(s) may be transmitted by the user equipment in the protocol data units (MAC PDUs) of each sub-frame. The indicator(s) may be for example included in one or more MAC sub-headers of the MAC PDUs.

In case the power status indicator should be provided per assigned component carrier, the respective indicators may be for example multiplexed to the protocol data units (MAC PDUs) transmitted by the user equipment on the respective assigned component carriers in the uplink, such that each of the indicators can be associated to a respective configured component carrier. For example, this may be realized by ensuring that the power status indicator for a given component carrier is multiplexed to a protocol data unit (MAC PDU) that is transmitted on the given component carrier.

If the an indication of the power status of the user equipment should be made prior to the user equipment actually reaching its total maximum UE transmit power (pro-active indication of the uplink power status), one or more threshold values (e.g. certain percentage(s)) could be defined relative to the total maximum UE transmit power, that when exceeded, trigger(s) the user equipment to set the power status indicator. When set, the indicator would indicate to the eNodeB that the user equipment is close to using the total maximum UE transmit power (i.e. exceeded the threshold value).

Optionally, the power status indicator and threshold value(s) could be defined per configured or assigned component carrier individually relative to the maximum transport power of the respective configured component carrier. Hence, the indicator may be signaled for each configured assigned uplink component carrier individually and may be for example included in one or more MAC sub-headers of the MAC PDUs.

In another, second exemplary implementation of the first aspect of the invention the user equipment is transmitting a power headroom report for each configured uplink component carrier (also referred to as per-component carrier power headroom report(s)), if the user equipment has to apply power scaling to a transmission of MAC PDUs in a given sub-frame in view of the resource allocations and power control commands. The per-component carrier (per-CC) power headroom report(s) are transmitted together with an indicator that the per-CC power headroom report(s) has/have been triggered by the estimated transmit power required for transmitting the protocol data units within the given sub-frame exceeding the total maximum transmit power of the user equipment. Alternatively, the indicator could also be interpreted as an indication of power scaling having been applied to the transmissions within the given sub-frame by the user equipment due to this event.

Hence, in when the transmit power required for a transmission of the protocol data units on uplink component carriers within the respective sub-frame will exceed a total maximum transmit power of the user equipment, an aperiodic per-CC power headroom report for all configured uplink component carrier(s) is triggered and sent by the user equipment. The indication of the trigger for the per-CC power headroom report(s) being may be for example included in a MAC-sub header of a MAC PDU carrying a per-CC power headroom report in a MAC control element.

This second exemplary implementation may also be adapted to pro-actively report the power status of the user equipment. Similar to the example described above, one or more threshold values may be defined relative to the total maximum UE transmit power, that when exceeded, triggers the user equipment to send a power headroom report for each configured uplink component carrier. If there is no grant available for a component carrier, the user equipment may for example calculate the power headroom from this component carrier based on some predefined uplink grant or respectively predefined PUSCH power.

Furthermore, a power headroom report for each configured uplink component carrier may be optionally sent together with an indication that the respective power headroom report was triggered by exceeding the total maximum transmit power of the user equipment or a threshold relative thereto. For example, such indication could be comprised in a MAC sub-header of a MAC control element conveying a power headroom report for a configured uplink component carrier of the user equipment.

According to a further, third exemplary implementation of the first aspect of the invention, the user equipment reports to the eNodeB the amount of power reduction applied to the maximum transmit power of a component carrier. Alternatively, instead of the power reduction for a component carrier, the effective maximum transmit power of the configured uplink component carrier after applying the component carrier-specific power reduction could be signaled to the eNodeB.

The amount of power reduction may be for example signaled per configured uplink component carrier of the user equipment. If the power reduction for a given component carrier is considering the transmissions on other configured component carriers, the power reduction applied to the component carriers might become equal (but not necessarily). In one further example, the amount of power reduction may be signaled together with a power headroom report for each configured uplink component carrier to the eNodeB.

The information on the user equipment's power status may be signaled in form of one or more MAC control elements that are comprised within the MAC PDU(s) of a given sub-frame.

In another fourth exemplary implementation of the invention, a new MAC control element is defined to enable to UE to indicate to the eNodeB when it is potentially becoming power limited or is power limited. This new MAC CE is inserted by the user equipment to one or more protocol data units transmitted on respective (assigned) component carriers within a single sub-frame that is providing the eNodeB with a corresponding indication.

The MAC control element may be inserted to the protocol data units of a sub-frame. For example, the MAC control element may inserted into one of the protocol data units transmitted by the user equipment within the sub-frame or all of the protocol data units transmitted by the user equipment within the sub-frame.

Furthermore, in addition to the indication of the user equipment approaching its total maximum UE transmit power, the control element inserted to the protocol data units may further indicate a per-user equipment (per-UE) power headroom. For example, the per-user equipment power headroom indicates the transmit power unused by the user equipment when transmitting the protocol data units (including the MAC control element) within the sub-frame relative to the user equipment's total maximum transmit power. Unlike the power headroom indicated in LTE Rel. 8/9, the power headroom indicated in the MAC control element is considering the transmissions (protocol data units) on all assigned or configured component carriers (i.e. more than one component carrier) within the sub-frame and is therefore not a per-component carrier power headroom, but per-user equipment power headroom.

In one exemplary embodiment of the invention, this per-user equipment power headroom is not only taking into account the transmit power required for the transmission of protocol data units via physical uplink data channels, but also the transmit power required for the transmission of control signaling via physical control channels. In one more detailed implementation is thus accounting for the transmit power required for transmitting user data and control data (protocol data units) on the assigned or configured component carriers via the physical uplink shared channel (PUSCH) and the physical uplink control channel (PUCCH).

In a fifth exemplary implementation of the first aspect of the invention, the user equipment sends per-CC power headroom reports for all assigned component carriers within a single sub-frame when the user equipment is potentially becoming power limited or is power limited, i.e. when being close to using its total maximum UE transmit power or the resource allocations and power control commands of the eNodeB would require using a transmit power exceeding the user equipment's total maximum UE transmit power. Hence, the estimated transmit power exceeding a given threshold value or the total maximum UE transmit power, as applicable, triggers the generation and transmission of per-CC power headroom reports within the sub-frame for which one of or both events occurred.

Please note that according to an exemplary embodiment of the invention, the per-CC power headroom reports for all assigned or configured component carriers are transmitted on the respective assigned or configured component carriers to which they refer. In case of reporting on all configured component carriers, and in case resources are not granted on all configured component carriers for the given sub-frame, the user equipment may assume a predefined resource allocation or alternatively predefined PUSCH power on those configured component carriers for which no uplink resource assignment is applicable in the given sub-frame.

In the exemplary fifth implementation, a potentially employed prohibit timer controlling the power headroom reporting on a respective one of the assigned component carrier may be overwritten/ignored, so that the per-CC power headroom reports can be sent in the instant sub-frame.

In an alternative exemplary embodiment of the invention, the per-CC power headroom reports may also be transmitted within a single protocol data unit on one of the assigned component carriers. In this example, the respective component carrier to which a respective per-CC power headroom report refers may be for example identified by including a component carrier identifier into the power headroom reports. Alternatively, there may be a new MAC control element defined ("all component carrier power headroom report") that is indicating the power headrooms of the assigned or configured component carriers ordered according to the priority of the component carriers to which they refer. Furthermore, please note that in the first and the second aspect of the invention, the decision of whether the user equipment is approaching (or is in) a power limit situation may be determined in different fashions. In one exemplary implementation, the user equipment determines (or more correctly estimates) the transmit power it will have to spend for transmitting the protocol data units on the uplink component carriers within a sub-frame and compares the determined (or estimated) transmit power to a threshold. This threshold may be for example a certain percentage (e.g. in the range 80% to 100%) of the total maximum UE transmit power. The transmit power required for transmitting the protocol data units on the uplink component carriers may be for example determined using a transmit power control formula. In other exemplary implementations, the user equipment determines (or more correctly estimates) the transmit power it will have to spend for transmitting the protocol data units on the assigned component carriers within a sub-frame for a given number of successive sub-frames (i.e. a monitoring time period) and decides based on criteria further outlined below, whether to include a MAC control element to indicate a power limit situation to the protocol data units of the last sub-frame of said monitoring time period.

Independent on which of the different implementations of the first aspect of the invention is used, the signaled power status information enables the eNodeB to derive the power status for each user equipment that is signaling its power status information. The scheduler of the eNodeB may for example take into account the power status of the respective user equipments in its dynamic and/or semi-persistent resource allocations to the respective user equipments.

Another second aspect of the invention is to suggest a definition for a per-CC power headroom when reporting the power headroom in a mobile communication system using carrier aggregation in the uplink. According to one exemplary definition, per-CC power headroom of a configured uplink component carrier is defined as the difference between the maximum transmit power of the configured uplink component carrier and the used uplink transmit power. In a 3GPP system, the used uplink transmit power may also be referred to as the transmitted PUSCH power. Alternatively the used uplink transmit power may additionally include the transmitted PUCCH power.

As the used uplink transmit power is considering power scaling (if applied), it may be different from the estimated transmit power which is the transmit power required for a transmission of the MAC PDUs on uplink component carriers within the respective sub-frame as a result of the power control formula. The used transmit power may therefore by considered to be equal to the product of the power scaling factor and the estimated transmit power. In case no power scaling is applied (scaling factor=1) the two values of the transmit power are equal.

Alternatively, a power headroom of a configured uplink component carrier may be defined as the difference between the maximum transmit power of the configured uplink component carrier and an estimated transmit power. In a 3GPP system, the estimated uplink transmit power may also be referred to as the estimated PUSCH power. The estimated uplink transmit power respectively the estimated PUSCH power is for example calculated by the power control formula for the respective uplink component carrier.

Furthermore, the maximum transmit power of the (configured) uplink component carrier may take into account a power reduction due to simultaneous transmissions on another or other uplink component carriers in the sub-frame. The maximum transmit power of a configured uplink component carrier may thus not be the same as the total maximum UE transmit power.

The per-CC power headroom according to the second aspect of the invention may be provided in form of a per-CC power headroom report. The per-CC power headroom report is for example signaled in form of a MAC control element within a MAC PDU. As mentioned above, the MAC control element carrying the per-CC power headroom report may be associated to a MAC sub-header in a header section of the MAC PDU that can be further employed to indicate that the per-CC power headroom is triggered by a power limited situation of the user equipment requiring power scaling.

In the following different embodiments of the invention will be outlined. It is assumed in these embodiments that the user equipment is operated in a mobile communication system that is using carrier aggregation and that the user equipment is configured with plural component carriers, i.e. is capable of transmitting uplink data on plural component carriers simultaneously within individual sub-frames. Uplink transmissions are assumed to be scheduled by a scheduler by means of resource assignments. The resources may be assigned on a semi-persistent or per-sub-frame/per-TTI basis. The scheduler is for example implemented in the eNodeB.

Furthermore, it should be noted that the scheduler may assign one or more (up to all) of the plurality of configured component carriers for a given sub-frame and the user equipment is transmitting a respective transport block/protocol data unit on each assigned component carrier, i.e. each component carrier for which a resource assignment has been received. Please note that when using MIMO in the uplink, two or more protocol data units may be transmitted in one sub-frame on one component carrier, the actual number of protocol data units per component carrier depending on the MIMO scheme. Using the 3GPP terminology, the resource assignments may also be referred to as grants or PDCCH. In addition, the there may be a respective transmit power loop implemented per component carrier configured for the user equipment, i.e. the transmit power control function implemented in the user equipment and the eNodeB perform transmit power control for each component carrier individually.

Moreover, in a further exemplary embodiment of the invention, a joint logical channel prioritization procedure may be used for to the generation of the protocol data units for transmission within a sub-frame. Different exemplary implementations of such joint logical channel prioritization procedure are described in the co-pending European patent application no. 09005727.4 and the co-pending European patent application no. 09013642.5. The two European patent applications will be referred to as Application 1 and Application 2 in the following where appropriate.

a. Per-UE Power Headroom MAC CE

Figure 8:
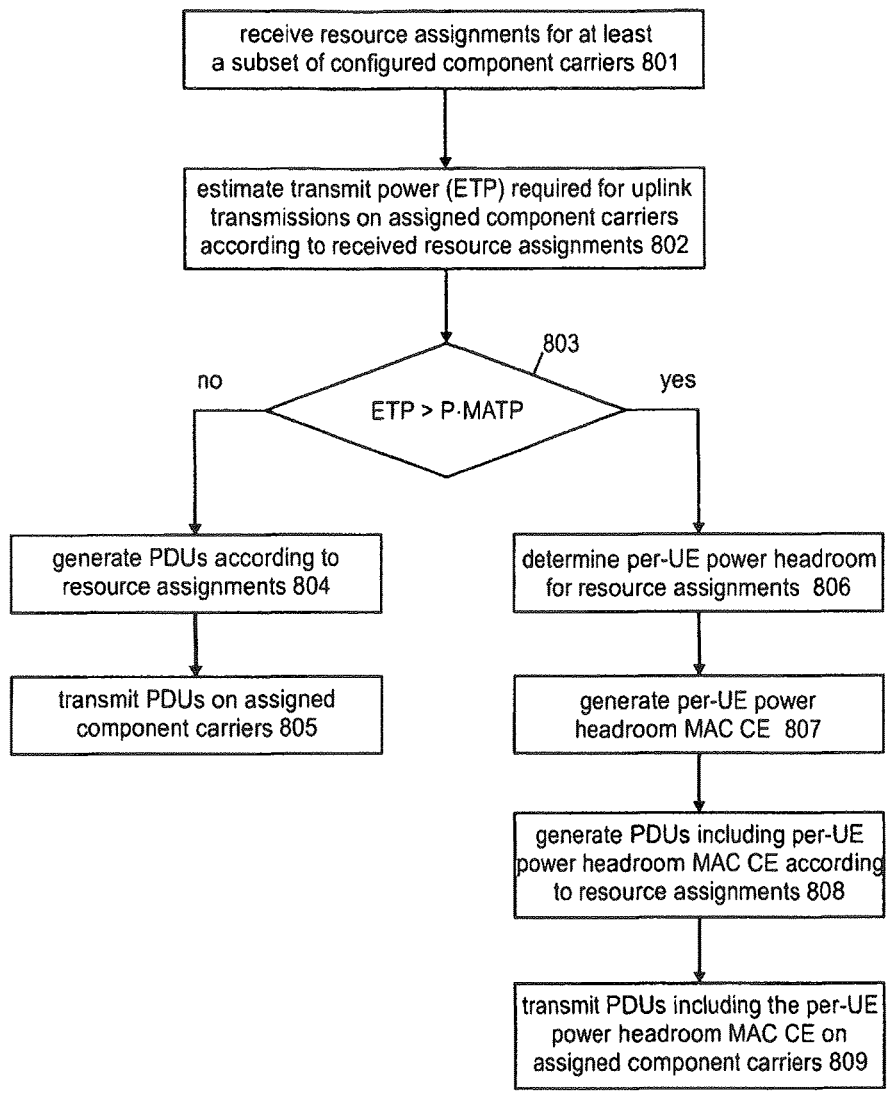
FIG. 8 shows a flow chart of an exemplary operation of a user equipment according to one embodiment of the invention in line with the first aspect of the invention.

FIG. 8 shows a flow chart of an exemplary operation of a user equipment according to one embodiment of the invention in line with the first aspect of the invention. The user equipment receives 801 plural resource assignments for a given sub-frame and estimates 802 the transmit power (ETP) required for uplink transmissions on assigned component carriers according to received resource assignments. In one exemplary embodiment of the invention, the transmit power is estimated by the user equipment based on the received resource assignments for the protocol data units to be transmitted in the sub-frame and the status of a transmit power control function of the user equipment. For example, the user equipment may estimate the transmit power needed for each of the transport blocks depending on which component carrier they are located on and based on the state of the transmit power function of the component carrier. The estimated transmit power is then the sum of the individual transmit power for all assigned transport blocks.

Next, the user equipment determines 803, whether the estimated transmit power (ETP) is exceeding a certain threshold value. In the example of FIG. 8, this threshold is defined as a certain percentage P of the total maximum UE transmit power (MATP) of the user equipment. Please note that this would be equivalent to determining whether the ratio of the estimated transmit power (ETP) and the total maximum UE transmit power (MATP), is exceeding a threshold value, that would be equivalent to the percentage P, i.e.

$$\frac{ETP}{MATP} > P.$$

If the threshold value is not exceeded, the user equipment is not in a power limit situation, so that no report thereon needs to be signaled to the eNodeB. Accordingly, the user equipment will next generate 804 the protocol data units for transmission on the respective assigned component carriers and transmits 805 the protocol data units (which are referred to as transport blocks in the Physical layer) to the eNodeB via the assigned component carriers. Please note that the generation of the protocol data units can be for example implemented as described in Application 1 or Application 2.

If the threshold value is exceeded, the user equipment determines 806 the per-user equipment power headroom for all transmissions according to the resource assignments. As outlined above, this per-user power headroom is determined for all protocol data units to be transmitted within the given sub-frame on the assigned component carriers. The per-user equipment power headroom essentially indicates how much transmit power on top of what is to be used for transmitting the protocol data units in the sub-frame (estimated transmit power) is remaining relative to the total maximum UE transmit power of the user equipment. Simplified, the power headroom (PH) indicates the difference between total maximum UE transmit power of the user equipment and the estimated transmit power, i.e. PH=MATP−ETP.

The user equipment further generates 807 a MAC control element that is comprising the determined per-user equipment power headroom ("per-UE power headroom MAC CE") and provides the per-UE power headroom MAC CE to a protocol data generation section that generates 808 the protocol data units for transmission according to the resource assignments, similar to step 804. However, in step 808 the per-UE power headroom MAC CE is included in this generation process, so that depending on the implementation per-UE power headroom MAC CE is included in one of the protocol data units or all of the protocol data units. Subsequently the generated protocol data units including the per-UE power headroom MAC CE are transmitted 809 to the eNodeB on the assigned resources.

Figure 10:
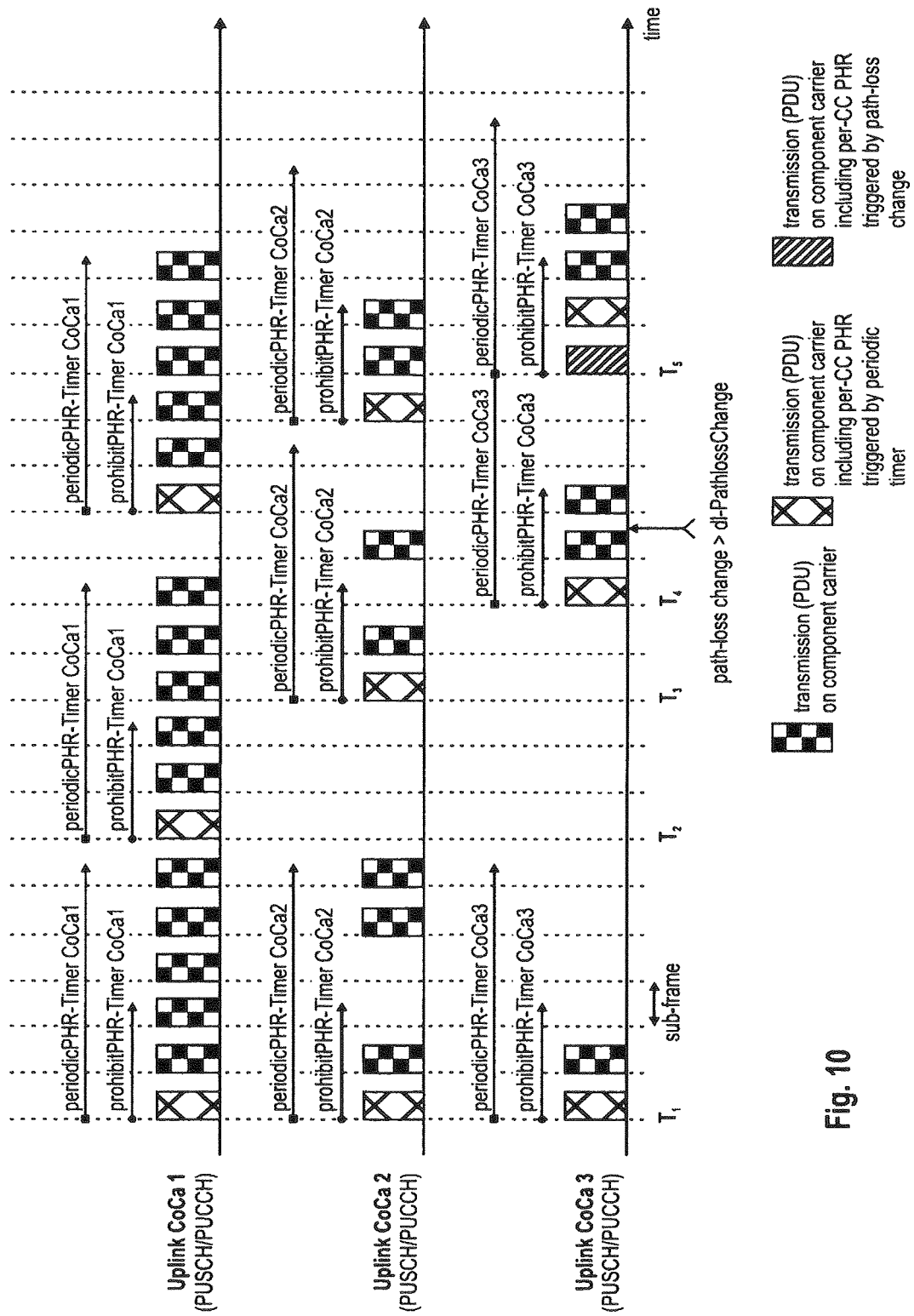
FIG. 10 shows power headroom reporting in a LTE-A system, where the known power headroom reporting of LTE Rel. 8/9 is employed for each component carrier individually.
Figure 11:
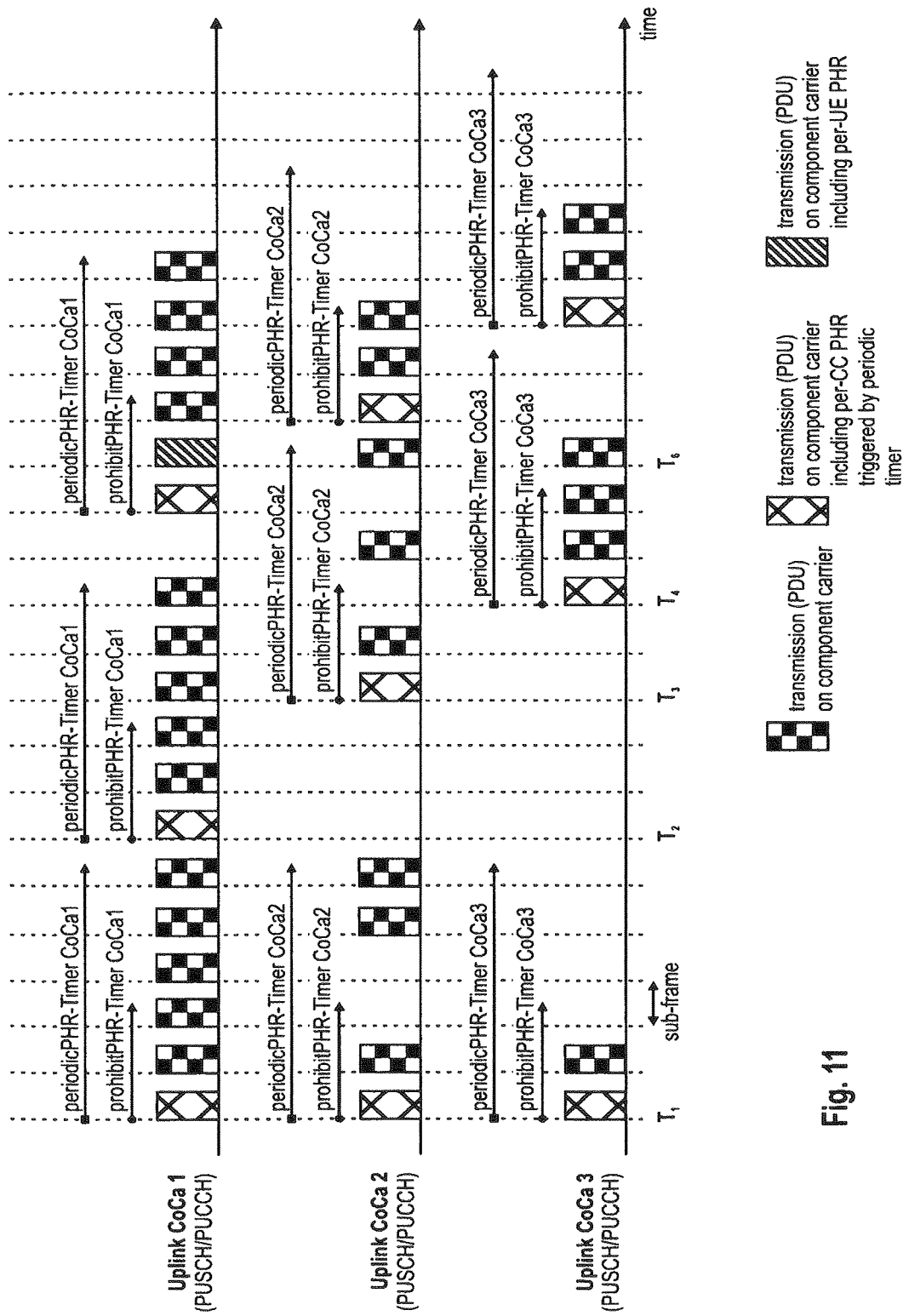
FIG. 11 shows power headroom reporting in a LTE-A system according to an embodiment of the invention, where the exemplary operation of a user equipment according to FIG. 8 is employed.

FIG. 11 shows power headroom reporting in a LTE-A system according to an embodiment of the invention, where the exemplary operation of a user equipment according to FIG. 8 is employed. In most situations, the operation is corresponding to the operation of the user equipment as has been outlined with respect to FIG. 10 previously herein. In contrast to FIG. 10, it is assumed that at $T_6$ the user equipment has received three resources assignments for all three component carriers for the sub-frame at $T_6$ however the transmit power control function has is yielding a gain factor for the transmission that high that given the resource allocation, the estimated transmit power exceeds the total maximum UE transmit power (see step 803 of FIG. 8). Accordingly, in this case the user equipment determines the per-UE power headroom and multiplexes the per-UE power headroom MAC CE (also referred to as power-limit MAC CE in the following) to the protocol data unit transmitted on component carrier CoCa1. The scheduler in the eNodeB receiving the uplink transmission can now detect based on the per-UE power headroom MAC CE that the user equipment is in a power limit situation and can adapt the further scheduling and/or power control of the user equipment accordingly.

As apparent from the above, per-UE power headroom MAC CE may basically have two functions. The first and most important function is that the sole reception of the per-UE power headroom MAC CE by eNodeB already informs eNodeB that a problem with the transmit power for the uplink transmissions existed in the sub-frame. Secondly, the per-UE power headroom MAC CE may also be reporting the per-user equipment power headroom of the user equipment, thus yielding more detailed information on the exact power situation in the user equipment to the eNodeB.

In one alternative exemplary implementation according to another embodiment of the invention, the user equipment is not immediately including a power-limit MAC CE to the protocol data units transmitted on the uplink if the estimated transmit power exceeds the threshold. For example when the threshold is exceeded, instead of transmitting the power-limit MAC CE immediately, the user equipment start monitoring the estimated transmit power for a certain number of sub-frames, i.e. for a given monitoring period of sub-frames. Having monitored the given number of sub-frames, the user equipment decides whether or not a power-limit MAC CE is to be included to the protocol data units to be transmitted in the next sub-frame following certain criteria. Please note that the power-limit MAC CE may for example be transmitted in the last sub-frame transmitted in the monitoring period, if the user equipment decides to insert same.

These criterions may be for example:
Estimated transmit power of the uplink transmissions in each of the sub-frames within the monitoring period was above a threshold value.
Estimated transmit power of the uplink transmission in some of the sub-frames within the monitoring period was above the threshold. The number of sub-frame required for sending the power-limit MAC CE at the end of the monitoring period is configured by eNodeB per UE through RRC signaling or alternatively can be set to a fixed value defined in the specifications.
The average estimated transmit power of the uplink transmissions in the sub-frames within the monitoring period was above the threshold.

The monitoring of the estimated transmit power for a given time period, i.e. a certain number for sub-frames, has the advantage that the power-limit MAC CE is not reported immediately when the threshold is crossed, which may avoid unnecessary reporting of a power-limit situation to the eNodeB if the threshold is exceeded only sporadically. However, since the power-limit MAC CE is indicating an emergency situation to the eNodeB and countermeasures should be taken by eNodeB after receiving the power-limit MAC CE, the drawback of introducing a monitoring period is the delay in the transmission of the power-limit MAC CE, once user equipment's transmit power has crossed the threshold.

In a further alternative embodiment of the invention, the user equipment is configured with two thresholds. Also the second, "additional" threshold may be for example set by the eNodeB by RRC signaling. This second threshold may for example also be a fraction of the total maximum UE transmit power of the user equipment, but is preferably higher than the first threshold. Similar to the exemplary embodiments discussed above, the user equipment again determines for each sub-frame whether the estimated transmit power of a sub-frame exceeds the first threshold. If this is the case, i.e. the first threshold is exceeded for a sub-frame, the user equipment starts monitoring the estimated transmit power as described in the paragraphs above, for example for a given monitoring period. If the second threshold is exceeded by the estimated transmit power of a sub-frame within the monitoring period, the user equipment transmits a power-limit MAC CE within that sub-frame for which the estimated transmit power exceeded the second threshold was crossed.

In another alternative embodiment of the invention, the user equipment is multiplexing the power-limit MAC CE to each of the protocol data units sent in the sub-frame via the assigned component carriers. This may be advantageous in that the reliability of the reception of the control element by eNodeB is increased.

b. Reporting Format of the Per-UE Power Headroom MAC CE

Figures 6, 7:
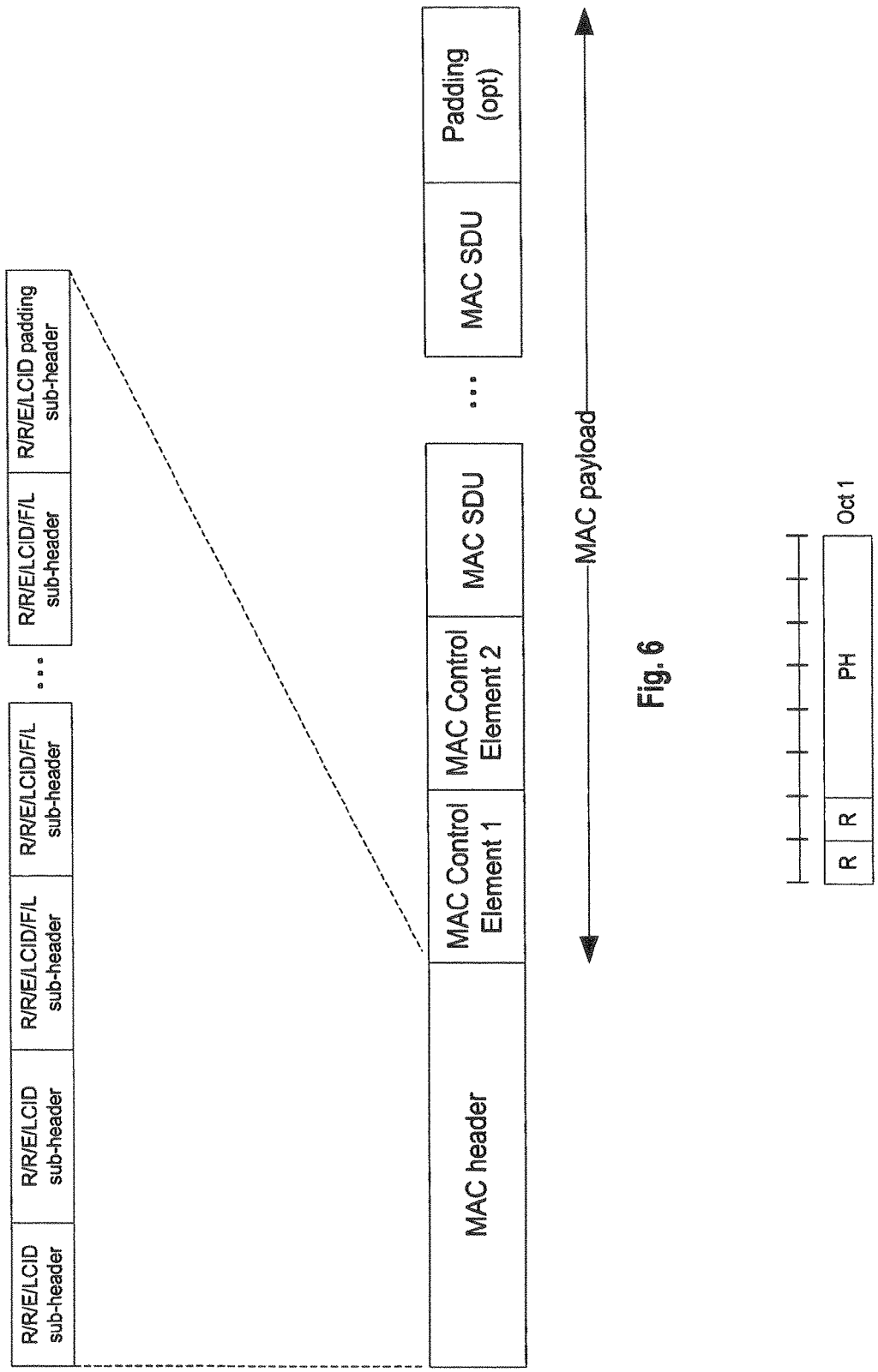
FIG. 6 shows the format of an exemplary MAC PDU.
FIG. 7 shows the format of a MAC control element for reporting a per-component carrier power headroom (PH)

The format for the per-UE power headroom MAC CE indicating a potential power limitation of the user equipment ("power-limit MAC CE") could be based on the LTE Rel. 8/9 MAC CE format used for power headroom reporting as exemplified in FIG. 7. The power headroom MAC CE consists of 8 bits, i.e. one octet. The first two bits are reserved bits, and the remaining 6 bits indicate the power headroom. In one embodiment of the invention, the format is maintained, but the 6 bit-field PH of the MAC CE format shown in FIG. 7 includes the a per-UE power headroom determined by the user equipment (see for example step 806 of FIG. 8). Optionally, in one embodiment of the invention, the per-UE power headroom does not only transmissions on the PUSCH but also transmissions on the PUCCH is taken into account while calculating the per-UE power headroom.

In order to distinguish the power-limit MAC CE from a LTE Rel. 8/9 power headroom MAC CE, one of the two reserved bits (R) of the octet shown in FIG. 8, e.g. the highest bit in the octet, is used to differentiate power headroom MAC CEs and power-limit MAC CEs (i.e. the per-UE power headroom CEs). For example, if the highest bit in the octet is set to 0, the MAC CE represents a power headroom report for that component carrier, i.e. a per-CC MAC CE reporting a power headroom for the given component carrier—the per-CC MAC CE reporting on the power headroom is thus a component carrier-specific MAC control element. If the bit is set to 1, the reported power headroom is the per-UE power headroom of the power-limit MAC CE. Please note that the power-limit MAC CE (i.e. the per-UE power headroom CE can be considered to be UE specific, so that the power-limit MAC CE can be considered a UE-specific MAC control element.

Please note that the differentiation of UE-specific and component carrier-specific MAC control elements may lead to a different treatment and multiplexing of the MAC control element to the transport block (MAC protocol data units) as explained in Application 2.

When user equipment is sending a power-limit MAC CE, it may be of additional value to the eNodeB to acquire knowledge for which component carriers the user equipment actually received resource assignments (uplink grants) in order to know, if the user equipment obeyed all uplink grants correctly, or if it missed one or more of the uplink grants. This information allows the eNodeB to determine, if the power-limit situation exists already for a situation where the user equipment did not even transmit on all the granted resources due having missed one or more of the uplink grants.

Therefore, in another embodiment of the invention, the another exemplary format for the power-limit MAC CE is proposed which is including information on the component carriers for which uplink grants have been received, respectively on the number of received uplink grants.

Figure 14:
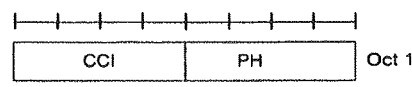
FIGS. 14 to 16 show different formats of a power-limit MAC CE according to different embodiments of the invention in line with the first aspect of the invention.

An exemplary format of the power-limit MAC CE according to another embodiment of the invention is shown in FIG. 14. This power-limit MAC CE consists of two fields, a first field CCI (Component Carrier Indicator field) and a second field PH (Power Headroom) for indicating the per-UE power headroom. The power-limit MAC CE is again one octet long.

Assuming that there are five component carriers configured for the user equipment, a total of $2^5=32$ combinations of resource assignments are possible. As the user equipment already indicates by sending data (including the power-limit MAC CE) via one of the five component carriers, it is apparent that the user equipment has received an uplink grant for this component carrier. Hence, $2^4=16$ combinations of resource assignments remain for the four other configured component carriers, i.e. the CCI field would consist of 4 bits for signaling all combinations (for example by indicating by means of a bitmap, for which of the four other component carriers further uplink grants have been received). Hence, the remaining four bits of the MAC CE format are left for the PH field, allowing differentiating 16 per-UE power headroom values. The component carriers other than the one on which the MAC CE is signaled, for which an uplink grant has been received may be for example indicated by means of a bitmap. The actual mapping of which bit in the bitmap represents which component carrier could be for example configured by eNodeB through RRC signaling or can be determined by a priority order of the component carriers, as for example outlined in Application 1 and Application 2.

Figure 15:
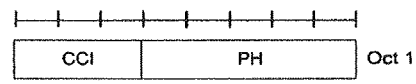

In another embodiment, another MAC CE format shown in FIG. 15 is suggested. The CCI field is only 3 bits in size, while the PH field has 5 bits. This format may be considered a modification of the LTE Rel. 8/9 power headroom report MAC CE format in FIG. 7 in that the two reserved bits (R) and one additional bit from the PH field are reused as the CCI field. This implies of course reducing the granularity of the per-UE power headroom values that can be reported from 6 to 5 bits.

Figure 16:
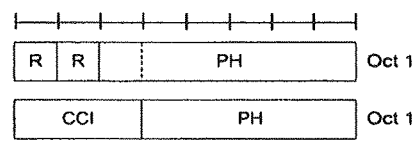

As highlighted in FIG. 16 and as will be shown in Table 1 below, the MAC CE format for reporting a per-UE power headroom as shown in FIG. 15 allows for indicating the number of component carriers for which the user equipment received an uplink assignment while also indicating the whether the MAC control element is a LTE Rel. 8/9 power headroom MAC CE or a per-UE power headroom MAC CE, without requiring the assignment of a new logical channel identifier (LCID) to the new per-UE power headroom MAC CE but being able to also use the same LCID for a LTE Rel. 8/9 power headroom MAC CE and per-UE power headroom MAC CE. The eNodeB would have to evaluate the first two bits of the control element to determine whether a LTE Rel. 8/9 power headroom MAC CE or a per-UE power headroom MAC CE.

TABLE 1

| CCi Field | | | |
|---|---|---|---|
| $1^{st}$ R bit | $2^{nd}$ R bit | $1^{st}$ bit of PH field | Meaning |
| 0 | 0 | Highest bit of 6 bit-PH field | LTE Rel. 8/9 power headroom report |
| 0 | 1 | 0 | Per-UE power headroom report; UE has received 1 uplink grant |
| 1 | 0 | 0 | Per-UE power headroom report; UE has received 2 uplink grants |
| 1 | 0 | 1 | Per-UE power headroom report; UE has received 3 uplink grants |
| 1 | 1 | 0 | Per-UE power headroom report; UE has received 4 uplink grant |
| 1 | 1 | 1 | Per-UE power headroom report; UE has received 5 uplink grants |

If the first two bits are both set to 0, i.e. the reserved bits as shown in FIG. 7 are set to zero, the MAC control element is a LTE Rel. 8/9 power headroom report as shown in FIG. 7.

In any other case, the MAC control element is a per-UE power headroom MAC CE. If the first two bits are not set to 0, the eNodeB needs to also evaluate the third bit within the octet, as the first three bits yield the number of uplink grants received by the user equipment. The remaining five bits (see FIG. 15)—the PH field—indicate the per-UE power headroom value.

When user equipment has a power limit situation, one way the eNodeB may react to the reporting thereof by a power-limit MAC CE is to reduce the number of the component carriers on which the user equipment is simultaneously scheduled. It would be advantageous, if the user equipment assists the eNodeB in choosing on which of the component carriers resources should be scheduled to the UE. Accordingly, in another embodiment of the invention, the power-limit MAC CE may be used to not only signal the per-UE power headroom in a PH field, but to also suggest to the eNodeB for which component carriers the eNodeB should further send resource assignments. In one example, this is implemented in a similar fashion as described previously herein with respect to FIG. 14. Instead of indicating the component carriers for which a uplink grant has been received, the four bits of the CCI field may be used to signal a bitmap that indicates on which the component carriers (other than the one on which the power-limit MAC CE is received), the eNodeB should continue to give grants on. Alternatively, the bitmap could represent the component carriers the eNodeB should stop giving grants on.

In a further embodiment of the invention, the MAC CE as shown in FIG. 7 is used for the per-UE power headroom reporting. One of the two reserved bits, e.g. the first reserved bit shown in FIG. 7 is used to identify whether the MAC CE is a LTE Rel. 8/9 power headroom MAC CE or a per-UE power headroom MAC CE. In both cases the PH field may be 6 bits and indicates a per-CC headroom as in LTE Rel. 8/9 or the per-UE power headroom. Furthermore, if the MAC control element is a per-UE power headroom MAC CE, the component carrier on which the control element has been transmitted is the component carrier the user equipment is suggesting to the eNodeB for further resource assignments thereon.

As indicated above, the MAC control element formats discussed above with respect to FIG. 7, and FIGS. 14 to 16 have the advantage that—in comparison to LTE Rel. 8/9— no new logical channel identifier needs to be assigned for the per-UE power headroom reports. As shown in FIG. 6, a MAC PDU yields the format of the MAC control elements included in the MAC PDU payload by respective logical channel identifiers in the sub-header of the respective MAC control elements. In another embodiment of the invention a new logical channel identifier (LCID) is defined for indicating a per-UE power headroom MAC CE. Hence this embodiment of the invention provides a MAC PDU comprising a sub-header ("per-UE power headroom MAC CE sub-header") and the related MAC CE. The per-UE power headroom MAC CE sub-header comprises a LCID that is identifying the related MAC CE being a per-UE power headroom MAC CE.

The format of the per-UE power headroom MAC CE may be again that described in one of the embodiments relating to FIG. 7, FIG. 14 or FIG. 15 above, however, no indicating of a LTE Rel. 8/9 power headroom MAC CE may need to be included in the format definition any more, as the differentiation of the LTE Rel. 8/9 power headroom MAC CE and per-UE power headroom MAC CE is now achieved by means of the LCID in the sub-header of the MAC PDU.

c. Selection of the Component Carrier for Transmitting the Per-UE Power Headroom MAC CE When user equipment include the power-limit MAC CE into the protocol data units transmitted in the given sub-frame, the transmit power that is available for UL transmissions is already critical. Therefore the transport block of the most reliable component carrier needs to be chosen for the inclusion of the power-limit MAC control element.

The criterion for the selection of the most reliable component carrier can be based on the following conditions. One option would be to choose the component carrier which is the "special cell", i.e. the component carrier where the UE camps on and reads system information from. Another option would be to choose from the set of component carriers with UL transmissions the one with the best physical parameters. Parameters could be for example the target BLER or the actual power headroom of a component carrier. Furthermore, if a priority ranking of the component carriers is already known to UE the UE could send the power-limit MAC CE always on the component carrier with the highest priority.

d. Setting of the Threshold Value

In each sub-frame where user equipment has been assigned resources for uplink transmission in at least one of it's aggregated component carriers, the user equipment may calculate the transmit power needed to fulfill all uplink grants (resource assignments) in that sub-frame, i.e. determines the estimated transmit power required in this sub-frame. As explained above, a threshold may be configured relative to the total maximum UE transmit power which essentially indicates the maximum transmit power the user equipment is allowed to (or able to) spend on all uplink transmissions on the component carriers in the given sub-frame.

The threshold may be, for example, configured by the eNodeB in relation to the total maximum UE transmit power. The threshold may be, for example, set by eNodeB for each user equipment individually and the value of the threshold could be, for example, conveyed to respective user equipments via RRC signaling. The threshold may be for example a fractional value of (or percentage P) of the total maximum UE transmit power. As outlined previously, in case the user equipment would need more power for all uplink transmissions on the uplink component carriers than defined by the threshold value or the total maximum UE transmit power, an indication of user equipment's power status, e.g. a power-limit MAC CE, is included in the uplink transmissions of the sub-frame.

It should be noted that the user equipment's estimated transmit power might not only cross the configured threshold but may be even above the total maximum available power of the user equipment. In the latter case user equipment is already in a severe power-limited situation and cannot fulfill all uplink resource assignments as demanded by eNodeB.

Furthermore, it should also be noted that according in all aspects and embodiments of the invention, the reporting of the user equipment's power status does not necessarily need to be proactive, i.e. ETP>P·MATP, but that the threshold value may not be use (P=1). Basically, this means that the user equipment is triggered to report the power status when the estimated transmit power exceeds the total maximum US transmit power (i.e. ETP>MATP). In this case, the power status information (indicator, power-limit MAC CE, etc.) indicate whether, respectively, that the user equipment applied power scaling in the given sub-frame, while in case of using a threshold value the power status information may already be signaled prior to the user equipment having to use power scaling on the uplink component carriers.

e. Power Scaling Flag

According to another exemplary embodiment of the invention in line with the first aspect of the invention, the user equipment is not sending any detailed information to the eNodeB regarding its power status, but indicates to the eNodeB in each transmission, whether the user equipment applied power scaling to the transmissions in the uplink or not. For this purpose, one or more indicators may be comprised in the protocol data units transmitted by the user equipment. This indicator is also referred to as a power scaling flag. The power scaling flag may be provided on one of the assigned component carriers or on all assigned component carriers. For example, the power scaling flag to be transmitted on a given component carrier may be included to a protocol data unit transmitted on the given assigned component carrier.

According to one embodiment of the invention, the power scaling flag is defined in one of the two reserved/unused bits of a MAC PDU sub-header known from the LTE Rel. 8/9 sub-header format. If the power-scaling (PS) flag is set (e.g. =1) the estimated transmit power for the transmissions within a sub-frame has been scaled down, i.e. the estimated transmit power exceeded the total maximum UE power. If the PS flag is not set (e.g. =0) the user equipment did not apply power scaling within the sub-frame.

Alternatively, if the PS flag is provided for individual configured component carriers, the flag indicates whether the transmit power, e.g. PUSCH power, for the respective configured component carrier has been scaled down. For example, if uplink control information (UCI) is multiplexed with a transport block (MAC PDU) for an assigned uplink component carrier in the physical layer, the transmission on this assigned uplink component carrier may not be scaled down, although other PUSCH transmission(s) on the other uplink component carrier(s)—comprising no uplink control information—are power scaled.

3GPP based system using carrier aggregation in the uplink, like LTE-A, the setting of the PS flag may indicate that the PUSCH power for the corresponding transport block (MAC PDU) was scaled down due to power limitations. Consequently the bit set to zero indicates that no power scaling was applied.

Figure 29:
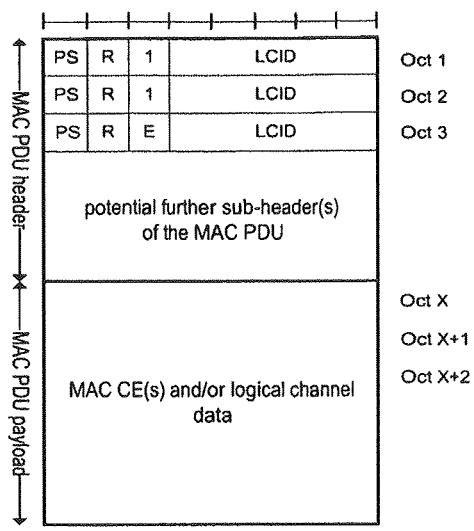
FIG. 29 shows an exemplary structure of a MAC PDU according to an embodiment of the invention, wherein Power Scaling (PS) flags are included in the MAC sub-headers of the MAC PDU.

FIG. 29 shows an exemplary MAC PDU according to an embodiment of the invention. Since there is one MAC PDU sub-header in a MAC PDU for every MAC SDU (Service Data Unit) which contains RLC PDUs of a logical channel (identified by the LCID) which has data in the MAC PDU, the PS flag could be set in any one of, all of or a sub-set of the MAC PDU sub-headers within a given MAC PDU. In principle it is sufficient, if only one of the MAC PDU sub-header, e.g. the first MAC PDU sub-header of a MAC PDU contains a power-scaling flag (PS flag).

This may simplify the processing of the MAC PDUs in the user equipment and eNodeB, as only one bit would need to be set in one of the MAC PDU sub-headers, respectively analyzed by the eNodeB.

Furthermore as already mentioned before, it could be alternatively defined that instead of setting the power scaling flag when being power limited, the flag could be set when the required uplink transmission power exceeds a certain predefined or signaled threshold of the maximum allowed transmission power.

According to another exemplary embodiment of the invention, per-CC power headroom reports for the configured or assigned component carriers may be triggered, if the estimated transmit power for a given sub-frame exceeds the total maximum UE transmit power or a threshold relative thereto. This will be outlined in further detail below. In this embodiment, the power status flag (or also referred to as power-scaling flag) is signaled together with the per-CC power headroom reports. Hence, a power status flag is provided in each MAC PDU sub-header for the MAC CE comprising the per-CC power headroom for the respective assigned or configured component carrier. In this embodiment, the power status flag may be thus considered as an indication that the per-CC power headroom report signaled within the MAC CE of the MAC PDU for a given assigned or configured component carriers has been triggered by the estimated transmit power for the given sub-frame exceeded the total maximum UE transmit power or a threshold relative thereto. Alternatively the power status flag could be signaled using one of the two reserved/unused bits in the MAC control element containing the per-CC power headroom report itself.

Figure 30:
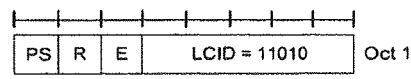
FIG. 30 shows an exemplary structure of a MAC sub-header for a per-CC PHR MAC CE according to an embodiment of the invention, wherein the MAC sub-header comprises a flag (PS flag) to indicate that the power headroom report was triggered by a power limit situation of the user equipment.

FIG. 30 shows an exemplary embodiment of a MAC PDU sub-header for a power headroom report MAC CE including a power status flag. In case the MAC PDU with the per-CC power headroom MAC CE for a configured component carrier is signaled on the respective assigned component carrier, no extra identification of the component carrier to which the per-CC power headroom MAC CE pertains.

Figure 31:
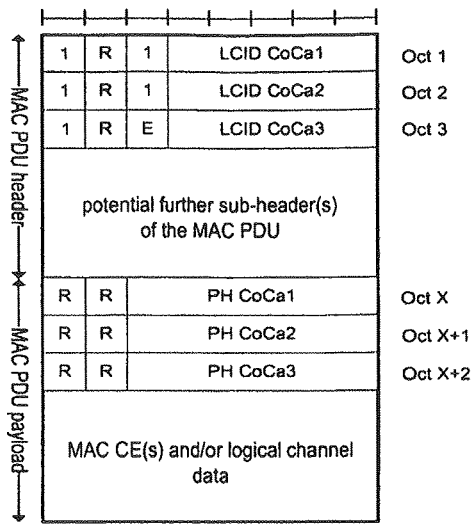
FIG. 31 shows an exemplary structure of a MAC PDU according to an embodiment of the invention, wherein the MAC PDU contains three PHR MAC CEs and corresponding sub-headers reporting on the power headroom of three configured component carriers within a single sub-frame, wherein the MAC sub-headers include a flag to indicate that the power headroom report was triggered by a power limit situation of the user equipment.

In case the per-CC power headroom MAC CE is to be signaled for a configured component carrier for which there is no resource assignment available in the given sub-frame the user equipment may for example calculate the power headroom from this component carrier based on some predefined uplink grant or respectively predefined PUSCH power. The per-CC power headroom MAC CEs for the configured component carrier may be signaled in one MAC PDU on an assigned component carrier. FIG. 31 shows an exemplary MAC PDU comprising per-CC power headroom MAC CEs for three configured component carriers of a user equipment. IN this exemplary embodiment, special logical channel IDs (LCIDs) are defined for the respective component carriers, so as to be able to associate the per-CC power headroom MAC CEs with the respective component carrier they refer to.

Figure 21:
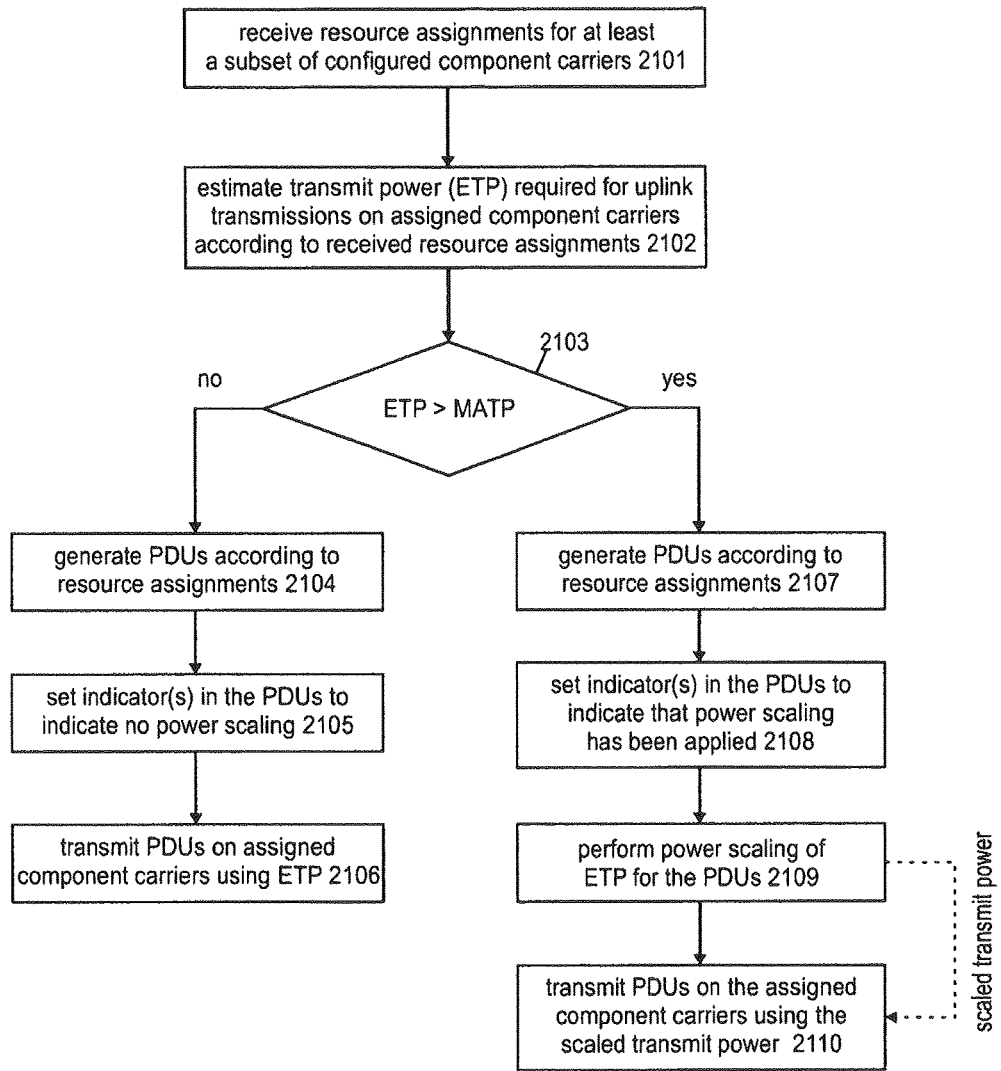
FIG. 21 shows a flow chart of an exemplary operation of a user equipment according to one embodiment of the invention in line with the first aspect of the invention, where a power scaling flag is used to signal indicate a power limit situation of the user equipment to the eNodeB.

FIG. 21 shows a flow chart of an exemplary operation of a user equipment according to one embodiment of the invention in line with the first aspect of the invention. The user equipment receives 2101 (similar to step 801 of FIG. 8) plural resource assignments for a given sub-frame and estimates 2102 (similar to step 802 of FIG. 8) the transmit power (ETP) required for uplink transmissions on assigned component carriers according to received resource assignments. In one exemplary embodiment of the invention, the transmit power is estimated by the user equipment based on the received resource assignments for the protocol data units to be transmitted in the sub-frame and the status of a transmit power control function of the user equipment as explained with respect to FIG. 8 above.

Next, the user equipment determines 2103, whether the estimated transmit power (ETP) is exceeding the total maximum UE transmit power (MATP or $P_{CMAX}$). If the total maximum UE transmit power is not exceeded, the user equipment is not in a power limit situation, so that no power status report thereon needs to be signaled to the eNodeB. Accordingly, the user equipment will next generate 2104 (similar to step 804 of FIG. 8) the protocol data units for transmission on the respective assigned component carriers. Please note that the generation of the protocol data units can be for example implemented as described in Application 1 or Application 2. For example as part of this generation process of step 2104, the user equipment further sets 2105 one or more indicator(s)—i.e. power scaling flag(s)—in the MAC PDUs to indicate that no power scaling has been applied by the user equipment to the transmission of the MAC PDUs generated in step 2104. For example, each MAC PDU may comprise a respective power scaling flag in one or more of the MAC PDU sub-headers for a given assigned component carrier on which the MAC PDU's are transmitted in step 2106.

In case the estimated transmit power exceeds the total maximum UE transmit power in step 2103, the user equipment will next generate 2107 (similar to step 2104 of FIG. 21) the protocol data units for transmission on the respective assigned component carriers further sets 2108 one or more indicator(s)—i.e. power scaling flag(s)—in the MAC PDUs to indicate that power scaling has been applied by the user equipment to the transmission power, i.e. PUSCH power, of the MAC PDUs. For example, each MAC PDU may comprise a respective power scaling flag in one or more of the MAC PDU sub-headers for a given assigned component carrier that indicates whether the respective transmission power for transmission on the component carrier has been scaled.

Furthermore, the user equipment performs 2109 a power scaling to reduce the transmission power to at least one of the assigned component carriers in order to reduce the overall transmit power for the transmissions on the assigned component carriers below (or equal to) the maximum UE transmit power. As explained above, no power scaling may be applied to the transmission on a component carrier, if for example uplink control information is transmitted on this component carrier together with the MAC PDU in a given sub-frame, i.e. also referred to as PUSCH with UCI as explained above. The MAC PDUs are then transmitted 2110 on the respective assigned uplink component carriers using the reduced transmit power.

Please note that the order of the steps 2107 to 2110 in FIG. 21 may not represent the correct chronological order of the steps in time, since some of the steps may require interaction—as apparent from the explanations above.

Synchronous Per-CC Power Headroom Reports in One Sub-Frame

In line with the first aspect of the invention, another alternative implementation and embodiment of the invention for informing the eNodeB on a power-limit situation of the user equipment, the user equipment sends a per-CC power headroom report for each assigned or configured component carrier of the sub-frame to inform the eNodeB on a situation where the user equipment is close to using its total maximum UE transmit power or the resource allocations and power control commands of the eNodeB would require using a transmit power exceeding the user equipment's total maximum UE transmit power. The per-CC power headroom may be for example defined according to one of the definitions provided in the section "Definition of the Per-CC Power Headroom" below.

The per-CC power headroom reports are sent within a single sub-frame in the uplink. Basically, this can be considered as defining a new trigger for sending power headroom reports.

Optionally, in order to identify that the power headroom report for a component carrier is non-periodic, respectively, triggered by a power limit situation, one bit in the MAC PDU sub-header of the MAC CE for the per-CC power headroom report (per-CC PHR MAC CE) could be used, similar to the power status flag described above. Accordingly, also in this embodiment, one of the two reserved bits in the MAC PDU sub-header corresponding to the per-CC PHR MAC CE is used for indication of power limitation and/or this being the cause for the transmission of the power headroom report. The logical channel ID (LCID) for the power limitation triggered power headroom report by means of the per-CC PHR MAC CE may be the same as for power headroom report triggered by periodic reporting or by path loss change, e.g. 11010 as shown in FIG. 30 (the PS flag would indicate that the corresponding MAC CE contains an power headroom report triggered by power limitation). Alternatively the flag could be signaled using one of the two reserved/unused bits in the MAC control element containing the per-CC power headroom report itself.

In another implementation, instead of using a flag, a new LCID may be defined to indicate that the power headroom report for a configured or assigned uplink component carrier was triggered by power limitation.

In a further exemplary implementation, individual LCIDs could be defined for the configured uplink component carriers, so that the LCID may be used to indicate to which configured uplink component carrier the MAC CE (and the power headroom report thereof) belongs. FIG. 31 shows an exemplary MAC PDU comprising per-CC PHR MAC CEs for three configured component carriers (CoCa1, CoCa2 and CoCa3) of a user equipment according to an exemplary embodiment of the invention. In the MAC PDU sub-header section three MAC sub-headers are provided that include special LCIDs defined for the respective component carriers configured for the user equipment in the uplink (LCID CoCa1, LCID CoCa2, and LCID CoCa3). Based on the LCIDs in the sub-headers of the MAC PDU, the eNodeB can associate the per-CC power headroom reports in the MAC CEs within the MAC PDU's payload section to the respective configured component carriers of the user equipment.

Please note that in this example, the same LCID is used irrespective of the trigger. Therefore, the sub-header for the respective per-CC PHR MAC CEs comprises a flag in the first (or second) bit of the sub-header (similar to the power scaling flag) that, when set, respectively not set, indicates that the power headroom report in the per-CC PHR MAC CE is a event-triggered power headroom report triggered by a power limit situation. If the component carrier specific LCIDs would be used only for power headroom reports due to a power limit situation, no flag in the sub-header is required.

In this exemplary embodiment, the user equipment may optionally reuse the power headroom reporting mechanism (including the user of the timers periodicPHR-Timer and prohibitPHR-Timer) and their format as shown in FIG. 7 know from LTE Rel. 8/9 for each respective report sent in the sub-frame. When the user equipment is in a situation where it is close to using its total maximum UE transmit power or the resource allocations and power control commands of the eNodeB would require using a transmit power exceeding the user equipment's total maximum UE transmit power, the user equipment will send on each assigned component carrier a per-CC power headroom report as known from LTE Rel. 8/9 for the respective component carrier. In doing so the user equipment ignores the timer prohibitPHR-Timer, if running. Subsequent to the transmission of the multiple per-CC power headroom reports, the timers periodicPHR-Timer and prohibitPHR-Timer may be restarted.

Upon reception of all power headroom reports in the sub-frame, the eNodeB has the full picture of the total power situation of the user equipment.

In a further exemplary implementation according to another embodiment of the invention, the per-CC power headroom reports on all configured or assigned component carriers could be send in only one MAC PDU on one of the assigned component carriers. The selection of this component carrier on which the power headroom reports are to be sent can be implemented as described previously herein (see inter alia section Selection of the Component Carrier for transmitting the per-UE power headroom MAC CE).

Figure 17:
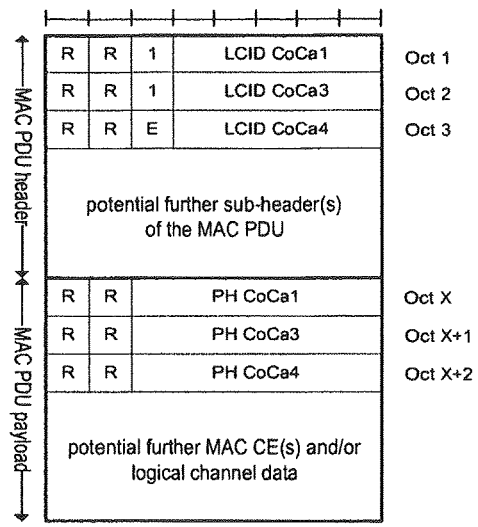
FIG. 17 shows an exemplary structure of a MAC PDU according to an embodiment of the invention, wherein the MAC PDU contains three PHR MAC CEs and corresponding sub-headers reporting on the power headroom of three assigned component carriers within a single sub-frame, FIG. 18 show an exemplary MAC CE format ("multiple PHR MAC CE") according to an embodiment of the invention in line with the first aspect of the invention, allowing to report multiple power headroom reports in a single MAC CE.

In one exemplary implementation of this embodiment, the multiple per-CC power headroom reports could be included into one MAC PDU. An exemplary format of a MAC PDU containing multiple PHR MAC CEs is shown in FIG. 17, where a report of three power headroom reports on assigned component carriers CoCa1, CoCa3 and CoCa4 is exemplified.

The MAC PDU comprises first the component carrier-specific logical channel identifiers (LCIDs) within respective sub-headers field that allow the identification of the component carriers reported on and indicate that the MAC PDU's payload section comprises three PHR MAC CEs. Each sub-header (indicating the LCID) is 8 bits long (one octet), wherein the first two bits of the octet (R) are reserved bits, and the third bit (E) indicates whether the next octet in the MAC PDU is another sub-header of the MAC PDU header or whether the payload section of the MAC PDU is following the octet (i.e. whether the next octet is PHR MAC CE in this example), and the last 5 bits are the LCID.

For example, if the E bit is set (e.g. 1), another sub-header is present in the next octet of the MAC PDU; if the E bit is not set (e.g. 0), the next octet is part of the payload section of the MAC PDU that is assumed to start with the first PHR MAC CE.

In another alternative implementation, the power headroom reports on multiple component carriers may also be included into a single MAC control element ("multiple PHR MAC CE").

Figure 18:
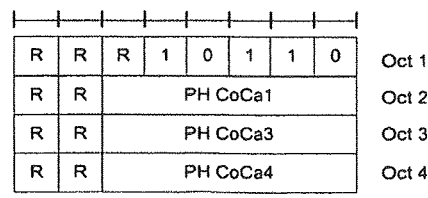
Figure 19:
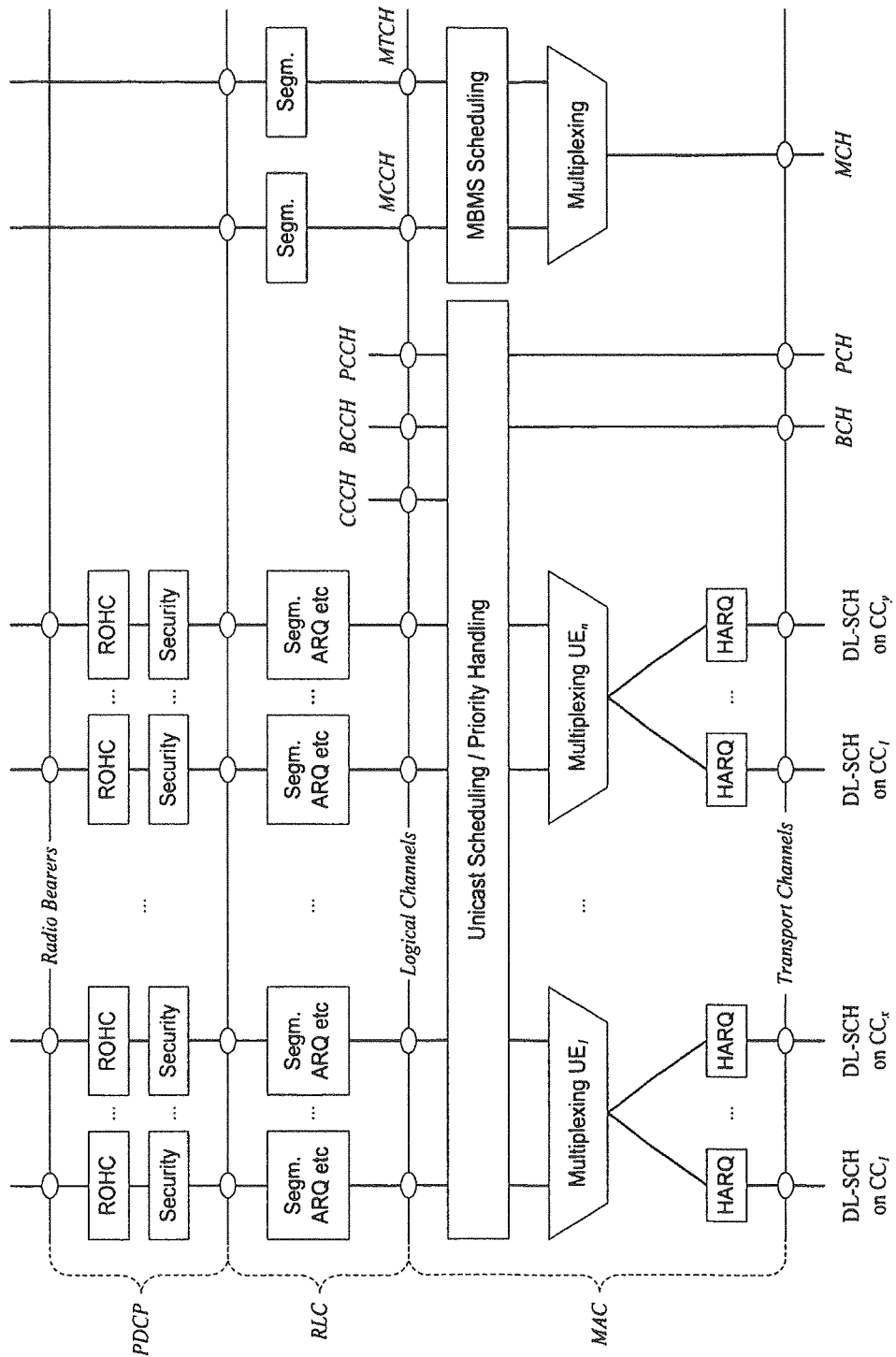
FIGS. 19 & 20 show the Layer 2 structure with activated carrier aggregation for the downlink and uplink respectively.
Figure 20:
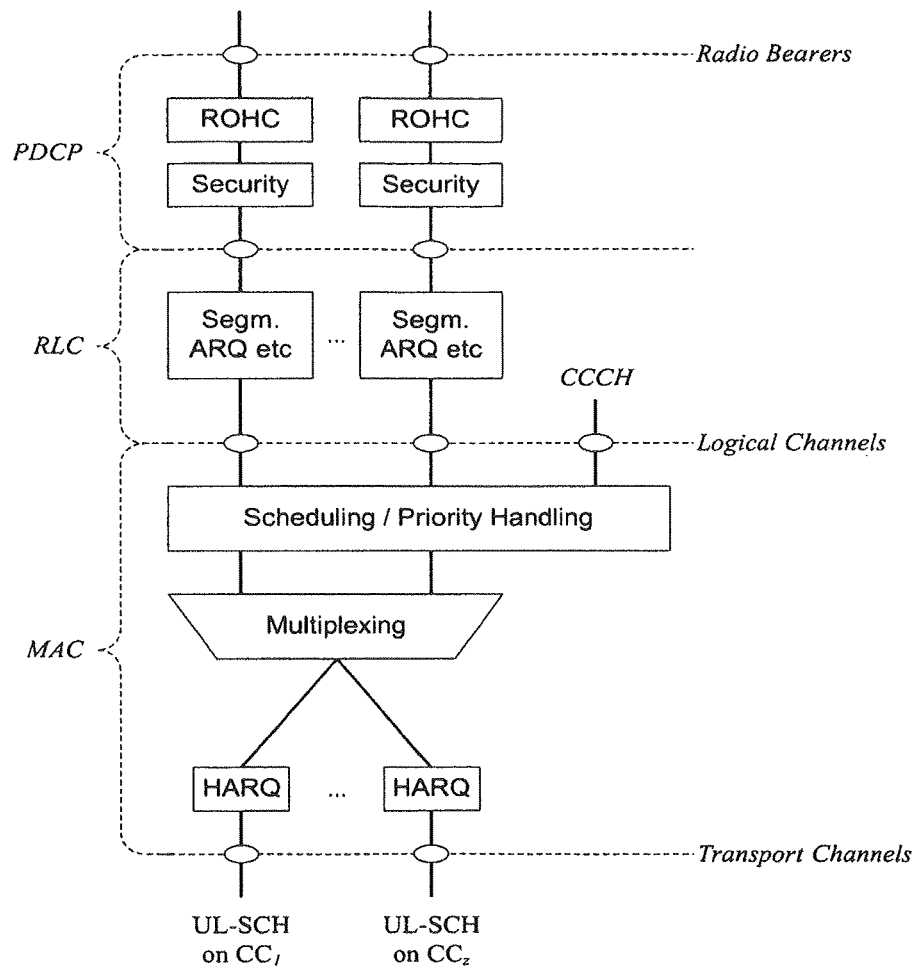

The multiple PHR MAC CE comprises in its first octet a bitmap of 5 bits indicating for which component carrier a PHR field is included in the multiple PHR MAC CE. A priority order of the component carriers, as described in Application 1 and Application 2, may define the meaning of the individual positions of bits within the bitmap. Generally, a bit set (e.g. 1) at a certain position of the bitmap means that there is a PHR field for the associated component carrier including in the MAC CE. Following the octet comprising the component carrier bitmap, the respective PHR field(s) with the power headroom value for the component carrier is/are included. The PHR field may for example have the same format as shown in FIG. 7 and reports the power headroom (PH) for a component carrier. An example of a multiple PHR MAC CE, where a report of three power headroom reports on assigned component carriers CoCa1, CoCa3 and CoCa4 is exemplified in FIG. 18.

Please note that for this alternative implementation, LTE Rel. 8/9 power headroom reports and the multiple PHR MAC CE could use the same logical channel identifier, and the two formats may be distinguished by setting or not setting the first or second reserved bit in the first octet of the control element. Of course, the multiple PHR MAC CE may also be assigned its own logical channel identifier (LCID) in the MAC PDU header.

The multiple PHR MAC CE may be further assigned its own logical channel identifier, so that it can be identified by a corresponding sub-headers in the MAC PDU's header (see FIG. 6).

Figure 9:
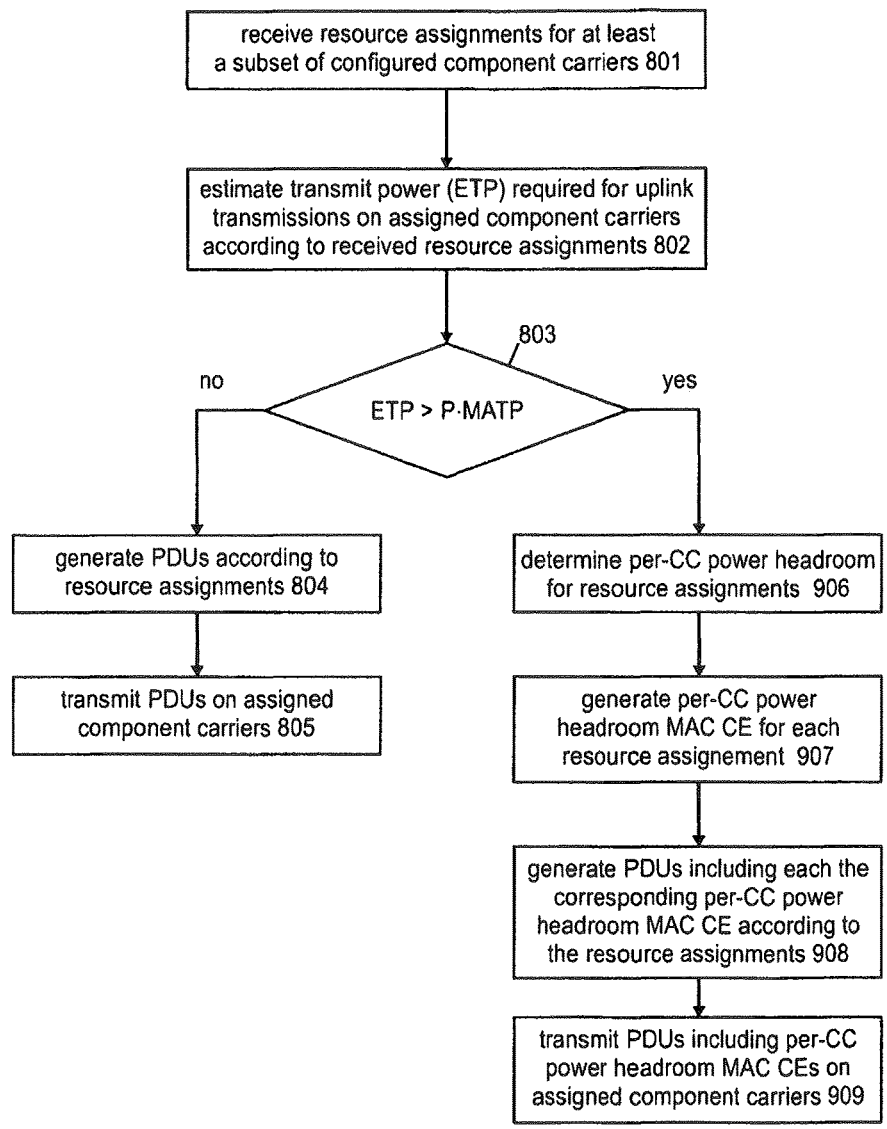
FIG. 9 shows a flow chart of an exemplary operation of a user equipment according to one embodiment of the invention in line with the first aspect of the invention.

FIG. 9 shows a flow chart of an exemplary operation of a user equipment according to one embodiment of the invention in line with the second aspect of the invention. Similar to FIG. 8, the user equipment receives 801 plural resource assignments for a given sub-frame and estimates 802 the transmit power (ETP) required for uplink transmissions on assigned component carriers according to received resource assignments. Next, the user equipment determines 803, whether the estimated transmit power (ETP) is exceeding a certain threshold value. If the threshold value is not exceeded, the user equipment is not in a power limit situation, so that report thereon needs to be signaled to the eNodeB. Accordingly, the user equipment will next generate 804 the protocol data units for transmission on the respective assigned component carriers and transmits 805 the protocol data units (which are referred to as transport blocks in the Physical layer) to the eNodeB via the assigned component carriers. Please note that the generation of the protocol data units can be for example implemented as described in Application 1 or Application 2.

If the user equipment is in a power limit situation as determined in step 803, the user equipment determines 906 for each component carrier for which a resource assignment has been received a per-CC power headroom.

Next, the user equipment may generate 907 for each assigned component carrier an individual per-CC power headroom MAC CE (for example using the format shown in FIG. 7) and further generates 908 the MAC PDUs including each the corresponding per-CC power headroom MAC CE according to the resource assignments. Subsequently the user equipment transmits the PDUs including per-CC power headroom MAC CEs on the assigned component carriers to the eNodeB.

Please note that alternatively to steps 907 and 908, there could also be a single multiple PHR MAC CE formed and transmitted in one of the MAC PDUs, as outlined above.

Figure 12:
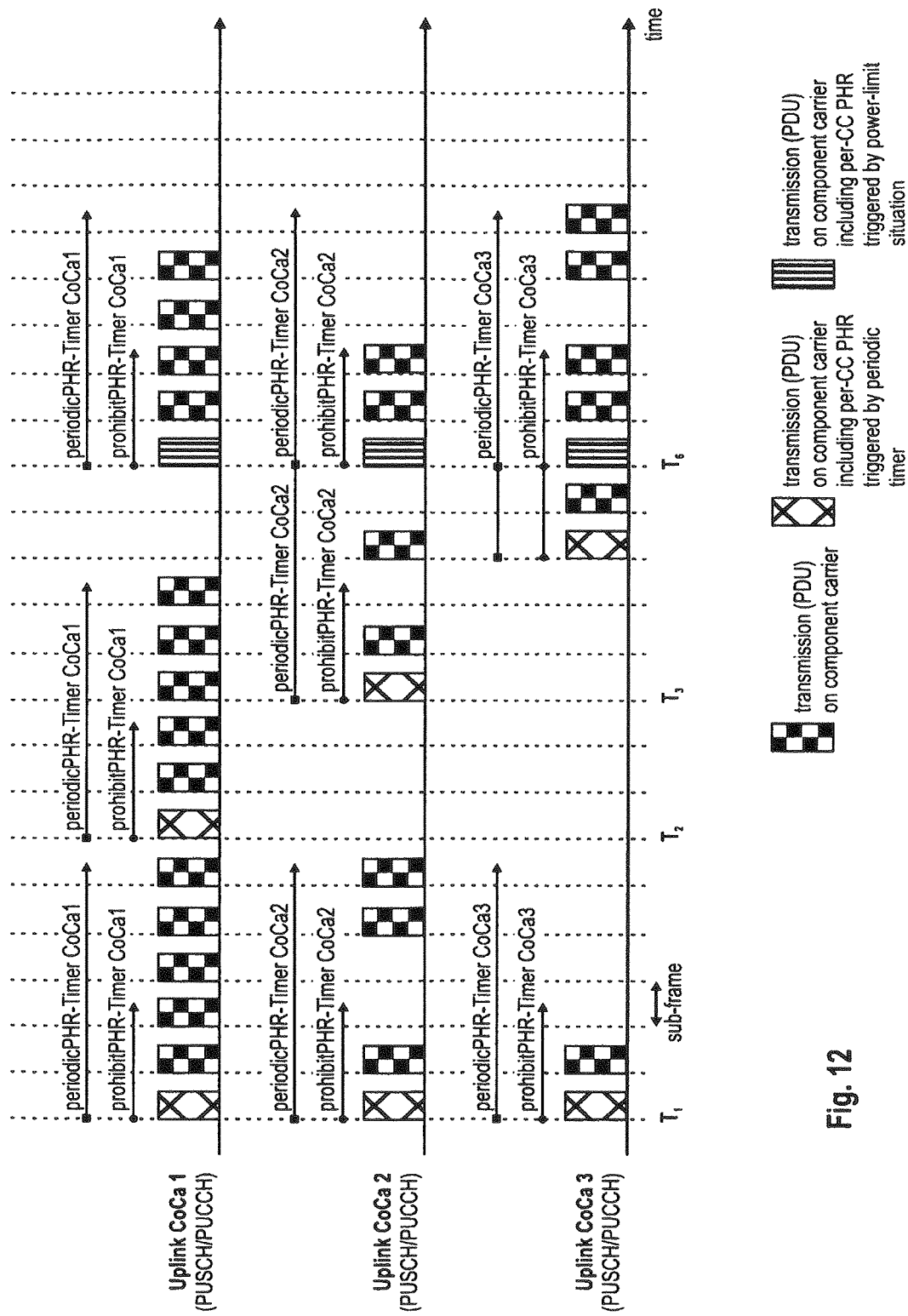
FIG. 12 shows an exemplary power headroom reporting in a LTE-A system according to an embodiment of the invention, where the exemplary operation of a user equipment according to FIG. 9 is employed.

FIG. 12 shows power headroom reporting in a LTE-A system according to an embodiment of the invention, where the exemplary operation of a user equipment according to FIG. 9 is employed. In most situations, the operation is corresponding to the operation of the user equipment as has been outlined with respect to FIG. 10 previously herein. In contrast to FIG. 10, it is assumed that at $T_6$ the user equipment has received three resources assignments for all three component carriers for the sub-frame at $T_6$, however the transmit power control function has is yielding a gain factor for the transmission that high that given the resource allocation, the estimated transmit power exceeds the total maximum UE transmit power (see step 803 of FIG. 9). Accordingly, in this case the user equipment determines the per-CC power headroom values for all three component carriers and sends PDUs each comprising a per-CC power headroom report for the respective component carrier in the uplink. As can be recognized from FIG. 12, the the prohibit-PHR-Timer is running at $T_6$ for the component carrier CoCa3, but is ignored by the user equipment. Upon sending the per-CC power headroom reports the respective timers are restarted for each component carrier.

Figure 13:
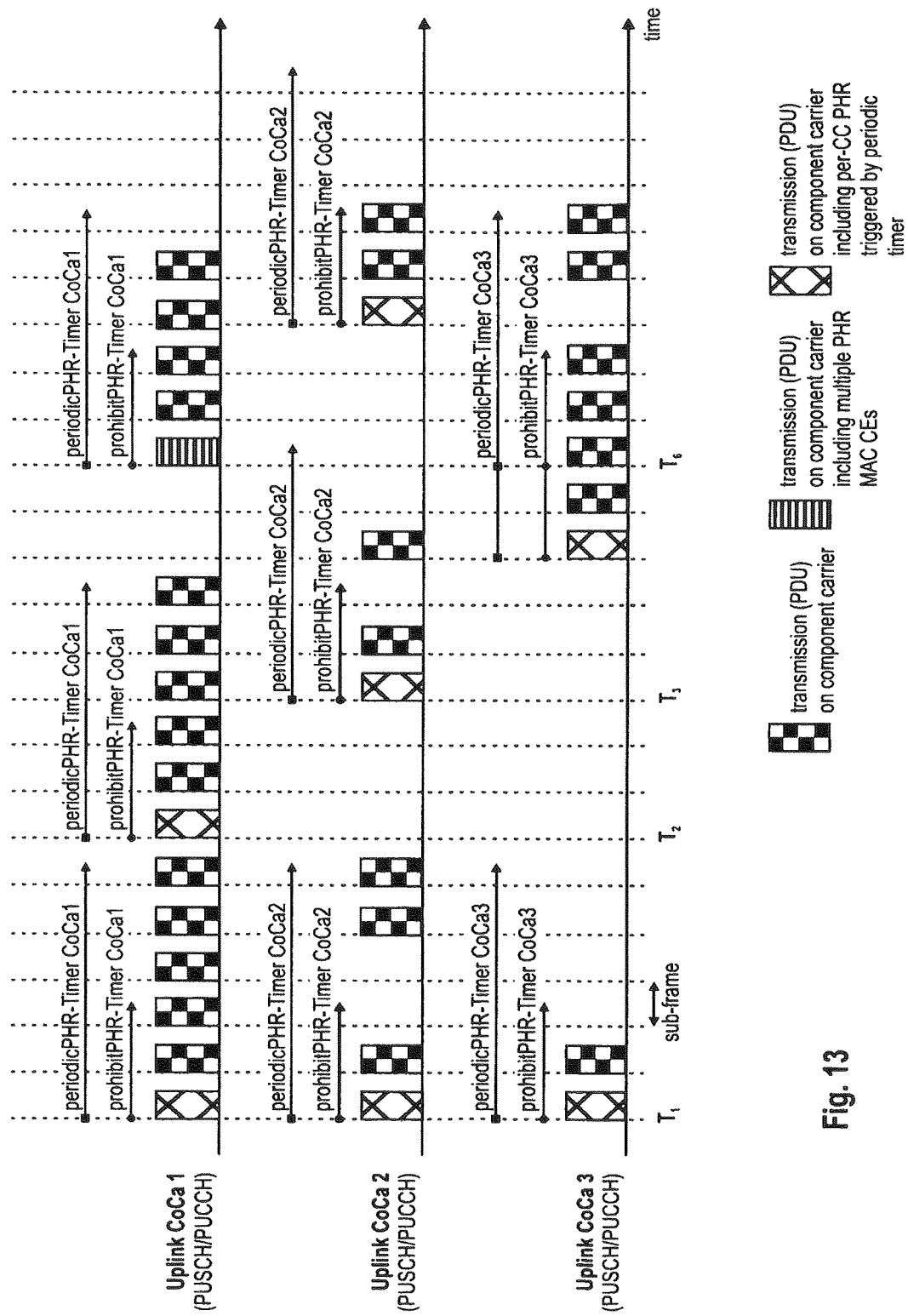
FIG. 13 shows another exemplary power headroom reporting in a LTE-A system according to a further embodiment of the invention, where the exemplary operation of a user equipment according to FIG. 9 is employed.

FIG. 13 shows another exemplary power headroom reporting in a LTE-A system according to an embodiment of the invention, where the exemplary operation of a user equipment according to FIG. 9 is employed. The example shown therein is the same as in FIG. 12, except for the user equipment having been assigned only resources on component carriers CoCa1 and CoCa3 for the sub-frame at $T_6$. Similar to FIG. 12, the user equipment still is in a power limit situation for this sub-frame, but sends a single multiple PHR MAC CE in the PDU transmitted on component carrier CoCa1 that reports the power headrooms for component carriers CoCa1 and CoCa3. Thereupon the timers periodicPHR-Timer and prohibitPHR-Timer are restarted for the component carriers for which a per-CC power headroom report has been sent, i.e. component carriers CoCa1 and CoCa3 in this example.

Figure 22:
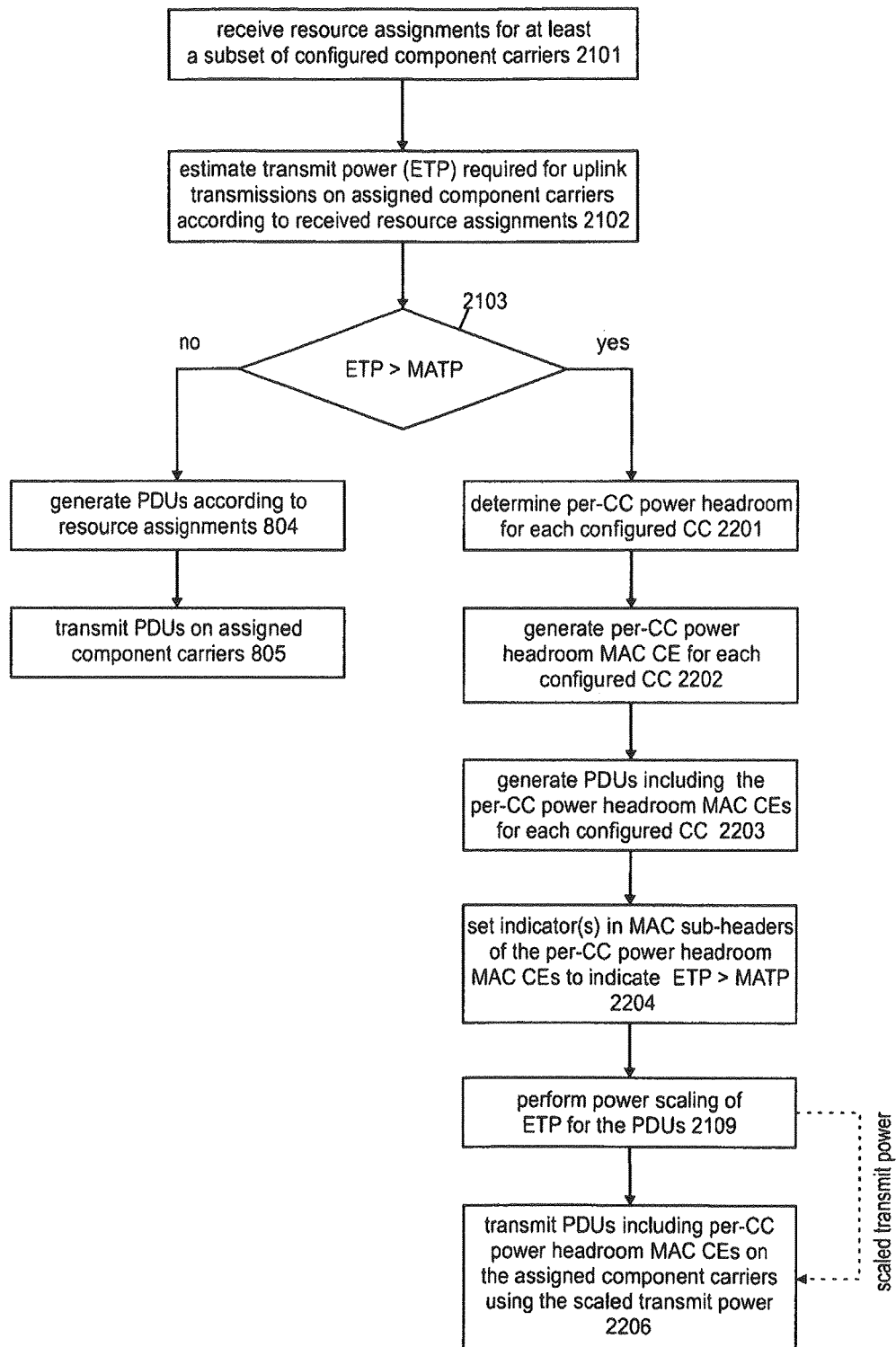
FIG. 22 shows a flow chart of an exemplary operation of a user equipment according to one embodiment of the invention in line with the first aspect of the invention, where a power status flag(s) and per-CC power headroom report(s) are signaled to the eNodeB for indicating a power limit situation of the user equipment.

FIG. 22 shows a flow chart of an exemplary operation of a user equipment according to one embodiment of the invention in line with the first aspect of the invention. The user equipment receives 2101 (similar to step 801 of FIG. 8) plural resource assignments for a given sub-frame and estimates 2102 (similar to step 802 of FIG. 8) the transmit power (ETP) required for uplink transmissions on assigned component carriers according to received resource assignments. In one exemplary embodiment of the invention, the transmit power is estimated by the user equipment based on the received resource assignments for the protocol data units to be transmitted in the sub-frame and the status of a transmit power control function of the user equipment as explained with respect to FIG. 8 above. Further, the user equipment determines 2103, whether the estimated transmit power (ETP) is exceeding the total maximum UE transmit power (MATP or $P_{CMAX}$).

If the total maximum UE transmit power is not exceeded, the user equipment is not in a power limit situation, so that no power status report thereon needs to be signaled to the eNodeB. Accordingly, the user equipment will next generate 804 the protocol data units for transmission on the respective assigned component carriers. The generation of the protocol data units can be for example implemented as described in Application 1 or Application 2. Then the user equipment transmits 805 the MAC PDUs to the eNodeB.

In case the estimated transmit power exceeds the total maximum UE transmit power in step 2103, the user equipment generates 2201 for each configured (alternatively for each assigned) uplink component carrier a respective power headroom report (per-CC power headroom report) and further generates 2202 for each configured component carrier an individual per-CC power headroom MAC CE (for example using the format shown in FIG. 7). In case no uplink grant is available for a given component carrier, the user equipment may for example assume a predefined resource allocation or alternatively predefined PUSCH power on those configured component carriers for which no uplink resource assignment is applicable in the given sub-frame.

Next, the user equipment forms 2203 the MAC PDUs including the per-CC power headroom MAC CEs. The MAC PDUs are formed according to the resource assignments. Subsequently the user equipment transmits the PDUs including per-CC power headroom MAC CEs on the assigned component carriers to the eNodeB.

In case the identification of the transmission of the power headroom reports in the per-CC PHR MAC CEs have been triggered by the estimated transmit power of the sub-frame exceeding the total maximum UE transmit power is not provided otherwise, the user equipment may optionally set 2204 indicator(s)—i.e. flag(s)—in the MAC PDUs to indicate the cause for sending the per-CC power headroom reports. For example, each MAC sub-header for a PHR MAC CE or each PHR MAC CE may comprise a respective flag that indicates whether the estimated transmit power exceeded the total maximum UE transmit power.

Furthermore, the user equipment performs 2109 power scaling to reduce the transmission power to at least one of the assigned component carriers in order to reduce the overall transmit power for the transmissions on the assigned component carriers below (or equal to) the maximum UE transmit power. As explained above, no power scaling may be applied to the transmission on a component carrier, if for example uplink control information is transmitted on this component carrier together with the MAC PDU in a given sub-frame, i.e. also referred to as PUSCH with UCI. The MAC PDUs including the per-CC PHR CEs are then transmitted 2206 on the respective assigned uplink component carriers using the reduced transmit power.

Please note that the order of the steps in FIG. 22 may not represent the correct chronological order of the steps in time, since some of the steps may require interaction—as apparent from the explanations above.

f. Definition of the Per-CC Power Headroom

Currently there is no clear definition of the component carrier specific power headroom report. For example it's not clear yet, whether the power reduction applied to the (nominal) component carrier-specific maximum transmit power ($P_{CMAX,c}$) takes into account only the uplink transmission (resource allocation) on the corresponding CC or also transmissions on other assigned uplink component carriers. For example in case there are uplink transmissions scheduled on multiple component carriers simultaneously, the amount of power reduction, sometimes also referred to as power back-off, may be increased in order to avoid unwanted emissions. Simultaneous transmission of PUSCH and/or PUCCH across aggregated component or clustered PUSCH within a component carrier may generate additional inter-modulation products in the UE transmitter chain that may consequently necessitate a transmitter power back-off in order to meet the ACLR requirements.

i. PH Definition 1

Figure 28:
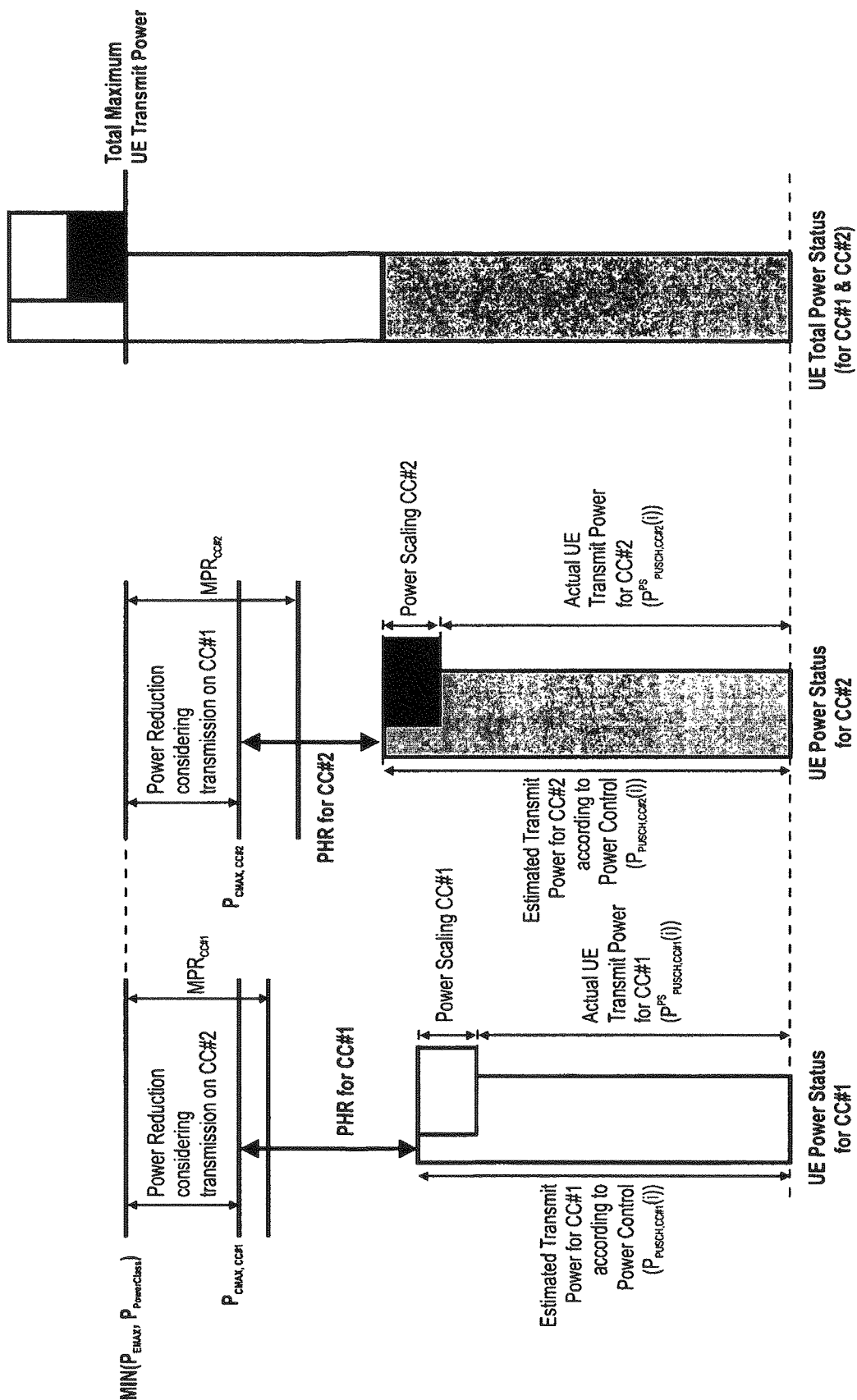

In one exemplary embodiment of the invention, as shown in FIG. 28, the per-CC power headroom is not taking into account power scaling on a given component carrier. The power headroom is defined as the difference between the maximum transmit power of the component carrier $P_{CMAX,c}$ (after power reduction) minus the estimated transmit power of the UE for the component carrier c prior to power scaling. The estimated transmit power of the UE for the component carrier c may be given by a transmit power control of the user equipment for the component carrier c.

In one exemplary implementation and in line with this embodiment, the per-CC power headroom may be for example determined as described in 3GPP TS 36.213, version 8.8.0, section 5.1.1 mentioned already earlier herein. Hence, Equation 2 above is reused and applied for the respective assigned or configured component carriers as follows.

The per-CC power headroom $PH_c(i)$ of component carrier c may be for example defined as $$PH_c(i) = P_{CMAX,c} - \{10 \cdot \log_{10}(M_{PUSCH,c}(i)) + P_{0\_PUSCH,c}(j) + \alpha_c(j) \cdot PL_c + \Delta_{TF,c}(i) + f_c(i)\} \quad \text{Equation 3}$$

where $P_{CMAX,c}$ is the maximum transmit power of component carrier c (after power reduction), obeying:

$$P_{CMAX\_L,c} \leq P_{CMAX,c} \leq P_{CMAX\_H,c}$$

$$P_{CMAX\_L} = \min(P_{EMAX,c} - \Delta T_C, P_{PowerClass} - MPR_c - AMPR_c - \Delta T_C)$$

$$P_{CMAX\_H,c} = \min(P_{EMAX,c}, P_{PowerClass})$$

The index c of the different parameters indicates that this is for component carrier c. Furthermore, some of the parameters in the equation may be UE specific. The meaning of the parameters in Equation 3 are otherwise defined as in the Technical Background section (for the respective component carrier c where applicable or per-user equipment).

The estimated transmit power $P_{PUSCH,c}(i)$ of the UE for the component carrier c as given by a transmit power control of the user equipment for the component carrier c may be defined as follows:

$$P_{PUSCH,c}(i) = \min\{P_{CMAX,c}, 10 \log_{10}(M_{PUSCH,c}(i)) + P_{0\_PUSCH,c}(j) + \alpha_c(j) \cdot PL_c + \Delta_{TF,c}(i) + f_c(i)\} \quad \text{Equation 4}$$

ii. PH Definition 2

Figure 27:
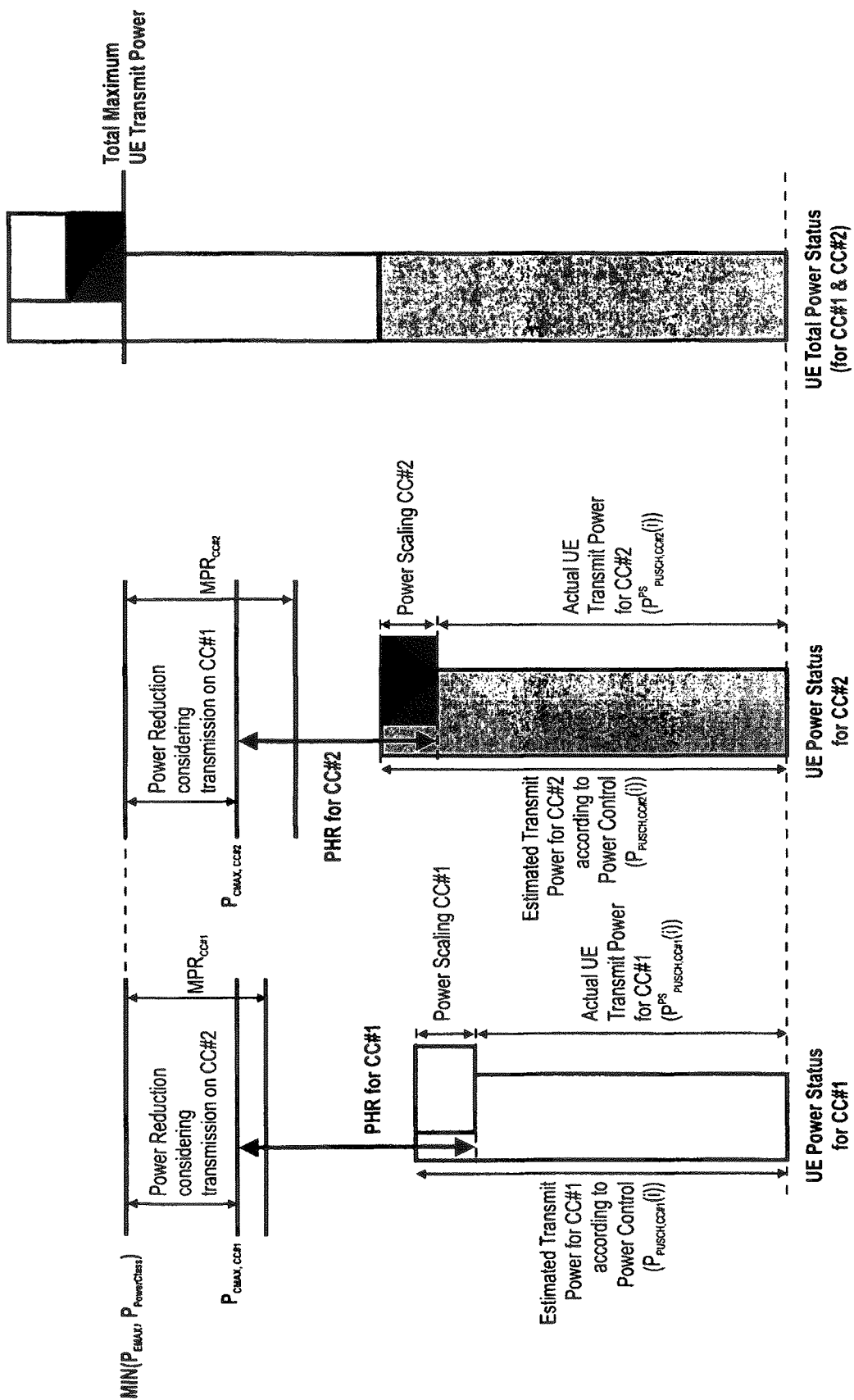
FIGS. 27 & 28 show the definition of a per-component carrier power headroom according to different embodiments of the invention.

In one exemplary embodiment of the invention, as shown in FIG. 27, the per-CC power headroom is taking into account power scaling on a given component carrier (if applied). The power headroom is defined as the difference between the maximum transmit power of the component carrier $P_{CMAX,c}$ (after power reduction) minus the used transmit power of the UE for the component carrier c after potential power scaling.

In one example, the used transmit power of the UE for the component carrier c after power scaling is the transmitted PUSCH power $P^{PS}_{PUSCH,c}(i)$ of the sub-frame i as defined by:

$$P^{PS}_{PUSCH,c}(i) = \text{PSF}_c \cdot \min \{P_{CMAX,c}, 10 \log_{10}(M_{PUSCH,c}(i)) + P_{0\_PUSCH,c}(j) \alpha_c(j) \cdot \text{PL}_c + \Delta_{TF,c}(i) + f_c(i)\} \quad \text{Equation 5}$$

where $\text{PSF}_c$ is the power scaling factor applied for the respective configured uplink component carrier c.

$P^{PS}_{PUSCH,c}(i)$ can also be expressed as:

$$P^{PS}_{PUSCH,c}(i) = \text{PSF}_c \cdot P_{PUSCH,c}(i) \quad \text{Equation 6}$$

where $P_{PUSCH,c}$ (I) is the estimated transmit power for component carrier c according to the applicable resource allocation within the sub-frame i:

$$P_{PUSCH,c}(i) = \min \{P_{CMAX,c}, 10 \log_{10}(M_{PUSCH,c}(i)) + P_{0\_PUSCH,c}(j) + \alpha_c(j) \cdot \text{PL}_c + \Delta_{TF,c}(i) + f_c(i)\} \quad \text{Equation 7}$$

According to Definition 2, the power headroom may be expressed as:

$$PH_c(i) = P_{CMAX,c} - P^{PS}_{PUSCH,c}(i) \quad \text{Equation 8}$$

Optionally, the power reduction applied to the (nominal) maximum transmit power of a component carrier may be determined taking into account simultaneous uplink transmissions on other aggregated component carriers. For example, the nominal maximum transmit power for a component carrier $P_{CMAX\_H,c}$ is reduced by a power reduction PR that takes into account uplink transmissions on other aggregated component carriers within a given sub-frame. The result of the application of the power reduction is defining the maximum transmit power of the component carrier $P_{CMAX,c}$:

$$P_{CMAX\_L,c} \leq P_{CMAX,c} = P_{CMAX\_H,c} - PR_c \leq P_{CMAX\_H,c} \quad \text{Equation 9}$$

where $PR_c \leq MPR_c$. Hence, $P_{CMAX,c}$ in Equation 3 and Equation 8 may optionally include the applied power reduction PR that may optionally take into account uplink transmissions on other aggregated component carriers within a given sub-frame.

iii. Optional Enhancements

In Equations 3 to 9 above, the parameters comprising the index c may be component carrier specific. However, some or all of the parameters may be still configured or set per UE. For example, the parameters $P_{0\_PUSCH,c}(j)$ and $\alpha_c(j)$ may be defined per UE.

Furthermore, a power headroom according to Definition 2 should in principle never be negative, since the total used transmit power, i.e. sum of all uplink transmission powers across the assigned uplink component carriers, should never exceed (after power scaling) the total UE maximum transmit power. On the other hand, a power headroom according to Definition 1 could be negative. In order to have the same power headroom value range for both power headroom definitions, a negative power headroom value for a power headroom according to Definition 2 could therefore be defined to have a special meaning. For example it could be defined that a negative value indicates that the used transmit power is a result of power scaling, i.e. total maximum UE transmission power is exceeded. Thereby, the power headroom report would already convey some information on the power status of the user equipment g. Reporting the Amount of Power Reduction As mentioned previously, the eNodeB may be assumed unaware of the maximum power reduction (MPR). As a consequence thereof, the power reduction applied by the user equipment to the maximum transmit power of a given component carrier is also unknown to the eNodeB. Thus the eNodeB essentially does not know the maximum transmit power of the component carrier relative to which the power headroom is calculated. Therefore according to a further embodiment of the invention, the user equipment informs the eNodeB about the amount of power reduction (also referred to as power back-off) applied to an uplink component carrier.

In one exemplary implementation, the user equipment signals the amount of power reduction when reporting a power headroom. Based on the power headroom and the applied amount of power reduction the eNodeB can calculate the actual used transmit power on a given component carrier and hence knows the UE power status.

Unlike in the previous exemplary embodiments, the amount of power reduction for the configured or assigned uplink component carriers may not necessarily be reported when the user equipment is in a power-limit situation or approaching same, but the amount of power reduction applied to a component carrier may be sent/updated by the user equipment periodically or in response to a change beyond a given threshold value, similar to the reporting of power headrooms. In order to reduce the signaling overhead the user equipment may only report the amount of power reduction in case the user equipment is in a power limit situation or is approaching same, as exemplified before.

Figure 23:
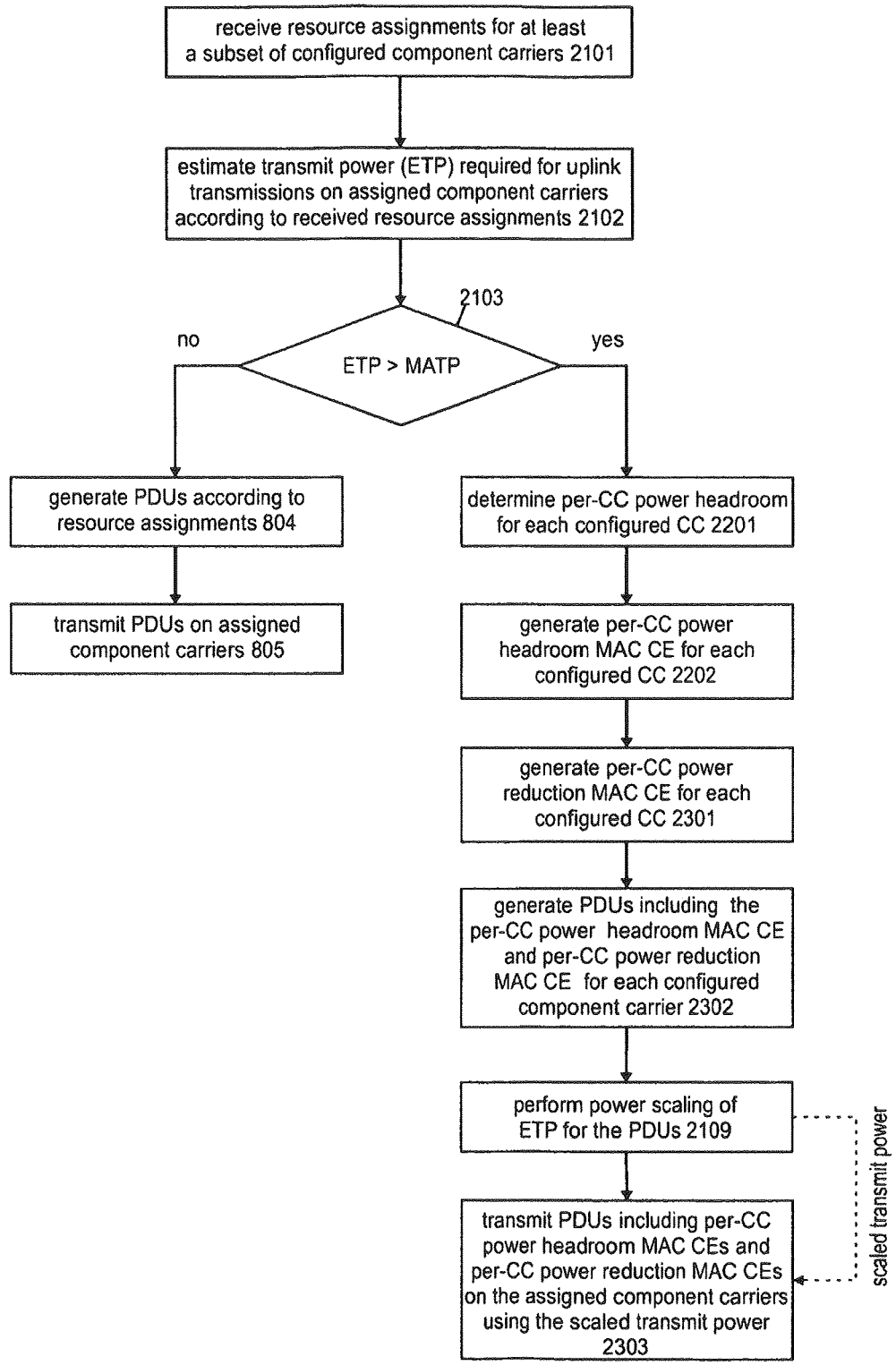
FIG. 23 shows a flow chart of an exemplary operation of a user equipment according to one embodiment of the invention in line with the first aspect of the invention, where an per-CC amount of power reduction and per-CC power headroom reports are signaled to the eNodeB for indicating a power limit situation of the user equipment.

FIG. 23 shows a flow chart of an exemplary operation of a user equipment according to one embodiment of the invention in line with the first aspect of the invention. The user equipment receives 2101 (similar to step 801 of FIG. 8) plural resource assignments for a given sub-frame and estimates 2102 (similar to step 802 of FIG. 8) the transmit power (ETP) required for uplink transmissions on assigned component carriers according to received resource assignments. In one exemplary embodiment of the invention, the transmit power is estimated by the user equipment based on the received resource assignments for the protocol data units to be transmitted in the sub-frame and the status of a transmit power control function of the user equipment as explained with respect to FIG. 8 above. Further, the user equipment determines 2103, whether the estimated transmit power (ETP) is exceeding the total maximum UE transmit power (MATP or $P_{CMAX}$).

If the total maximum UE transmit power is not exceeded, the user equipment is not in a power limit situation, so that no power status report thereon needs to be signaled to the eNodeB. Accordingly, the user equipment will next generate 804 the protocol data units for transmission on the respective assigned component carriers. The generation of the protocol data units can be for example implemented as described in Application 1 or Application 2. Then the user equipment transmits 805 the MAC PDUs to the eNodeB.

In case the estimated transmit power exceeds the total maximum UE transmit power in step 2103, the user equipment generates 2201 for each configured (alternatively for each assigned) uplink component carrier a respective power headroom report (per-CC power headroom report) and further generates 2202 for each configured component carrier an individual per-CC power headroom MAC CE (for example using the format shown in FIG. 7). In case no uplink grant is available for a given component carrier, the user equipment may for example assume a predefined resource allocation or alternatively predefined PUSCH power on those configured component carriers for which no uplink resource assignment is applicable in the given sub-frame. The power headroom may be calculated using for example Definition 1 or Definition 2 outlined above.

Furthermore, the user equipment generates 2301 for each assigned or configured component carrier in the uplink a per-CC power reduction MAC CE that is indicating the amount of power reduction (e.g. in dB) that is applied to the respective component carrier. Next, the user equipment forms 2302 the MAC PDUs the per-CC power headroom MAC CEs and per-CC power reduction CEs. The MAC PDUs are formed according to the resource assignments.

Figure 32:
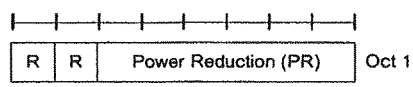
FIG. 32 shows a MAC CE according to an embodiment of the invention, wherein the MAC CE is indicating the amount of power reduction applied to the corresponding uplink component carrier.

The per-CC power reduction MAC CE comprises the amount of power reduction applied to the component carrier and may be defined similar to the PHR MAC CE in LTE Rel. 8, as shown in FIG. 32. A new logical channel ID (LC ID) could be reserved for identification of the per-CC power reduction MAC CE.

The user equipment performs 2109 power scaling to reduce the transmission power to at least one of the assigned component carriers in order to reduce the overall transmit power for the transmissions on the assigned component carriers below (or equal to) the maximum UE transmit power. The MAC PDUs including the per-CC PHR CEs and per-CC power reduction MAC CEs are then transmitted 2303 on the respective assigned uplink component carriers using the reduced transmit power.

Please note that the order of the steps in FIG. 23 may not represent the correct chronological order of the steps in time, since some of the steps may require interaction—as apparent from the explanations above.

Instead of signaling individual per-CC PHR CEs and per-CC power reduction CEs, the per-CC power headroom and the per-CC power reduction applied to the component carrier may also be signaled in one MAC CE. In order to identify this new MAC CE (power reduction & power headroom), a one-bit flag could be used to indicate the format of the MAC CE. For example, the flag could be one of the two reserved bits (R) provided in the MAC sub-header. The flag being set (e.g. 1) may for example indicate that amount of power reduction and a power headroom report according to Definition 1 or Definition 2 is comprised in the MAC CE. The flag not being set (e.g. 0) indicates that only a power headroom report according to Definition 1 or Definition 2 is signaled.

Alternatively instead of signaling the amount of power reduction, the user equipment may signal a power headroom report for all configured or assigned component carriers when the applied power reduction to the maximum transmit power of an component carrier changes beyond some predefined threshold. Basically a new trigger for per-CC PHR reporting would be introduced.

h. Signaling the Amount of Power Scaling

Another alternative implementation and embodiment of the invention for informing the eNodeB on a power-limit situation of the user equipment, the user equipment signals the amount of power scaling applied to the different configured or assigned uplink component carriers. The amount of power scaling (in dB) may be for example signaled for each uplink component carrier when the user equipment is power limited, i.e. the estimated overall transmit power for the sub-frame exceeds the total maximum UE transmit power.

Figure 24:
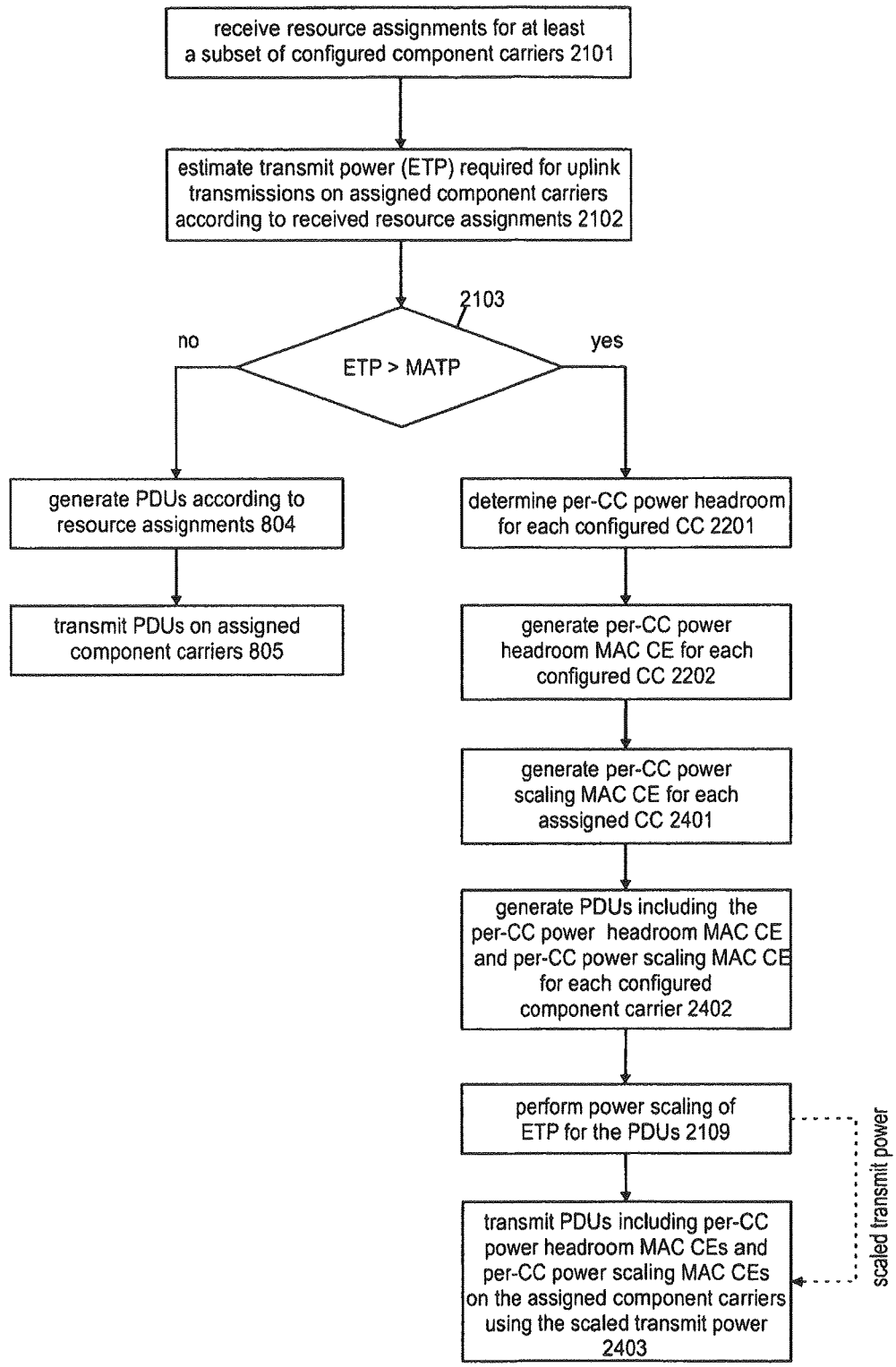
FIG. 24 shows a flow chart of an exemplary operation of a user equipment according to one embodiment of the invention in line with the first aspect of the invention, where an per-CC amount of power reduction and per-CC power headroom reports are signaled to the eNodeB for indicating a power limit situation of the user equipment.
Figure 25:
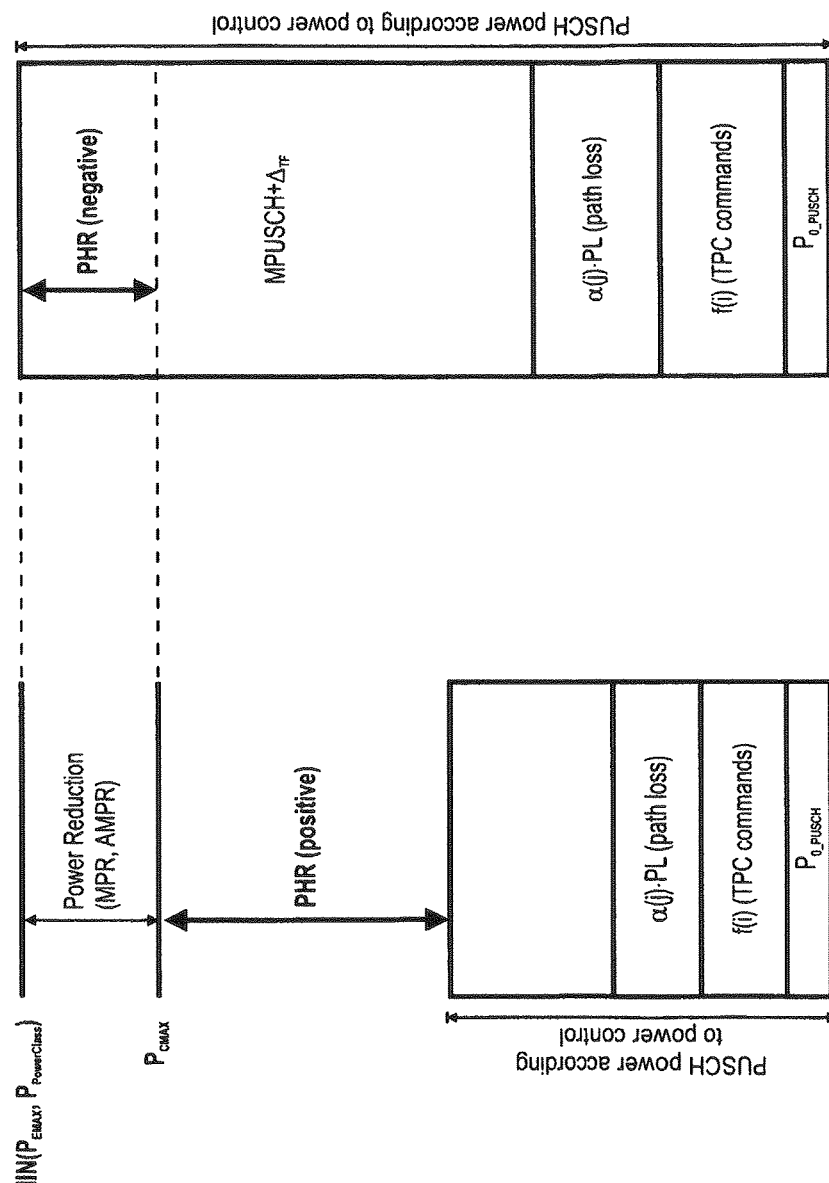
FIG. 25 shows exemplary scenarios for a UE transmission power status and corresponding power headroom, resulting in positive and negative power headrooms.
Figure 26:
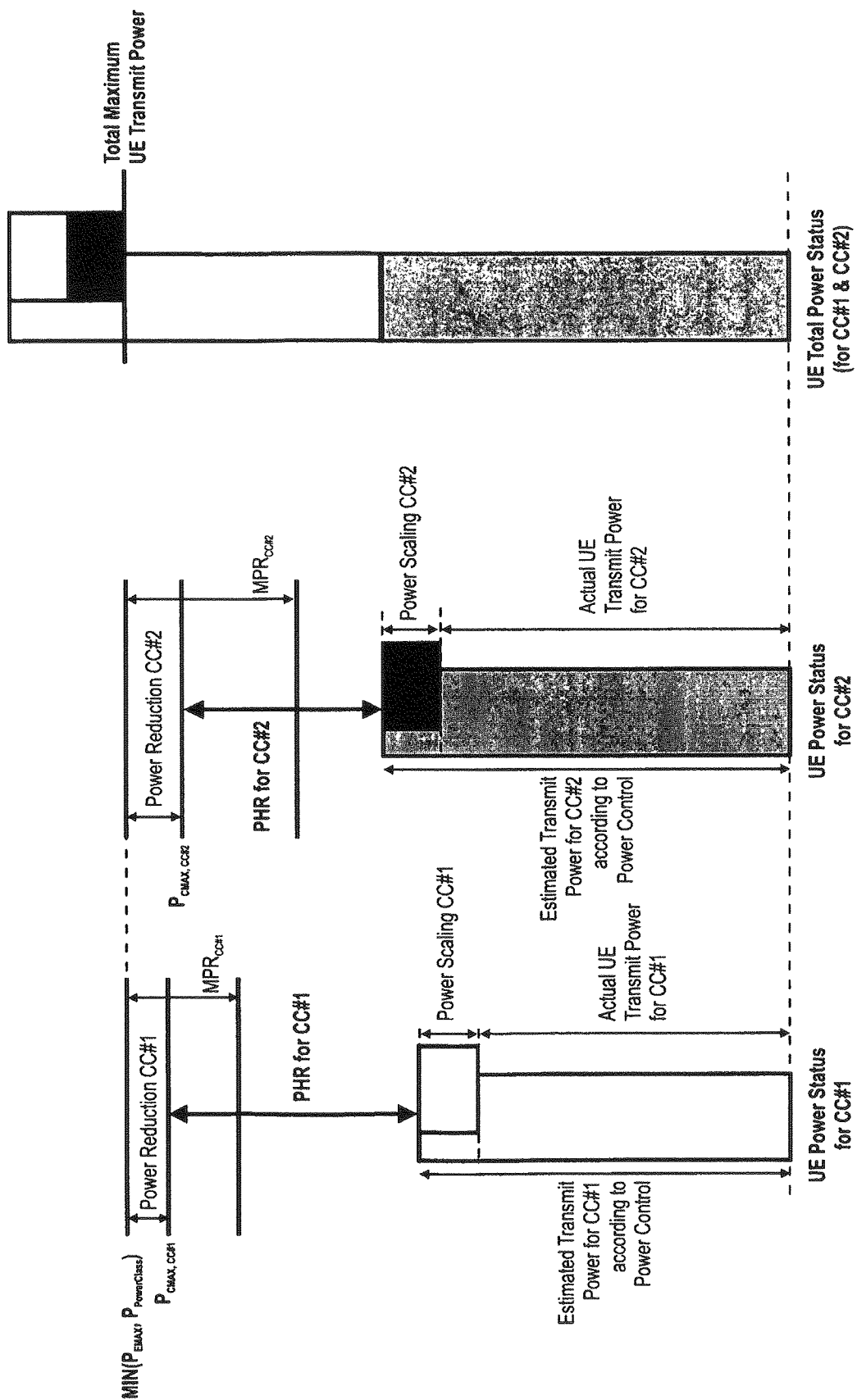
FIG. 26 shows an exemplary scenario where user equipment is power limited, i.e. applying power scaling on component carriers CC #1 and CC #2 configured in the uplink.

FIG. 24 shows a flow chart of an exemplary operation of a user equipment according to one embodiment of the invention in line with the first aspect of the invention. The user equipment receives 2101 (similar to step 801 of FIG. 8) plural resource assignments for a given sub-frame and estimates 2102 (similar to step 802 of FIG. 8) the transmit power (ETP) required for uplink transmissions on assigned component carriers according to received resource assignments. In one exemplary embodiment of the invention, the transmit power is estimated by the user equipment based on the received resource assignments for the protocol data units to be transmitted in the sub-frame and the status of a transmit power control function of the user equipment as explained with respect to FIG. 8 above. Further, the user equipment determines 2103, whether the estimated transmit power (ETP) is exceeding the total maximum UE transmit power (MATP or $P_{CMAX}$).

If the total maximum UE transmit power is not exceeded, the user equipment is not in a power limit situation, so that no power status report thereon needs to be signaled to the eNodeB. Accordingly, the user equipment will next generate 804 the protocol data units for transmission on the respective assigned component carriers. The generation of the protocol data units can be for example implemented as described in Application 1 or Application 2. Then the user equipment transmits 805 the MAC PDUs to the eNodeB.

In case the estimated transmit power exceeds the total maximum UE transmit power in step 2103, the user equipment generates 2201 for each configured (or alternatively for each assigned) uplink component carrier a respective power headroom report (per-CC power headroom report) and further generates 2202 for each assigned component carrier an individual per-CC power headroom MAC CE (for example using the format shown in FIG. 7). In case no uplink grant is available for a given component carrier, the user equipment may for example assume a predefined resource allocation or alternatively predefined PUSCH power on those configured component carriers for which no uplink resource assignment is applicable in the given sub-frame. The power headroom may be calculated using for example Definition 1 or Definition 2 outlined above.

Furthermore, the user equipment generates 2401 for each assigned component carrier in the uplink a per-CC power scaling MAC CE that is indicating the power scaling factor (e.g. in dB) that of the power scaling applied to the transmission of the respective component carrier. Next, the user equipment forms 2402 the MAC PDUs the per-CC power headroom MAC CEs and per-CC power scaling CEs. The MAC PDUs are formed according to the resource assignments.

Figure 33:
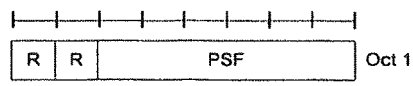
FIG. 33 shows a MAC CE according to an embodiment of the invention, wherein the MAC CE is indicating the power scaling factor applied to the transmission on the corresponding uplink component carrier.

For signaling, a new MAC CE may be defined that comprises the power scaling factor (PSF). This (per-CC) power scaling MAC CE could be defined similar to the PHR MAC CE in LTE Rel. 8, as shown in FIG. 33. A new logical channel ID (LCID) could be reserved for identification of the per-CC power scaling MAC CE.

The user equipment performs 2109 power scaling to reduce the transmission power to at least one of the assigned component carriers in order to reduce the overall transmit power for the transmissions on the assigned component carriers below (or equal to) the maximum UE transmit power. The MAC PDUs including the per-CC PHR CEs and per-CC power scaling MAC CEs are then transmitted 2403 on the respective assigned uplink component carriers using the reduced transmit power.

Please note that the order of the steps in FIG. 24 may not represent the correct chronological order of the steps in time, since some of the steps may require interaction—as apparent from the explanations above.

In an alternative embodiment, the amount of power scaling could be signaled by means of the power headroom report. Instead of reporting the absolute amount of power scaling the user equipment reports a per-CC power headroom according to Definition 1 and a per-CC power headroom according to Definition 2 simultaneously for one component carrier. The eNodeB can then calculate the amount of power scaling by taking the difference of the two power headrooms.

Since reports a per-CC power headroom according to Definition 1 and a per-CC power headroom according to Definition 2 will report the same values when no power scaling is applied, it's only useful to report both power headrooms if the user equipment is power limited. In order to distinguish the different reporting formats, one reserved bit (R) of the MAC PDU sub-header corresponding to the per-CC PHR MAC CE may be used. For example, the reserved bit being set (e.g. 1) indicates that power scaling was applied, that a per-CC power headroom according to Definition 1 (or Definition 2) together with the absolute amount of power scaling, or alternatively, a per-CC power headroom according to Definition 1 and a per-CC power headroom according to Definition 2 is reported. The reserved bit not being set (e.g. 0) may indicates that no power scaling was applied and normal per-CC PHR is reported.

i. Hardware and Software Implementation of the Invention Another embodiment of the invention relates to the implementation of the above described various embodiments using hardware and software. In this connection the invention provides a user equipment (mobile terminal) and a eNodeB (base station). The user equipment is adapted to perform the methods described herein. Furthermore, the eNodeB comprises means that enable the eNodeB to determine the power status of respective user equipments from the power status information received from the user equipments and to consider the power status of the different user equipments in the scheduling of the different user equipments by its scheduler.

It is further recognized that the various embodiments of the invention may be implemented or performed using computing devices (processors). A computing device or processor may for example be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It should be further noted that the individual features of the different embodiments of the invention may individually or in arbitrary combination be subject matter to another invention.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. An integrated circuit, comprising circuitry configured to control a process performed by a base station, wherein the process includes:
    receiving a power status report from a user equipment (UE) operating in carrier aggregation in which two or more component carriers (CCs) are aggregated, wherein the power status report includes:
        (i) a CC specific maximum transmission power, $P_{CMAX,c}$, for each configured and activated uplink CC, for which a resource is assigned to the UE, wherein $P_{CMAX,c}$ shall be set within following bounds:

$$P_{CMAX\_L,c} <= P_{CMAX,c} <= P_{CMAX\_H,c}$$

where $P_{CMAX\_L,c}$ is a lower bound and $P_{CMAX\_H,c}$ is a higher bound of a CC specific maximum transmission power, and
        (ii) a power headroom report indicative of a difference between the CC specific maximum transmission power, $P_{CMAX,c}$, and an estimated UE transmit power, per each configured and activated uplink CC; and
    controlling communication with the UE based on the received power status report.

2. The integrated circuit according to claim 1, wherein the power status report is triggered at activation of a configured uplink CC.

3. The integrated circuit according to claim 1, wherein the power status report is for Uplink Shared Channel (UL-SCH) transmission per configured and activated uplink CC.

4. The integrated circuit according to claim 1, wherein the power status report for a sub-frame takes into account a transmission power of a Physical Uplink Control Channel (PUCCH) used by the UE in the same sub-frame.

5. The integrated circuit according to claim 1, wherein in case no resource is assigned to the UE in a sub-frame, the power status report takes into account a predefined uplink grant or a predefined Physical Uplink Shared Channel (PUSCH) power.

6. The integrated circuit according to claim 1, wherein the power status reports on multiple configured and activated uplink CCs are included in a single Media Access Control (MAC) control element, wherein the MAC control element includes a bitmap and a bit that is set at a certain position in the bitmap indicates the presence of a power headroom report field for a corresponding CC.

7. The integrated circuit according to claim 1, wherein the power status report includes indicators that indicate, for each (ii) power headroom report, the presence of the associated (i) CC specific maximum transmission power, $P_{CMAX,c}$, respectively.

8. The integrated circuit according to claim 1, wherein the CC specific maximum transmission power, $P_{CMAX,c}$, is a nominal UE maximum transmit power.

* * * * *